United States Patent
Miller et al.

(10) Patent No.: US 10,985,428 B2
(45) Date of Patent: Apr. 20, 2021

(54) LEAD-ACID BATTERY SEPARATORS WITH IMPROVED PERFORMANCE AND BATTERIES AND VEHICLES WITH THE SAME AND RELATED METHODS

(71) Applicant: Daramic LLC, Charlotte, NC (US)

(72) Inventors: Eric H. Miller, Philpot, KY (US); M. Neal Golovin, Owensboro, KY (US); Ahila Krishnamoorthy, Karnataka (IN); Matthew Howard, Louisville, KY (US); James P. Perry, Utica, KY (US); J. Kevin Whear, Utica, KY (US)

(73) Assignee: Daramic, LLC, Charlotte, NC (US)

( * ) Notice: Subject to any disclaimer, the term of this patent is extended or adjusted under 35 U.S.C. 154(b) by 205 days.

(21) Appl. No.: 15/288,496

(22) Filed: Oct. 7, 2016

(65) Prior Publication Data

US 2017/0104199 A1  Apr. 13, 2017

Related U.S. Application Data

(63) Continuation of application No. PCT/US2016/012805, filed on Jan. 11, 2016.

(Continued)

(51) Int. Cl.
*H01M 50/463* (2021.01)
*H01M 10/06* (2006.01)
*H01M 50/411* (2021.01)

(52) U.S. Cl.
CPC ......... *H01M 50/463* (2021.01); *H01M 10/06* (2013.01); *H01M 50/411* (2021.01); *H01M 2220/20* (2013.01); *Y02E 60/10* (2013.01)

(58) Field of Classification Search
CPC ...... H01M 2/18; H01M 2/1653; H01M 10/06; Y02E 60/128
See application file for complete search history.

(56) References Cited

U.S. PATENT DOCUMENTS 4,403,024 A    9/1983  Gordon et al.
4,425,412 A *  1/1984  Dittmann ............ H01M 10/342
                                           429/152

(Continued)

FOREIGN PATENT DOCUMENTS

JP    08273651     * 10/1996
JP    08273651 A   * 10/1996

(Continued)

OTHER PUBLICATIONS

International Search Report and Written Opinion issued in International Application No. PCT/US16/56009, dated Jan. 11, 2017.

*Primary Examiner* — Ula C Ruddock
*Assistant Examiner* — Thomas H. Parsons
(74) *Attorney, Agent, or Firm* — Hammer & Associates, P.C.

(57) ABSTRACT

Improved battery separators are disclosed herein for use in flooded lead-acid batteries, and in particular enhanced flooded lead-acid batteries. The improved separators disclosed herein provide for enhanced electrolyte mixing and substantially reduced acid stratification. The improved flooded lead-acid batteries may be advantageously employed in applications in which the battery remains in a partial state of charge, for instance in start/stop vehicle systems. Also, improved lead-acid batteries, such as flooded lead-acid batteries, improved systems that include a lead-acid battery and a battery separator, improved battery separators, improved vehicles including such systems, and/or methods of manufacture and/or use may be provided.

12 Claims, 80 Drawing Sheets

Related U.S. Application Data

(60) Provisional application No. 62/385,347, filed on Sep. 9, 2016, provisional application No. 62/277,136, filed on Jan. 11, 2016, provisional application No. 62/238,373, filed on Oct. 7, 2015.

(56) References Cited

U.S. PATENT DOCUMENTS

| | | | |
|---|---|---|---|
| 4,619,875 A | | 10/1986 | Stahura et al. |
| 5,558,952 A | * | 9/1996 | Knauer ................ H01M 2/18 |
| | | | 429/139 |
| 5,569,552 A | | 10/1996 | Rao et al. |
| 2003/0129486 A1 | | 7/2003 | Bohnstedt et al. |
| 2012/0070713 A1 | | 3/2012 | Whear et al. |

FOREIGN PATENT DOCUMENTS

| | | | | |
|---|---|---|---|---|
| JP | 2006228637 | | * | 2/2005 |
| JP | 2006228637 A | | * | 2/2005 |
| JP | 2005197145 | | * | 7/2005 |
| JP | 2005197145 A | | * | 7/2005 |
| JP | 00201017719 | | | 8/2010 |
| JP | 002014075288 | | | 4/2014 |

* cited by examiner

 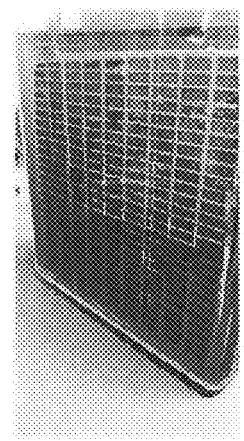
FIGURE 7A                    FIGURE 7B

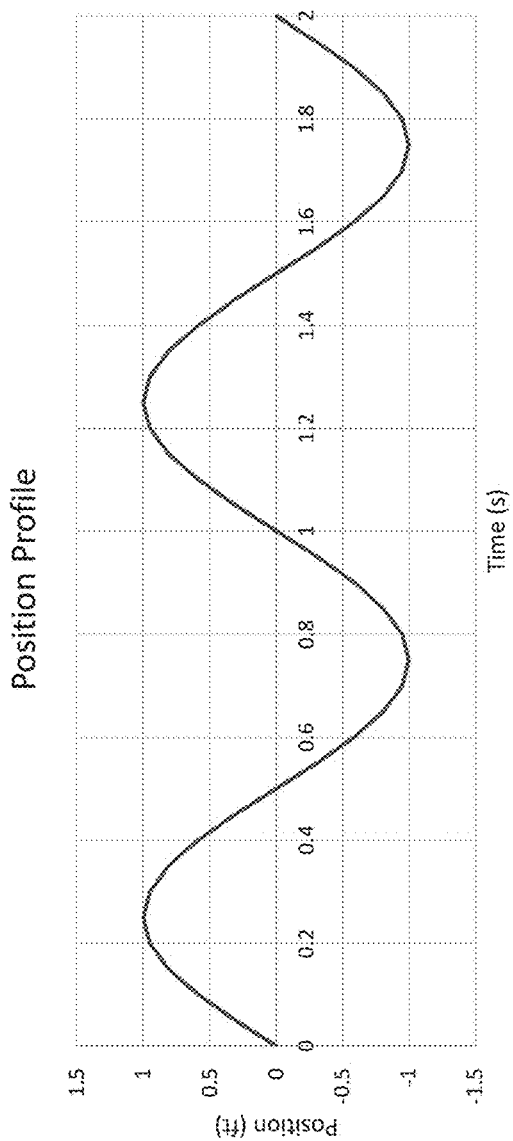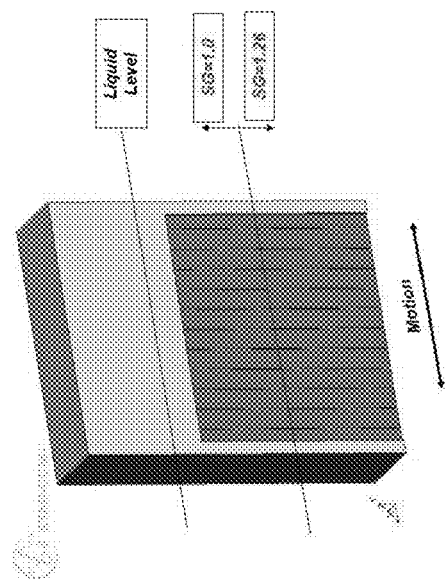
FIGURE 17A

- Monitored volume uniformity of the volume fraction of acid throughout the liquid
  - Perfectly mixed = 1.0
- Original value = 0.32
- Average value between 58 and 60 seconds = 0.36
  - Change = 12%

- Serrated design mixes more thoroughly than solid design
  - Quantitatively as well as qualitatively
  - 5% better mixing
- Difference in mixing is evident early in time history
  - Validates running the optimization CFD analysis <60 seconds

- Using updated acceleration profile
- Profile:
  - Sinusoidal motion from 0° to 15° to 0° over 0.5 seconds
  - Pause for 0.5 seconds
  - Sinusoidal motion from 0° to -15° to 0° over 0.5 seconds
  - Pause for 0.5 seconds
- Total cycle time is 2 seconds
  - Running for 60 seconds (30 cycles)

- Sub-model geometry modified so that the separator contained the negative plate (instead of the positive plate)

- Serrated geometry ran to 60 seconds with horizontal acceleration

- Repeating unit shown
- Three continuous variables
  - 1mm < Height < 15mm
  - 15° < Angle < 165°
  - 0.5 mm < Column Spacing < 15mm
- Three binary variables
  - Column 1 switch directions
  - Column 2 switch directions
  - Column 1 to 2 switch directions
- Dependent variables ensure:
  - Full coverage of separator area
  - Overlap between columns
  - Centered columns within separator

- Repeating unit shown
- Three continuous variables
  - Height = 9.6 mm
  - Angle = 72°
  - Column Spacing = 3 mm
  - Thickness = 1mm
- Three binary variables
  - Column 1 no alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Repeating unit shown
- Three continuous variables
  - Height = 9.8 mm
  - Angle = 77.2°
  - Column Spacing = 3.09 mm
  - Thickness = 1 mm
- Three binary variables
  - Column 1 no alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Repeating unit shown
- Three continuous variables
  - Height = 9.6 mm
  - Angle = 74.7°
  - Column Spacing = 3 mm
  - Thickness = 1 mm
- Three binary variables
  - Column 1 alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Repeating unit shown
- Three continuous variables
  - Height = 9.5 mm
  - Angle = 78.3°
  - Column Spacing = 3.09 mm
  - Thickness = 1 mm
- Three binary variables
  - Column 1 no alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Repeating unit shown
- Three continuous variables
  - Height = 9.6 mm
  - Angle = 73.8°
  - Column Spacing = 3 mm
  - Thickness = 1 mm
- Three binary variables
  - Column 1 no alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

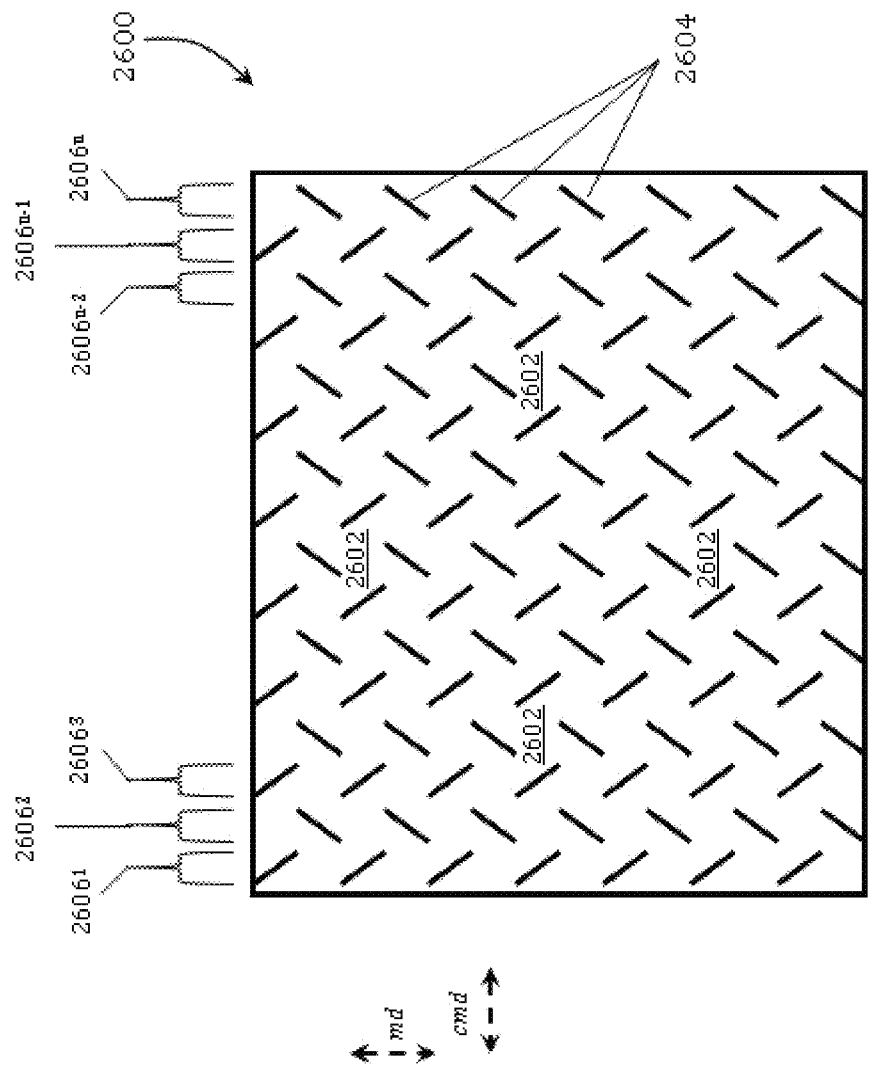

- Separator broken up into 3 zones
  - Each zone is 47.33mm wide
- Zone 1 and 2 and 3 rib geometry may vary independently
- Zone 3 serration geometry may be identical to Zone 1
- 12 independent variables

- Objective
  - Maximize Volume Uniformity Increase
- Twelve variables
  - 2mm < $Height_{1,2}$ < 12mm
  - 45° < $Angle_{1,2}$ < 135°
  - 0.5mm < $Column\ Spacing_{1,2}$ < 12mm
  - Column 1 $switch_{1,2}$ directions
  - Column 2 $switch_{1,2}$ directions
  - Column 1 to 2 $switch_{1,2}$ directions

- Repeating unit shown
- Three continuous variables
  - 2mm < Height < 12mm
  - 45° < Angle < 135°
  - 0.5mm < Column Spacing < 12mm
- Three binary variables
  - Column 1 switch directions
  - Column 2 switch directions
  - Column 1 to 2 switch directions
- Dependent variables ensure:
  - Full coverage of zone
  - Overlap between columns
  - Centered columns within zone

Design 1 – Center Triangle

- The first deflector design has an inverted triangle in the center of the head space.
  - Deflector width = 0.06 m
  - Deflector height = 0.05 m
  - Fillet radius = 0.02 m Design 2 – Opposing Arcs

- The second deflector design has two arc-shaped deflectors from each side wall
  - Height from ceiling = 0.03 m
  - Deflector width = 0.05 m
  - Deflector height = 0.05 m
  - Arc radius = 0.05 m

Design 3 – Center Divider

- The third deflector design has a rectangular divider placed at the center of the volume
  - Deflector width = 0.005 m
  - Deflector height = coincident with baffle top

FIGURE 341

The uniformity of a scalar quantity is computed in a volume as:

$$Uniformity\ index\ of\ \phi = 1 - \frac{\sum_c |\phi_c - \bar{\phi}| V_c}{2|\bar{\phi}| \sum_c V_c} \qquad (3086)$$

where $\bar{\phi}$ is the volume average of $\phi$, $\phi_c$ is the value of the selected scalar in a cell and $V_c$ is the cell volume.

This uniformity index describes the distribution of a certain quantity in a volume. If the quantity is distributed equally, the resulting number is 1. This report is useful in applications where a uniform flow rate is desired throughout an entire volume. Heat exchangers, catalysts, and filters are examples of such applications.

|  | Low Value (mm) | Mid value (Nominal)(mm) | High Value (mm) |
|---|---|---|---|
| $Gap_P$ | 1mm | 2.5mm | 5mm |
| $H_L$ | 150mm | 450 mm | 925mm |
| $H_W$ | 120mm | 158 mm | 200 mm |
| $Gap_A$ | 40mm | 60 mm | 120mm |

FIGURE 39A

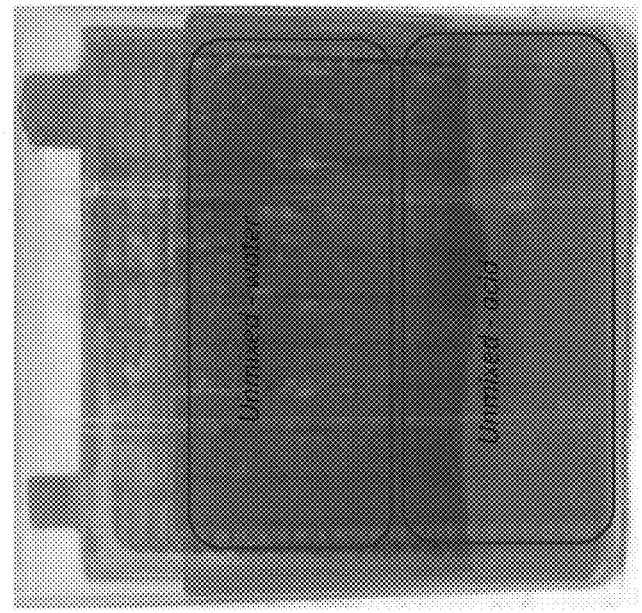
Control Profile with Solid Ribs - 30 movements
Water/acid remain stratified
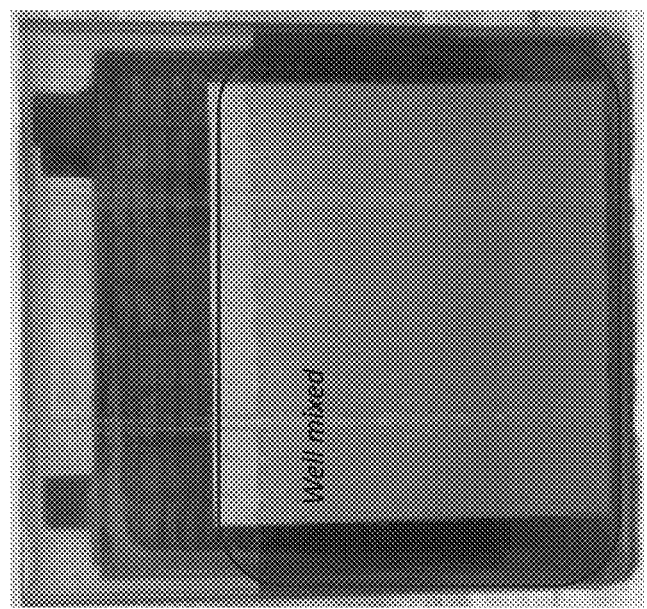
Concept 1 - 30 movements
Water/acid well mixed
FIGURE 42

1 …

LEAD-ACID BATTERY SEPARATORS WITH IMPROVED PERFORMANCE AND BATTERIES AND VEHICLES WITH THE SAME AND RELATED METHODS

CROSS-REFERENCE TO RELATED APPLICATIONS

This application claims priority to and benefit of: U.S. Provisional Patent Application Ser. No. 62/238,373, filed on Oct. 7, 2015; U.S. Provisional Patent Application Ser. No. 62/277,136, filed on Jan. 11, 2016; PCT International Patent Application Serial No. PCT/US2016/012805, filed on Jan. 11, 2016 (which claims priority to U.S. Provisional Patent Application Ser. No. 62/238,373, filed on Oct. 7, 2015); and U.S. Provisional Patent Application Ser. No. 62/385,347, filed on Sep. 9, 2016, the entire contents of each of which are herein fully incorporated by reference.

FIELD

In accordance with at least selected embodiments, the present disclosure is directed to improved lead-acid batteries, such as flooded lead-acid batteries, improved systems that include a lead-acid battery, and/or a battery separator, improved battery separators, improved vehicles including such systems, methods of manufacture or use, or combinations thereof. In accordance with at least certain embodiments, the present disclosure or invention is directed to improved flooded lead-acid batteries, improved battery separators for such batteries, and/or methods of manufacturing, testing, or using such improved flooded lead-acid batteries, or combinations thereof. In addition, disclosed herein is a method, system, battery, and/or battery separator for reducing acid stratification, enhancing battery life and performance in a flooded lead-acid battery, and in such batteries that operate in a partial state of charge.

BACKGROUND

In order to reduce fuel consumption and generation of tail pipe emissions, auto manufacturers have implemented varying degrees of electrical hybridization. One form of Hybrid Electric Vehicle (HEV) is sometimes referred as the "Micro HEV" or "micro-hybrid." In such Micro HEVs or similar vehicles, an automobile may have an idle start/stop (ISS) function in which the engine may shut off at various points during idle start/stop and/or regenerative braking. Although this increases the fuel economy of the vehicle, it also increases strain on the battery, which must power auxiliary devices (such as air conditioning, media players and the like) while the vehicle is not in motion.

Conventional vehicles (such as automobiles without start/stop capability) may use conventional flooded lead-acid batteries such as starting lighting ignition (SLI) lead-acid batteries. Because the engine never shuts off during use, power is only drawn from the battery when the engine is cranked. As such, the battery typically exists in a state of overcharge, not in a partial state of charge. For example, such a conventional flooded lead-acid battery may exist in a state of charge that is greater than 95% charged, greater than 96%, greater than 97%, greater than 98%, greater than 99%, or even greater than 100% charged, as it is often in a state of overcharge. At overcharge, gas bubbles (for example hydrogen gas bubbles) are generated within the conventional lead-acid battery, and these circulating gas bubbles serve to mix the liquid electrolyte (the acid) within the battery.

Start/stop vehicles, on the other hand, continuously draw power from the battery, which is therefore constantly in a state of partial charge. At partial charge, gas bubbles are not generated, and the internal mixing of the electrolyte is substantially reduced, leading to acid stratification within the battery. Thus, acid stratification is a problem within start/stop flooded lead-acid batteries and various enhanced flooded batteries, whereas acid stratification simply was not a problem for more conventional or traditional flooded lead-acid batteries, which operated in a state of overcharge or total (or close-to-total) charge.

Acid stratification is a term for the process in which denser sulfuric acid is concentrated at the bottom of the battery, leading to a corresponding higher water concentration at the top of the battery. Acid stratification is undesirable within a flooded lead-acid battery, such as an enhanced flooded lead-acid battery or a start/stop flooded lead-acid battery. The reduced levels of acid at the top of the electrode may inhibit uniformity and charge acceptance within the battery system and may increase the variation of internal resistance from top to bottom along the height of the battery. Increased acid levels at the bottom of the battery artificially raise the voltage of the battery, which can interfere with battery management systems, possibly sending unintended/erroneous state of health signals to a battery management system. Overall, acid stratification causes higher resistance along parts of the battery, which may lead to electrode issues and/or shorter battery life. Given that start/stop batteries and/or other enhanced flooded lead-acid batteries are expected to become more and more prevalent with hybrid and fully electric vehicles to increase vehicle fuel efficiency and reduce $CO_2$ emissions, solutions for reducing acid stratification and/or for improving acid mixing are greatly needed.

In some instances, acid stratification can be avoided using VRLA (valve regulated lead-acid) technology where the acid is immobilized by either a gelled electrolyte and/or by an absorbent glass mat (AGM) battery separator system. In contrast to the freely-fluid electrolyte in flooded lead-acid batteries, in VRLA AGM batteries, the electrolyte is absorbed on a fiber or fibrous material, such as a glass fiber mat, a polymeric fiber mat, a gelled electrolyte, and so forth. However, VRLA AGM battery systems are substantially more expensive to manufacture than flooded battery systems. VRLA AGM technology in some instances, may be more sensitive to overcharging, may dry out in high heat, may experience a gradual decline in capacity, and may have a lower specific energy. Similarly, in some instances, gel VRLA technology may have higher internal resistance and may have reduced charge acceptance.

Thus, there is a need to further develop enhanced flooded lead-acid batteries, such as enhanced flooded start/stop batteries, that do not undergo acid stratification while in use and/or that exhibit reduced or significantly reduced levels of acid stratification while in use. There is a need for improved enhanced flooded lead-acid batteries with improved uniformity and performance in comparison to what has been previously available, and with performance capability that rivals, or even exceeds, what may be found in certain VRLA AGM batteries.

SUMMARY

In accordance with at least selected embodiments, the present disclosure or invention may address the above mentioned and other needs. For example, in accordance with at least certain embodiments, the present disclosure or invention is directed to or may provide new, improved or optimized flooded lead-acid batteries, systems, and separators for enhanced flooded lead-acid batteries, as well as methods of manufacturing, testing, and/or using the same, and/or vehicles comprising the same.

Disclosed herein are new, improved or optimized enhanced flooded lead-acid batteries having specific kinds of separators. It has been surprisingly found that by appropriate selection of separator surface characteristics (and optionally with certain battery plate and separator orientation in the vehicle), acid stratification can be reduced and/or prevented, and a corresponding increase in battery performance can be observed, performance that is close to, equates, or is even greater than the performance of certain VRLA AGM or VRLA-AGM batteries. Furthermore, it has been surprisingly found that using one or more of the separators described herein along with one or more of the batteries described herein, and using them in motion, such motion of the inventive batteries and separators facilitates the improved acid mixing or circulation, and/or the reduced or all-together prevented acid stratification, without a requirement for some mechanical means or some implement for acid mixing (such as a pump for acid mixing). Various embodiments are described in further detail below.

In accordance with at least selected embodiments, aspects or objects, the present disclosure is directed to improved lead-acid batteries, such as flooded lead-acid batteries, improved systems that include a lead-acid battery and a battery separator, improved battery separators, improved vehicles including such systems, and/or methods of manufacture and/or use.

In accordance with at least selected embodiments, aspects or objects, the present disclosure may provide enhanced flooded lead-acid batteries, such as enhanced flooded start/stop batteries, that do not undergo acid stratification while in use and/or that exhibit reduced or significantly reduced acid stratification while in use, improved enhanced flooded lead-acid batteries with improved uniformity, such as acid mixing uniformity, and the like, improved batteries that operate in a partial state of charge, and/or performance in comparison to what has been previously available, and/or improved enhanced flooded lead-acid batteries with performance capability that rivals or exceeds at least certain VRLA-AGM batteries.

BRIEF DESCRIPTION OF THE FIGURES

FIGS. 7A and 7B include photographs comparing a conventional solid rib separator (7A) and no separator at all (7B) in a jar filled with 1.28 specific gravity acid, which is mixed.

FIG. 17A illustrates a horizontal acceleration profile with lateral or side-to-side motion modeled as sinusoidal acceleration that battery separators were subjected to for analysis using Computational Fluid Dynamics (CFD).

FIGS. 26A-26G illustrate battery separators with broken ribs according to exemplary embodiments of the present disclosure and as defined in the patterns shown therein.

FIGS. 34A-34I illustrate variations on exemplary embodiments of the present disclosure.

FIGS. 39A-39C depict exemplary embodiments of dimension values depicting inventive Motive Power type separator profiles, spacing, and head space in, for example, tall batteries or battery cases.

FIG. 42 includes images which show the mixing benefit of an inventive profile over a conventional solid rib profile.

DETAILED DESCRIPTION

Figure 1:
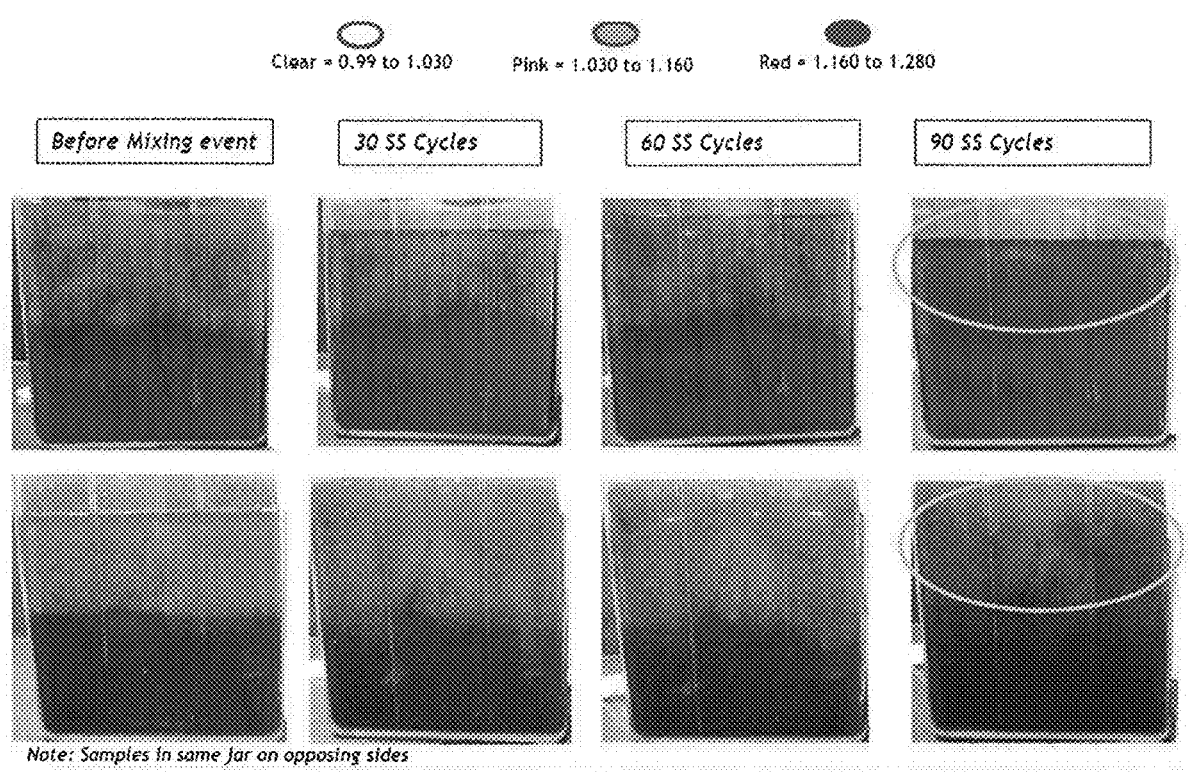
FIG. 1 includes a series of photographs comparing cells subjected to 90 stop/start events or cycles. The top row depicts cells with a serrated ribbed separator according to an exemplary embodiment. The bottom row depicts cells having a conventional solid ribbed separator where such solid ribs run vertically along the separator.

In various embodiments described herein, a separator is employed that enhances electrolyte mixing and/or circulation in a flooded lead-acid battery. In certain embodiments, a separator is employed that reduces acid stratification. In various embodiments, a lead acid battery is disclosed in which acid stratification is greatly reduced compared with a known battery because of an improved or enhanced separator or separator system for acid mixing and for preventing, or at least reducing acid stratification and the negative effects of acid stratification. Such batteries may, for example, be used in vehicles with batteries that are in motion. And in various embodiments, the motion of the vehicle (for example, an electric vehicle or partially electric vehicle containing a start/stop lead-acid battery) for actually mixing the acid or electrolyte, combined with the enhanced battery separator described herein, results unexpectedly in the significant reduction in acid stratification shown herein as well as the significant improvement in acid mixing shown herein, within a start/stop flooded lead-acid battery and/or an enhanced flooded lead-acid battery or battery operating in an enhanced mode. For instance, the stopping and starting of the start/stop electric vehicle is providing the energy in various embodiments herein to mix the acid/electrolyte within the enhanced flooded lead-acid batteries and to improve acid mixing and reduce or altogether prevent acid stratification.

Exemplary embodiments of separators (preferably enhanced acid mixing separators, leaves, sleeves, wraps, pockets, or envelopes) described herein are preferably made of a porous membrane (such as a microporous membrane having pores less than about 1 µm, mesoporous, or a macroporous membrane having pores greater than about 1 µm, porous polymer membrane, or porous filled polymer membrane) made of suitable natural or synthetic materials, such as polyolefin, polyethylene, polypropylene, phenolic resin, polyvinyl chloride (PVC), rubber, synthetic wood pulp (SWP), glass fibers, cellulosic fibers, or combinations thereof, more preferably a microporous membrane made from thermoplastic polymers. The preferred microporous membranes may have pore diameters of about 0.1 µm (100 nm) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, PVC. The polyolefins include, for example, polyethylene, ultra-high molecular weight polyethylene (UHMWPE), and polypropylene. One preferred embodiment may include a mixture of filler (for example, silica) and UHMWPE. In general, the preferred separator may be made by mixing, in an extruder, about 30% by weight silica with about 10% by weight UHMWPE, and about 60% processing oil. The mixture may also include minor amounts of other additives or agents as is common in the separator arts (such as wetting agents, colorants, antistatic additives, similar materials, or combinations thereof) and is extruded into the shape of a flat sheet. The possibly preferred polyolefin separator can be a silica filled microporous sheet of polyolefin (with or without residual oil and one or more additives or surfactants) having serrated ribs, protrusions, embattlements, dimples, embossments, and combinations thereof on one or more of its surfaces (and which possibly preferably provides an acid mixing effect in association with electrolyte sloshing caused by vehicle movement).

The separator is preferably made of a polyolefin, such as polypropylene, ethylene-butene copolymer, and preferably polyethylene, more preferably high molecular weight polyethylene, e.g., polyethylene having a molecular weight of at least 600,000, or high density polyethylene, e.g., polyethylene having a molecular weight of at least 500,000. In some embodiments, one or more ultra-high molecular weight polyethylenes are used, e.g., polyethylene having a molecular weight of at least 1,000,000, in particular more than 4,000,000, and in some instances 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the separator is made up of an ultrahigh molecular weight polyethylene (UHMWPE) mixed with a processing oil and silica, for example, precipitated silica and/or fumed silica. In accordance with at least one other embodiment, the separator is made up of an ultrahigh molecular weight polyethylene (UHMWPE) mixed with a processing oil, additive and silica, for example, precipitated silica. The separator preferably comprises a homogeneous mixture of 8-100% by volume of polyolefin, 0-40% by volume of a plasticizer and 0-92% by volume of an inert filler material. In some instances, the preferred filler is dry, finely divided silica. However, the filler may be selected from the group consisting of: silica, mica, montmorillonite, kaolinite, asbestos, talc, diatomaceous earth, vermiculite, natural and synthetic zeolites, cement, calcium silicate, clay, aluminum silicate, sodium aluminum silicate, aluminum polysilicate, alumina silica gels, glass particles, carbon black, activated carbon, carbon fibers, charcoal, graphite, titanium oxide, iron oxide, copper oxide, zinc oxide, lead oxide, tungsten, antimony oxide, zirconia, magnesia, alumina, molybdenum disulfide, zinc sulfide, barium sulfate, strontium sulfate, calcium carbonate, magnesium carbonate, and the like, and various combinations thereof.

The preferred plasticizer is petroleum oil, a wax, or a combination thereof. Since the plasticizer is the component which is easiest to remove from the polymer-filler-plasticizer composition, it is useful in imparting porosity to the battery separator. Pores may also be formed by other processes or materials, such as by removing particles.

The separator has an average pore size of less than 5 µm, preferably less than 1 µm in diameter. Preferably more than 50% of the pores are 0.5 µm or less in diameter. It may be preferred that at least 90% of the pores have a diameter of less than 0.9 µm. The microporous separator preferably has an average pore size within the range of 0.05-0.9 µm, in some instances, 0.1-0.3 µm.

The pore size may be measured, in some instances, using the mercury intrusion method described in Ritter, H. L., and Drake, L. C., Ind. Eng. Chem. Anal. Ed., 17, 787 (1945). According to this method, mercury is forced into different sized pores by varying the pressure exerted on the mercury by means of a porosimeter (porosimeter model 2000, Carlo Erba). The pore distribution may be determined by evaluation of the crude data with the MILESTONE 200 software.

The thickness of the separator is preferably greater than 0.1 mm and less than or equal to 5.0 mm. The thickness of the separator can be within the range of 0.15-2.5 mm, 0.25-2.25 mm, 0.5-2.0 mm, 0.5-1.5 mm, or 0.75-1.5 mm (where such thicknesses take into account the thickness of the whole separator including any rib, protrusion, dimple, etc.). In some instances, the separator can be approximately 0.8 mm or 1.1 mm thick. The separator may or may not have a laminate or some other layer (for example, a nonwoven layer and/or an AGM layer) adhered to one or more of its surfaces. Also, one or both electrodes may be wrapped with one or more glass mats or layers of glass fibers, and/or with a porous plate wrap.

In various possibly preferred embodiments, the microporous polyolefin separator layer contains ribs, such as serrated, embattlemented, angled ribs, or broken ribs, or combinations thereof. The preferred ribs may be 8 µm to 1 mm tall and may be spaced 1 µm to 20 mm apart, while the preferred backweb thickness of the microporous polyolefin separator layer (not including the ribs or embossments) may be about 0.05 mm to about 0.50 mm (for instance, in certain embodiments, about 0.25 mm). For example, the ribs can be 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.25 mm, 2.5 mm, 2.75 mm, 3 mm, 4 mm, 5 mm, 6 mm, 7 mm, 8 mm, 9 mm, or 10 mm apart. In some embodiments, the ribs may be in a pattern such as they may be on one side of the separator layer or on both sides of the polyolefin separator, from 0°-90° in relation to each other. In some embodiments, the acid mixing ribs may be front, positive or positive side ribs. Various patterns including ribs on both sides of the separator or separator layer may include positive ribs and negative longitudinal or cross-ribs on the second side or back of the separator, such as smaller, more closely spaced negative longitudinal or cross-ribs or mini-ribs. Such negative longitudinal or cross-ribs may, in some instances, be about 0.025 mm to about 0.1 mm in height, and preferably about 0.075 mm in height, but may be as large as 0.25 mm. Other patterns may include ribs on both sides of the separator layer with negative mini-ribs on the second side or back of the separator (mini-ribs that extend in the same direction, versus a cross-direction, compared with the major ribs on the other side of the separator). Such negative mini-ribs may, in some instances, be about 0.025 mm to about 0.25 mm in height, and preferably be about 0.050 mm to about 0.125 in height.

The ribs may be serrated in certain preferred embodiments. The serrations may have an average tip length of from about 0.05 mm to about 1 mm. For example, the average tip length can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The serrations may have an average base length of from about 0.05 mm to about 1 mm. For example, the average base length can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

If serrations are present, they may have an average height of from about 0.05 mm to about 4 mm. For example, the average height can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm. For embodiments in which the serration height is the same as the rib height, the serrated ribs may also be referred to as protrusions. Such ranges may apply to separators for industrial traction-type start/stop batteries, where the total thickness of the separator may typically be about 1 mm to about 4 mm, as well as automotive start/stop batteries, where the total thickness of the separator may be a little less (e.g., typically about 0.3 mm to about 1 mm).

The serrations can have an average center-to-center pitch of from about 0.1 mm to about 50 mm. For example, the average center-to-center pitch can be greater than or equal to about 0.2 mm, 0.3 mm, 0.4 mm, 0.5 mm, 0.6 mm, 0.7 mm, 0.8 mm, 0.9 mm, 1.0 mm, 1.25 mm, or 1.5 mm; and/or less than or equal to about 1.5 mm, 1.25 mm, 1.0 mm, 0.9 mm, 0.8 mm, 0.7 mm, 0.6 mm, 0.5 mm, 0.4 mm, 0.3 mm, or 0.2 mm.

The serrations can have an average height to base width ratio of from about 0.1:1 to about 500:1. For example, the average height to base width ratio can be greater than or equal to about 0.1:1, 25:1, 50:1, 100:1, 150:1, 200:1, 250:1, 300:1, 350:1, or 450:1; and/or less than or equal to about 500:1, 450:1, 400:1, 350:1, 300:1, 250:1, 200:1, 150:1, 100:1, 50:1, or 25:1.

The serrations can have average base width to tip width ratio of from about 1000:1 to about 0.1:1. For example, the average base width to tip width ratio can be greater than or equal to about 0.1:1, 1:1, 2:1, 3:1, 4:1, 5:1, 6:1, 7:1, 8:1, 9:1, 10:1, 15:1, 20:1, 25:1, 50:1, 100:1, 150:1, 200:1, 250:1, 300:1, 350:1, 450:1, 500:1, 550:1, 600:1, 650:1, 700:1, 750:1, 800:1, 850:1, 900:1, 950:1, and/or less than or equal to about 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 50:1, 25:1, 20:1, 15:1, 10:1, 9:1, 8:1, 7:1, 6:1, 5:1, 4:1, 3:1, 2:1, or 1:1.

In some embodiments, the separator can be dimpled. Dimples are typically protrusion-type features or nubs on one or more surfaces of the separator. The thickness of the dimples can be from 1-99% the thickness of the separator. For example, the average thickness of the dimples can be less than about 95%, 90%, 85%, 80%, 75%, 70%, 65%, 60%, 55%, 50%, 45%, 40%, 35%, 30%, 25%, 20%, 15%, 10%, or 5% that of the separator. Dimples may be arranged in rows along the separator. The rows or lines may be spaced about 1 µm to about 10 mm apart. For example, the rows can be about 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.25 mm, 2.5 mm, 2.75 mm, 3 mm, 4 mm, 5 mm, 6 mm, 7 mm, 8 mm, 9 mm, or 10 mm apart. Conversely, the dimples may be arranged in a random array or random manner.

The dimples may have an average dimple length of from about 0.05 mm to about 1 mm. For example, the average dimple length can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

The dimples may have an average dimple width of from about 0.01 mm to about 1.0 mm. For example, the average dimple width can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

The dimples can have an average center-to-center pitch of from about 0.10 mm to about 50 mm. For example, the average center-to-center pitch can be greater than or equal to about 0.2 mm, 0.3 mm, 0.4 mm, 0.5 mm, 0.6 mm, 0.7 mm, 0.8 mm, 0.9 mm, 1.0 mm, 1.25 mm, or 1.5 mm; and/or less than or equal to about 1.5 mm, 1.25 mm, 1.0 mm, 0.9 mm, 0.8 mm, 0.7 mm, 0.6 mm, 0.5 mm, 0.4 mm, 0.3 mm, or 0.2 mm.

The dimples can be quadrangular in shape, for instance, square and rectangles. The dimples can have an average dimple length to dimple width ratio of from about 0.1:1 to about 100:1. For example, the average length to base width ratio can be greater than or equal to about 0.1:1, 1:1, 2:1, 3:1, 4:1, 5:1, 6:1, 7:1, 8:1, 9:1, 10:1, 15:1, 20:1, 25:1, 50:1, 100:1, 150:1, 200:1, 250:1, 300:1, 350:1, 450:1, 500:1, 550:1, 600:1, 650:1, 700:1, 750:1, 800:1, 850:1, 900:1, 950:1, and/or less than or equal to about 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 50:1, 25:1, 20:1, 15:1, 10:1, 9:1, 8:1, 7:1, 6:1, 5:1, 4:1, 3:1, 2:1, or 1:1.

In some embodiments, the dimples can be substantially circular. Circular dimples can have a diameter from about 0.05 to about 1.0 mm. For example, the average dimple diameter can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

Various other shapes for the dimples may be included as well. By way of example only, such dimples might be triangular, pentagonal, hexagonal, heptagonal, octagonal, oval, elliptical, and combinations thereof.

In some embodiments, the separator can feature a combination of ribs, serrations, dimples, or combinations thereof. For instance, a separator can have a series of serrated ribs running top to bottom along the separator, and a second series of serrated ribs running horizontally along the separator. In other embodiments, the separator can have an alternating sequence of serrated ribs, dimples, continuous, interrupted, or broken solid ribs, or combinations thereof.

Table 1 includes several specific embodiments of separators, presented by way of example only and not meant to be limiting, having serrations and/or dimples and various parameters that may be used in forming such separators so as to prevent acid stratification and enhance acid mixing with a flooded lead-acid battery (sometimes referred to as an enhanced flooded battery).

TABLE 1

| Separator Samples | Backweb thickness (mm) | Separator Thickness with rib (mm) | Spacing between ribs (mm) | Negative side ribs Profile (mm) | Serrated Rib and/or Dimple Features |
|---|---|---|---|---|---|
| Serrated separator profile | 0.25 | 0.85 | 7 | N/A | 0.75 tall; 2.5 mm spacing between serrations in a single row |
| Serrated separator profile 2 | 0.25 | 1.0 | 11 | 0.075 | 1 mm spacing between serrations in a single row. |
| Large Dimple separator profile | 0.25 | 1.0 | N/A | N/A | 12.3 mm spacing in one or more directions; 18 mm spacing in one or more directions. |
| Small Dimple separator profile | 0.25 | 0.7 | N/A | N/A | 9 mm spacing in one or more directions; 5 mm spacing in one or more directions. |

The separators disclosed herein preferably provide enhanced electrolyte mixing and/or acid circulation compared with conventional separators. In certain embodiments, the separators provide for less acid stratification, as measured by electrolyte density at the top and bottom of the cell. The density differential may be less than 50%, 45%, 40%, 35%, 30%, 25%, 20%, 15%, 10%, 5%, 2.5%, or 1%, after the cell has undergone 30, 60, 90 or more start/stop events or cycles. In certain selected embodiments, the density differential may be less than 50%, 45%, 40%, 35%, 30%, 25%, 20%, 15%, 10%, 5%, 2.5%, or 1%, after the cell has remained still for 24, 48, 72, or more hours.

In some embodiments, the improved separator may include a coating on one or both sides. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss.

The separator used in various embodiments herein may be provided with one or more additives. Such is the case because additives may enhance separators for certain stop/start flooded lead-acid batteries for certain vehicles. One such additive that may be present in the polyolefin is a surfactant, while another such additive may include one or more latex additives. Suitable surfactants include surfactants such as salts of alkyl sulfates; alkylarylsulfonate salts; alkylphenol-alkylene oxide addition products; soaps; alkyl-naphthalene-sulfonate salts; dialkyl esters of sulfo-succinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated fatty alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive can be represented by a compound of:

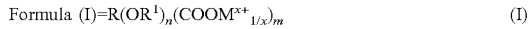

$$\text{Formula (I)} = R(OR^1)_n(COOM^{x+}{}_{1/x})_m \qquad (I)$$

in which:
R is a non-aromatic hydrocarbon radical with 10 to 4200 carbon atoms, preferably 13 to 4200, which can be interrupted by oxygen atoms;
R1 is H, —(CH2)kCOOMx+1/x or —(CH2)k-SO3MX+1/X, preferably H, where k=1 or 2;
M is an alkali metal or alkaline-earth metal ion, H+ or NH4+, where not all the variables M simultaneously have the meaning H+;
n=0 or 1;
m=0 or an integer from 10 to 1400; and
x=1 or 2, in which the ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

The use of the compounds of Formula (I) for the production of an additive for various battery separators described herein may also provide such separators with effective protection against oxidative destruction. In some embodiments, battery separators are preferred which include an additive containing a compound according to Formula (I) in which:
R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2$—[$(OC_2H_4)_p(OC_3H_6)_q$]—, in which
$R^2$ is an alkyl radical with 10 to 30 carbon atoms, preferably 12 to 25, particularly preferably 14 to 20 carbon atoms;
P is an integer from 0 to 30, preferably 0 to 10, particularly preferably 0 to 4;
q is an integer from 0 to 30, preferably 0 to 10, particularly preferably 0 to 4; and
compounds being particularly preferred in which the sum of p and q=0 to 10, in particular 0 to 4; and
n=1; and
m=0.

Formula $R^2—[(OC_2H_4)_p(OC_3H_6)_q]—$ is to be understood as also including those compounds in which the sequence of the groups in square brackets differs from that shown. For example according to the disclosure, compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)CH_2$ and/or $OCH_2CH(CH_3)$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only partially, soluble in water and sulphuric acid have proved to be particularly advantageous.

Also preferred are additives which contain a compound according to Formula (I), in which:
  R is an alkane radical with 20 to 4200, preferably 50 to 750 and quite particularly preferably 80 to 225 carbon atoms;
  M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$;
  N=0;
  m is an integer from 10 to 1400; and
  x=1 or 2.

As suitable additives there may be mentioned here in particular polyacrylic acids, polymethacrylic acids and acrylic acid-methacrylic acid copolymers, whose acid groups are at least partly, e.g. preferably 40%, particularly preferably 80%, neutralized. The percentage refers to the number of acid groups. Quite particularly preferred are poly(meth)acrylic acids which are present entirely in the salt form. By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40 wt.-%, preferably at least 80 wt.-% (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable.

The microporous polyolefin can be provided in various ways with the additive or additives. The additives can for example be applied to the polyolefin when it is finished (e.g. after the extraction) or added to the mixture used to produce the polyolefin. According to a preferred embodiment the additive or a solution of the additive is applied to the surface of the polyolefin. This variant is suitable in particular for the application of non-thermostable additives and additives which are soluble in the solvent used for the subsequent extraction. Particularly suitable as solvents for the additives according to the present disclosure are low-molecular-weight alcohols, such as methanol and ethanol, as well as mixtures of these alcohols with water. The application can take place on the side facing the negative electrode, the side facing the positive electrode or on both sides of the separator.

The additive can be present at a density of at least 0.5 g/m², 1.0 g/m², 1.5 g/m², 2.0 g/m², 2.5 g/m², 3.0 g/m², 3.5 g/m², 4.0 g/m², 4.5 g/m², 5.0 g/m², 5.5 g/m², 6.0 g/m², 6.5 g/m², 7.0 g/m², 7.5 g/m², 8.0 g/m², 8.5 g/m², 9.0 g/m², 9.5 g/m² or 10.0 g/m². The additive can be present on the separator at a density between 0.5-10 g/m², 1.0-10.0 g/m², 1.5-10.0 g/m², 2.0-10.0 g/m², 2.5-10.0 g/m², 3.0-10.0 g/m², 3.5-10.0 g/m², 4.0-10.0 g/m², 4.5-10.0 g/m², 5.0-10.0 g/m², 5.5-10.0 g/m², 6.0-10.0 g/m², 6.5-10.0 g/m², 7.0-10.0 g/m², 7.5-10.0 g/m², 5.0-10.5 g/m², 5.0-11.0 g/m², 5.0-12.0 g/m², or 5.0-15.0 g/m².

The application may take place by, roller coating or dipping the polyolefin in the additive or a solution of the additive and subsequently optionally removing the solvent (e.g., by drying). The application may also be performed in any other known manner. In this way the application of the additive can be combined for example with the extraction often applied during polyolefin production.

The following photographic examples in FIGS. 1-7B incorporate an acid-based electrolyte with red dye contained within the acid to visually represent the electrolyte with the higher acid density and lower pH level and differentiate it with the lower acid density and higher pH level.

Referring now to FIG. 1, there is shown a series of photographs comparing cells with a serrated or embattlemented ribbed separator according to an exemplary embodiment (top row) with cells having a conventional solid ribbed separator (bottom row) where such solid ribs run vertically along the separator. Spacing between the embattlement ribs (rib tip to rib tip) for separators shown in the top row was approximately 11 mm. FIG. 1 shows the side of the battery separator that would typically face the positive electrode in the flooded lead-acid battery, such as a flooded lead-acid battery in a partial state of charge. However, such ribs may alternatively face the negative electrode or may be included on both sides of the separator (e.g., may also be included on the side of the separator designed to face the negative electrode in the flooded lead-acid battery). The cells shown in FIG. 1 were subjected to 90 start/stop events or cycles with the separators and enveloped electrodes being parallel to the direction of motion. As shown in FIG. 1, cells having serrated ribbed separators exhibit substantially less acid stratification than cells having conventional separators, after 30, 60, and 90 start/stop cycles or events.

Figure 2:
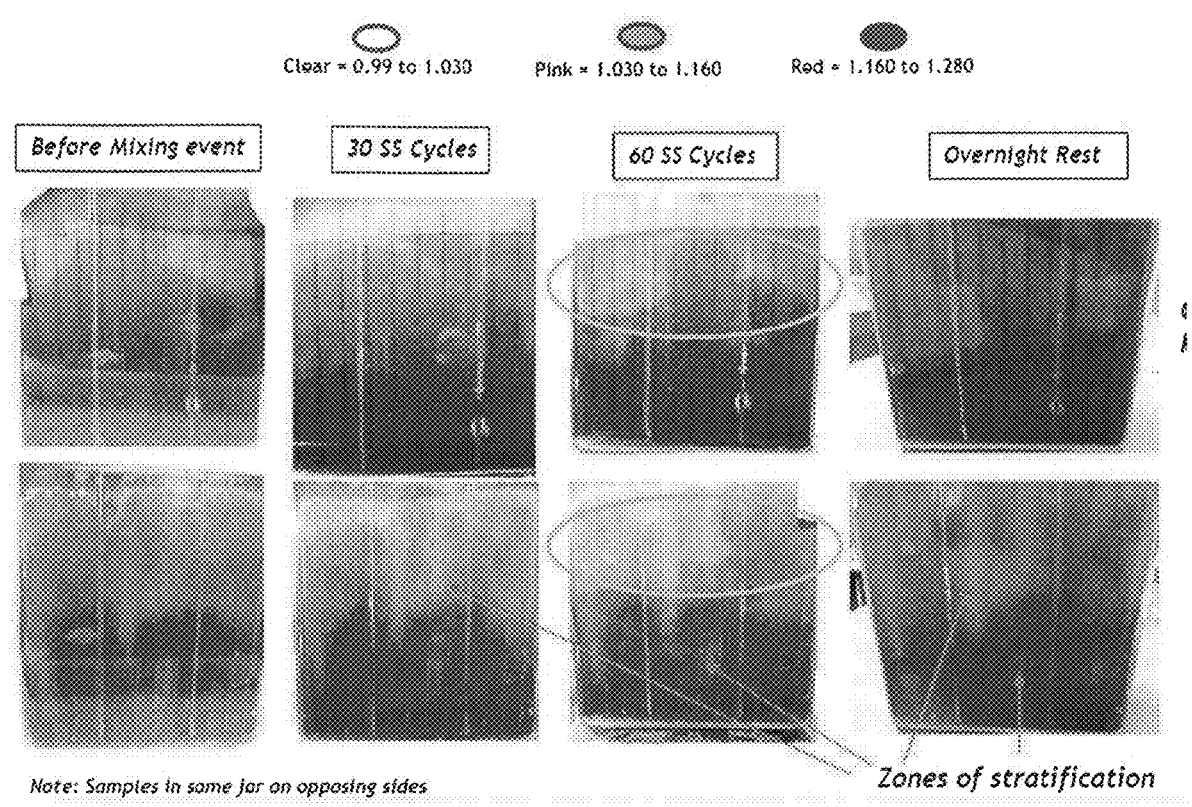
FIG. 2 includes a series of photographs comparing cells subjected to 60 stop/start events or cycles, followed by an overnight rest. The test cells are provided with separators that are similar to those shown in FIG. 1 with the top row showing a serrated ribbed separator according to exemplary embodiments, and the bottom row showing cells having a conventional solid ribbed separator.

Referring now to FIG. 2, there is shown a series of photographs comparing the same type of cells as those shown in FIG. 1. The cells were subjected to 60 start/stop events or cycles while in a vehicle traveling 25 miles an hour, followed by an overnight rest. The top row shows cells with a serrated ribbed separator according to exemplary embodiments, while the bottom row shows cells having a conventional solid ribbed conventional separator. As shown in FIG. 2, cells having serrated ribbed separators exhibit substantially less acid stratification than cells having conventional separators. Such testing validated the lab findings shown in the photographs of FIG. 1.

Figure 3:
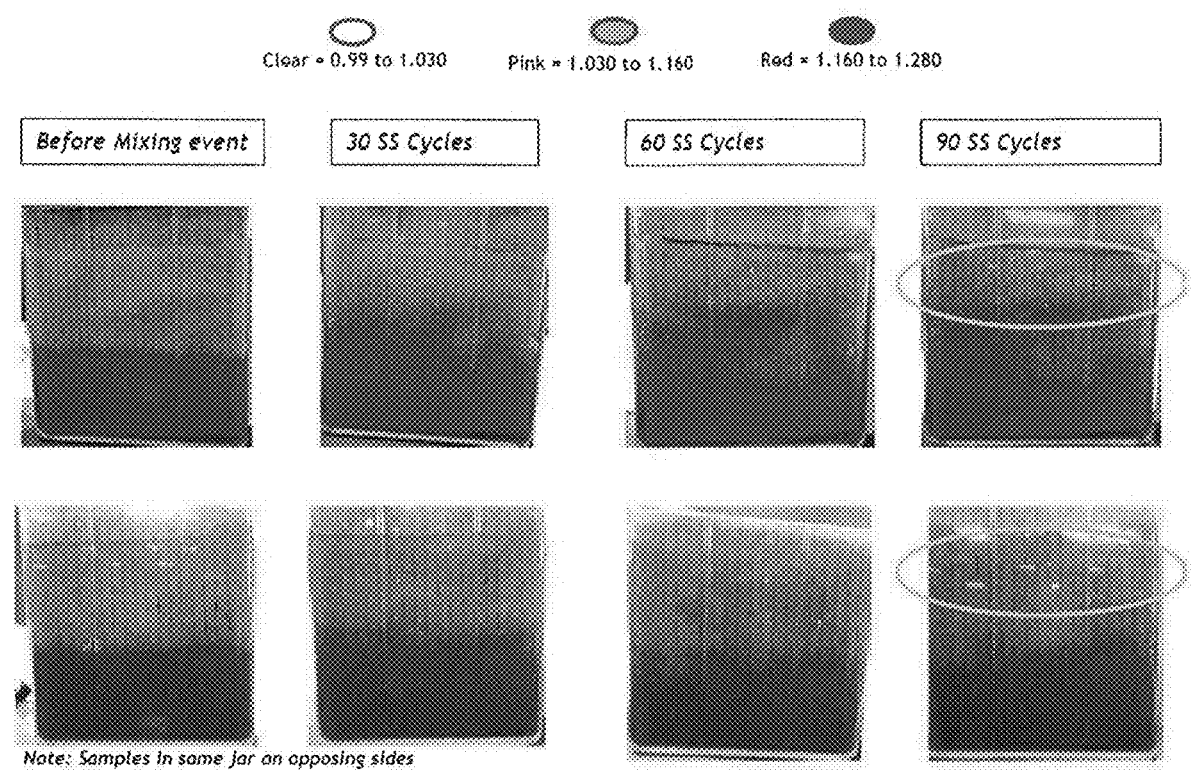
FIG. 3 includes a series of photographs comparing cells subjected to 90 stop/start events or cycles. The test cells in the top row are provided with separators having more closely spaced serrated ribs as compared to those shown in FIGS. 1 and 2. The bottom row is provided with cells having a conventional solid ribbed separator, where the solid ribs are vertical along the separator.

Moving now to FIG. 3, cells with a closer spacing serrated ribbed separator according to exemplary embodiments (top row) were compared with cells having a conventional solid ribbed separator (bottom row) where the solid ribs are vertical along the separator. Spacing between embattlement ribs for separators shown in the top row was approximately 7 mm. The cells were subjected to 90 start/stop events or cycles. As shown in FIG. 3, cells having serrated ribbed separators exhibit substantially less acid stratification than cells having conventional separators, after 30, 60, and 90 start/stop cycles or events.

Figure 4:
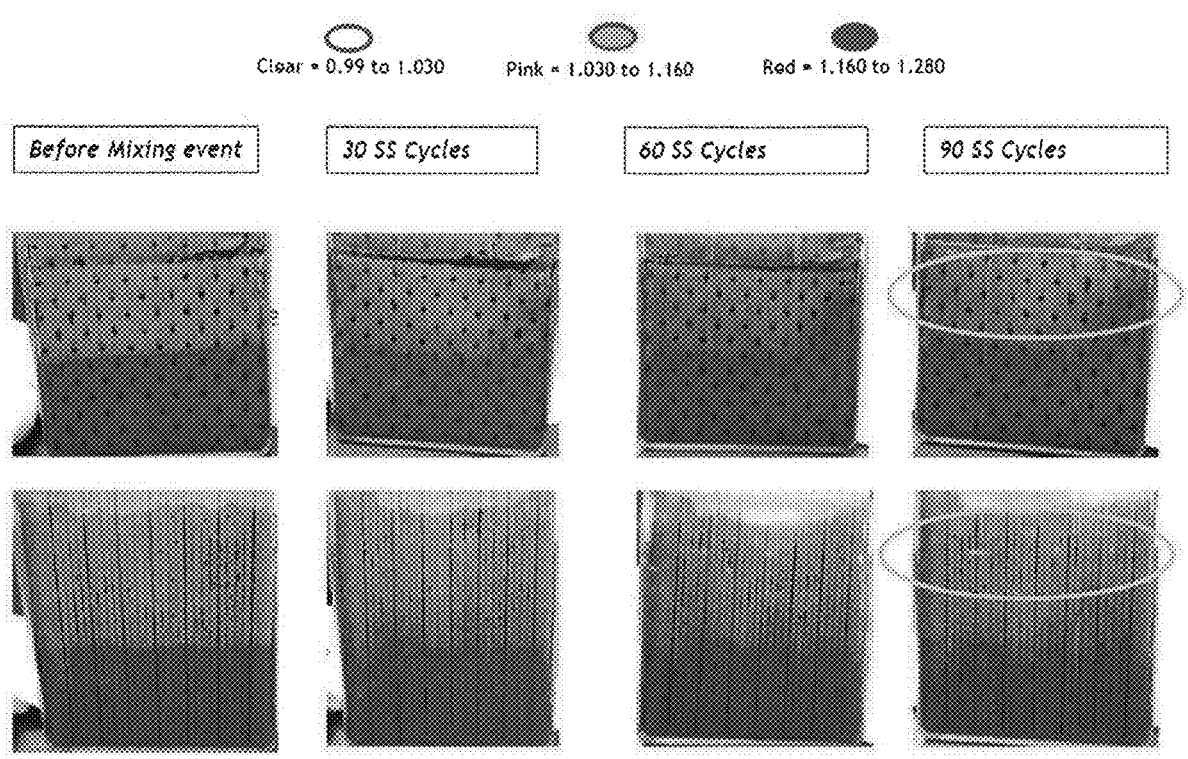
FIG. 4 includes a series of photographs comparing cells subjected to 90 stop/start events or cycles. The top row depicts cells with a dimpled separator according to exemplary embodiments. The bottom row depicts cells having a conventional separator that includes solid large and solid small ribs, where such large and small solid ribs run vertically along the separator.

Referring now to FIG. 4, a series of photographs depicts a comparison of cells with a dimpled separator according to exemplary embodiments (top row) with cells having a conventional separator that includes solid large and solid small ribs (bottom row) where such large and small solid ribs run vertically along the separator. The cells were subjected to 90 start/stop events or cycles. As shown in FIG. 4, cells having dimpled separators exhibit substantially less acid stratification than cells having conventional separators, after 30, 60, and 90 start/stop cycles or events. Thus, the solid ribs shown, for example, in the bottom row of the photographs in FIG. 4, actually inhibit acid mixing for the separator within an idle start/stop lead-acid battery.

Figure 5:
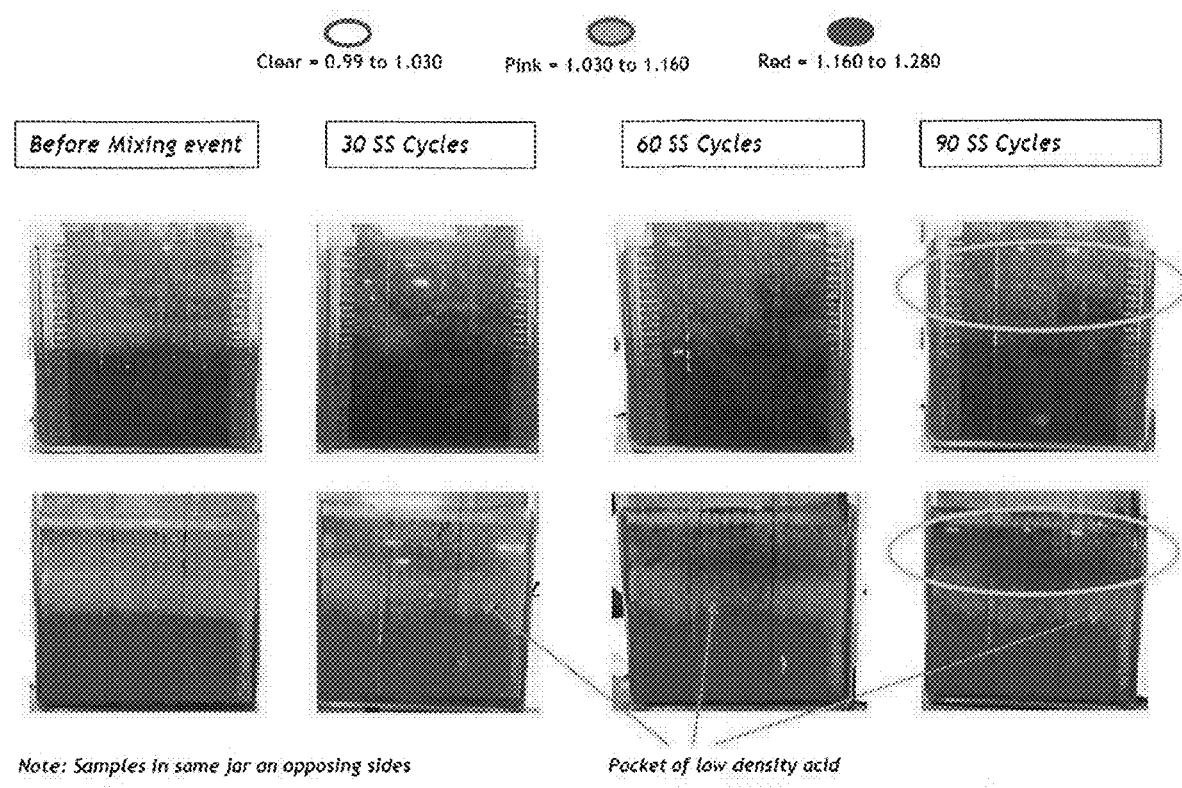
FIG. 5 includes a series of photographs comparing cells subjected to 90 stop/start events or cycles. The top row depicts cells with a dimpled separator according to exemplary embodiments. The bottom row depicts cells having a separator that includes solid ribs running vertically along the separator combined with dimples.

With reference to FIG. 5, a series of photographs depicts a comparison of cells with a dimpled separator according to exemplary embodiments (top row) with cells having a separator that includes solid ribs running vertically along the separator combined with dimples (bottom row). The cells were subjected to 90 start/stop events or cycles. As shown in FIG. 5, cells having dimpled separators (top row) exhibit less acid stratification than the start/stop lead-acid battery cells in the bottom row having separators that include the combination of the solid ribs with the dimples. However, some acid mixing is shown in the bottom row, for example, as compared with the bottom rows of photographs in FIGS. 1-4. For example, in some of the pictures in the bottom row, a distinct area or pocket of low density of acid can be seen; however acid mixing can also be seen. The bottom row of photographs proves out that a combination of serrations and solid ribs, or a combination of dimples and solid ribs, may prove to be effective in various batteries, systems, and methods according to the present disclosure.

Figure 6:
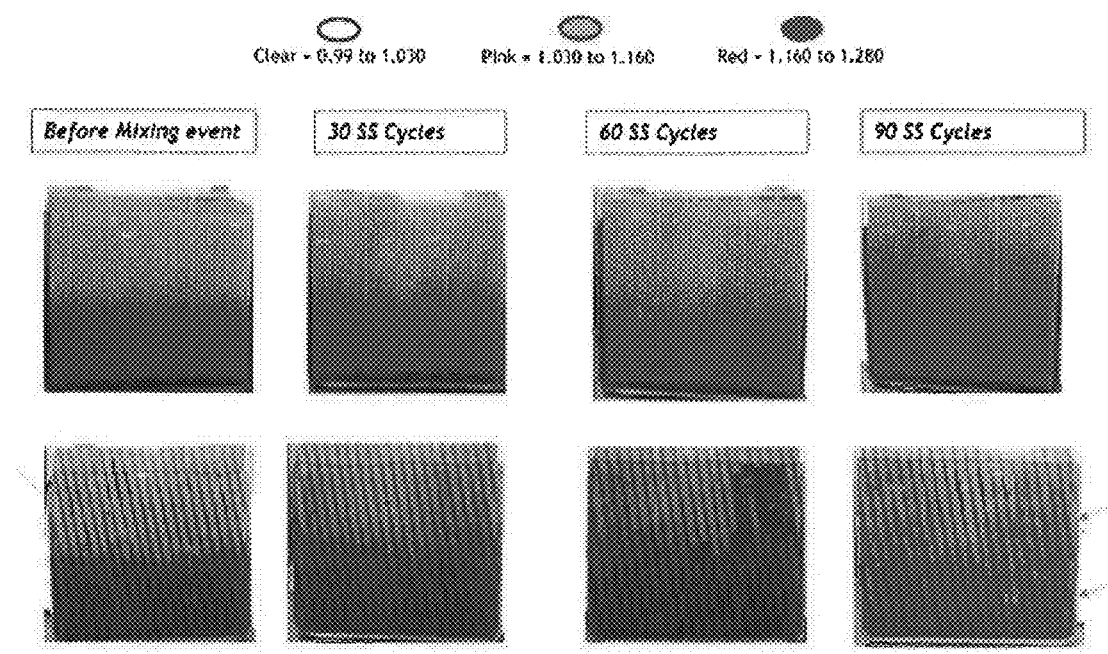
FIG. 6 includes a set of photographs comparing cells subjected to 90 stop/start events or cycles. The top row depicts cells with a dimpled separator according to exemplary embodiments, and the bottom row depicts cells having a separator that includes solid ribs running diagonally along the separator (at a slight angle relative to the vertical direction of the separator).

With reference now to FIG. 6, it includes a set of photographs comparing cells with a dimpled separator according to exemplary embodiments (top row) with cells having a separator that includes solid ribs running diagonally along the separator at a slight angle relative to the vertical direction of the separator. The cells were subjected to 90 start/stop events or cycles. As shown in FIG. 6, the cells having dimpled separators (top row) exhibit less acid stratification than the start/stop lead-acid battery cells in photos such as those shown in the bottom rows of FIGS. 1-4. With regard to the bottom row of photographs of FIG. 6, at 60 cycles or 60 start/stop events, one can see that some acid stratification still exists; however, the acid stratification improves at 90 cycles.

FIGS. 7A and 7B include photographs comparing a conventional solid rib separator (FIG. 7A) and no separator at all (FIG. 7B) in a jar filled with acid having a specific gravity of 1.28, which is mixed. FIG. 7A includes a photograph of a conventional ribbed separator; acid stratification is indicated by the concentration of red acid at the bottom of the jar and the clear liquid toward the top of the jar. FIG. 7B includes a photograph of a lead grid electrode only without any separator therein; much less acid stratification has taken place, as indicated by the red color throughout the jar. FIGS. 7A and 7B help to illustrate that a solid ribbed conventional separator may hinder acid mixing and may promote acid stratification inside a start/stop flooded lead-acid battery. Likewise, FIG. 7B provides a form of a benchmark, containing no separator, against which the various separators can be compared and contrasted.

Figure 8:
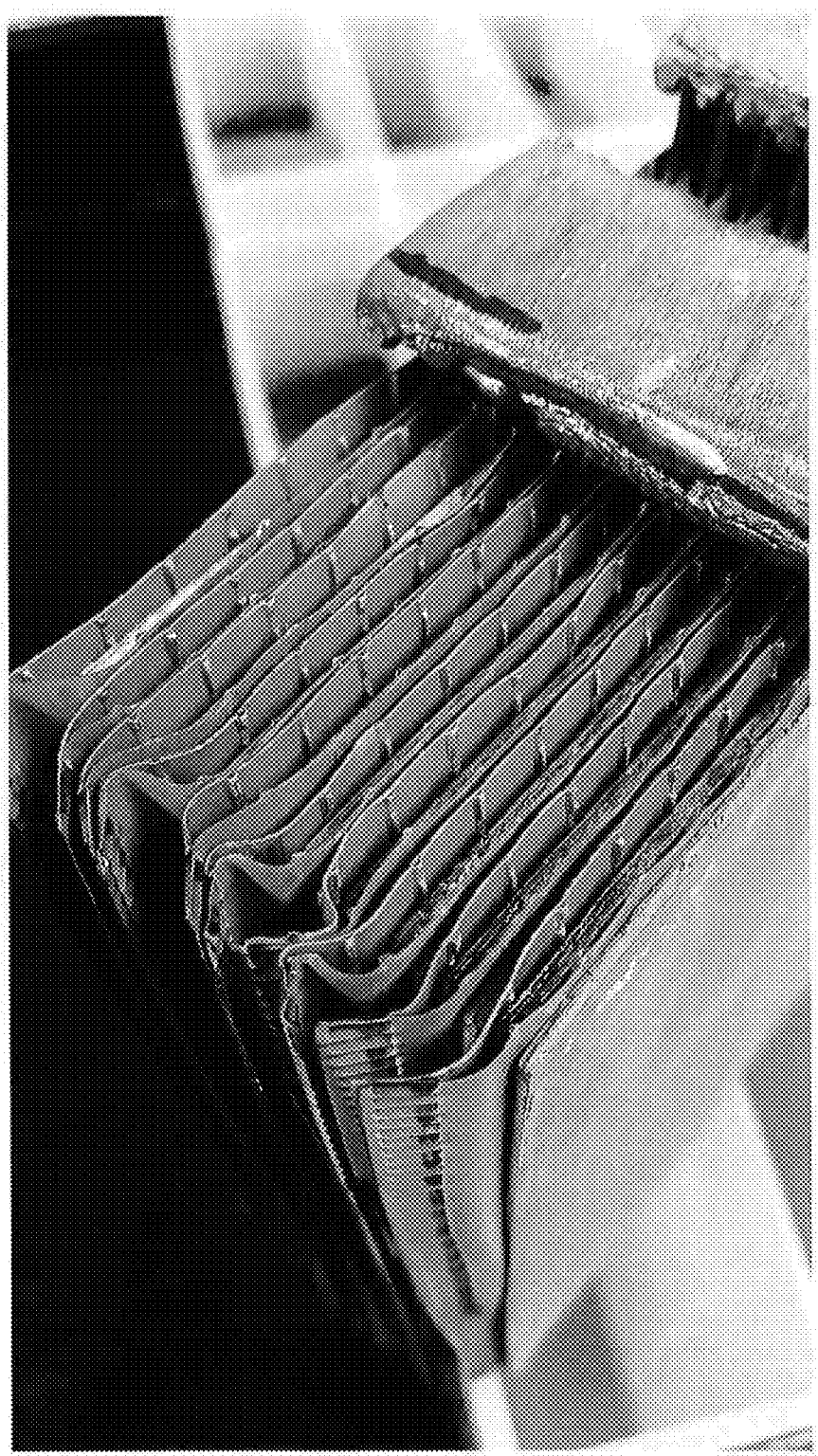
FIG. 8 includes a photograph of cells constructed using a serrated ribbed separator according to the present disclosure before testing for acid stratification.

FIG. 8 includes a photograph of cells constructed using a serrated ribbed separator according to the present disclosure before testing for acid stratification.

Figure 9:
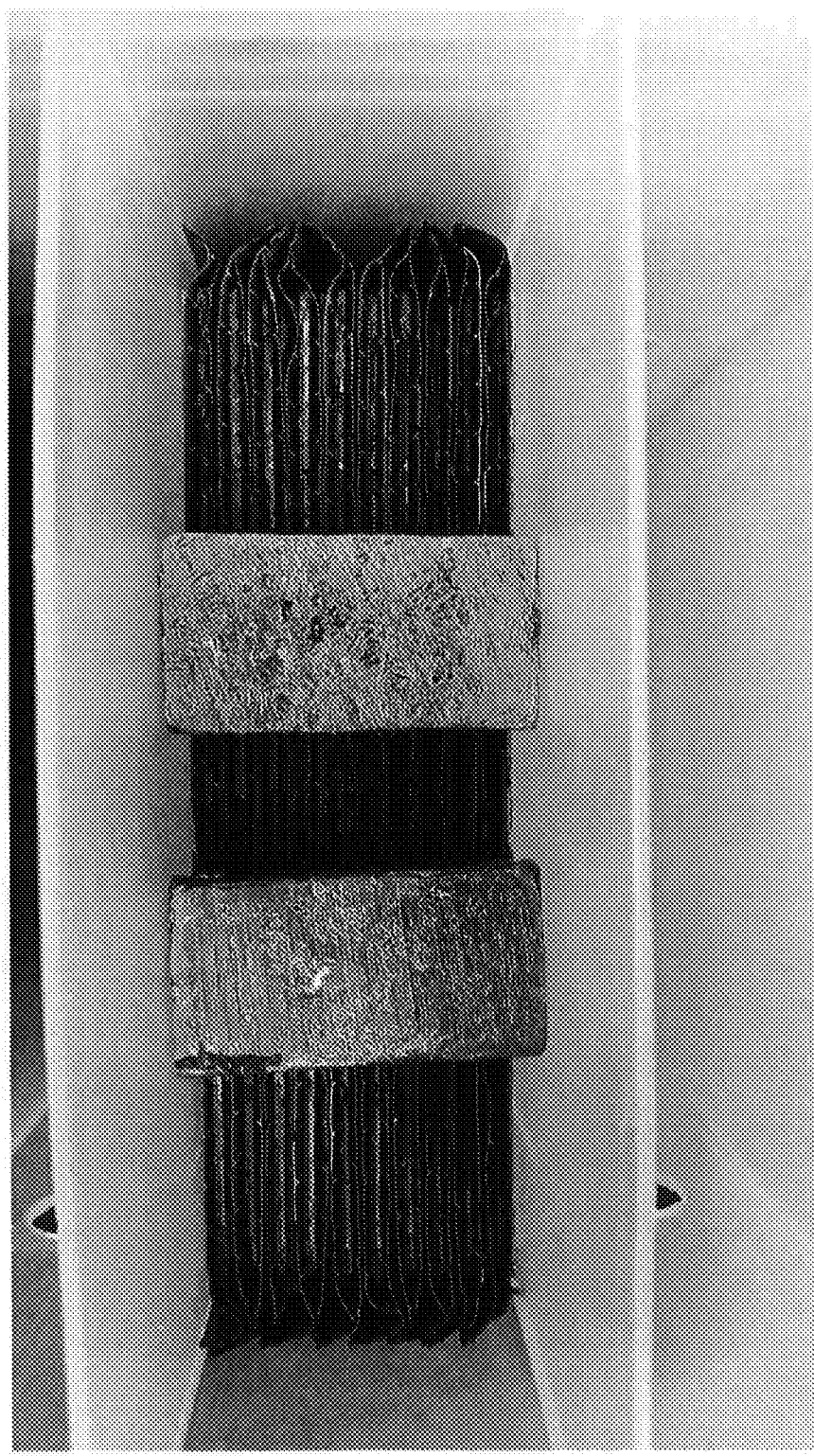
FIG. 9 includes a photograph of the cells of FIG. 8 assembled in a case for acid stratification testing. Lead straps are placed over the group of electrodes and separators.

FIG. 9 includes a photograph of the cells of FIG. 8 assembled in a case for acid stratification testing. Lead straps are placed over the group of electrodes and separators. Once acid is added to the case, the acid level may be several mm above these lead straps (in some instances, by way of example only, about 3 mm above the lead straps). As this case containing electrodes and separator is tested for acid stratification within the cell, it may be preferred in certain embodiments that the direction of motion of the testing mimic the motion of the start/stop electric vehicle. The motion therefore is substantially parallel to the plates and separators of the photograph, such that acid is moved over the face of the electrodes as the vehicle is started, accelerated, slowed, and/or stopped. FIG. 9 may also be viewed as if the top of the photograph runs toward the front bumper of an electric vehicle with start/stop capability, while the bottom of the photograph of FIG. 9 runs toward the rear bumper of the same electric vehicle, and the onlooker is looking down upon the group of electrodes, separators, and lead straps, soon to be filled with acid for acid stratification testing. In other words, the electrodes and separators are parallel with the motion created in the test.

Figure 10:
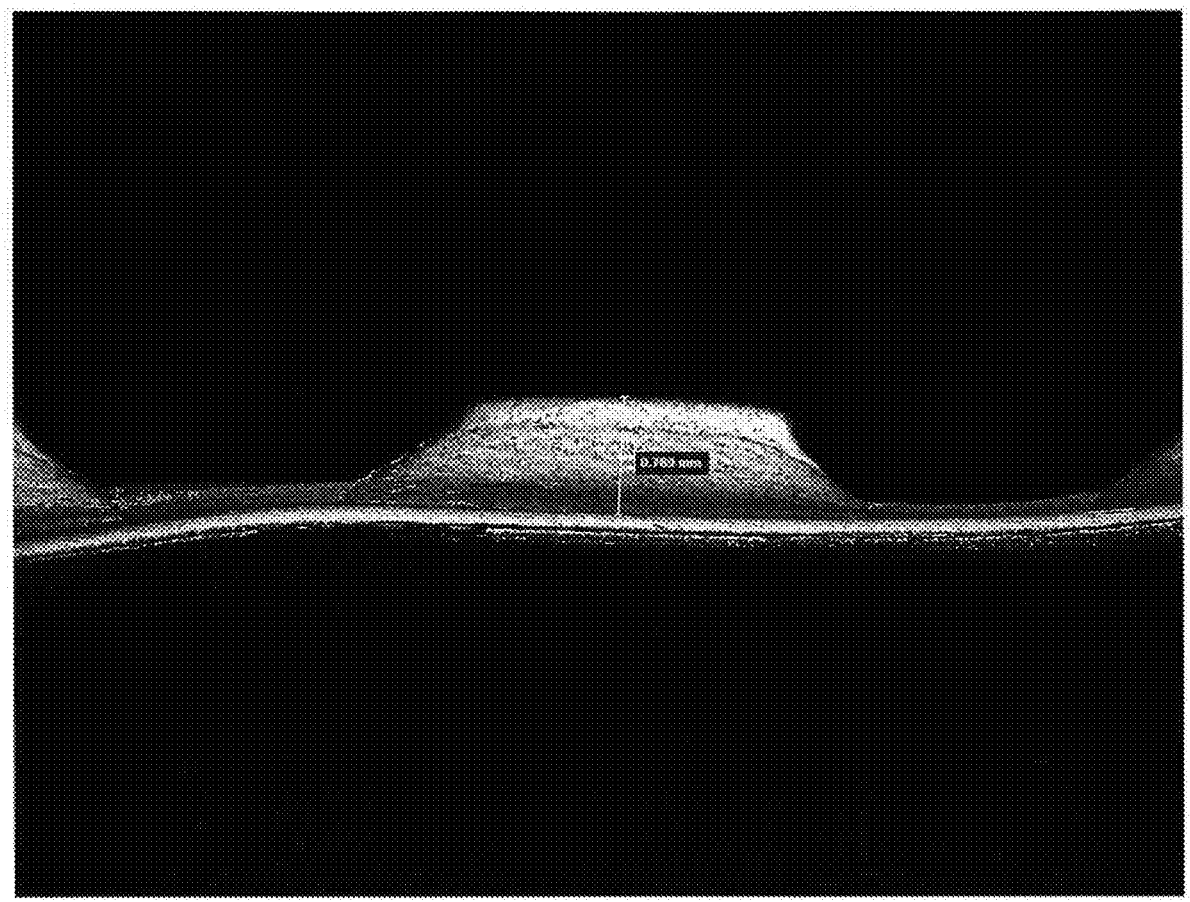
FIG. 10 includes a photograph of a cross-sectional view of a serration or a serrated rib on a separator used in accordance with various embodiments described herein.

FIG. 10 includes a photograph of a cross-sectional view of a serration or a serrated rib on a separator used in accordance with various embodiments described herein.

Figure 11:
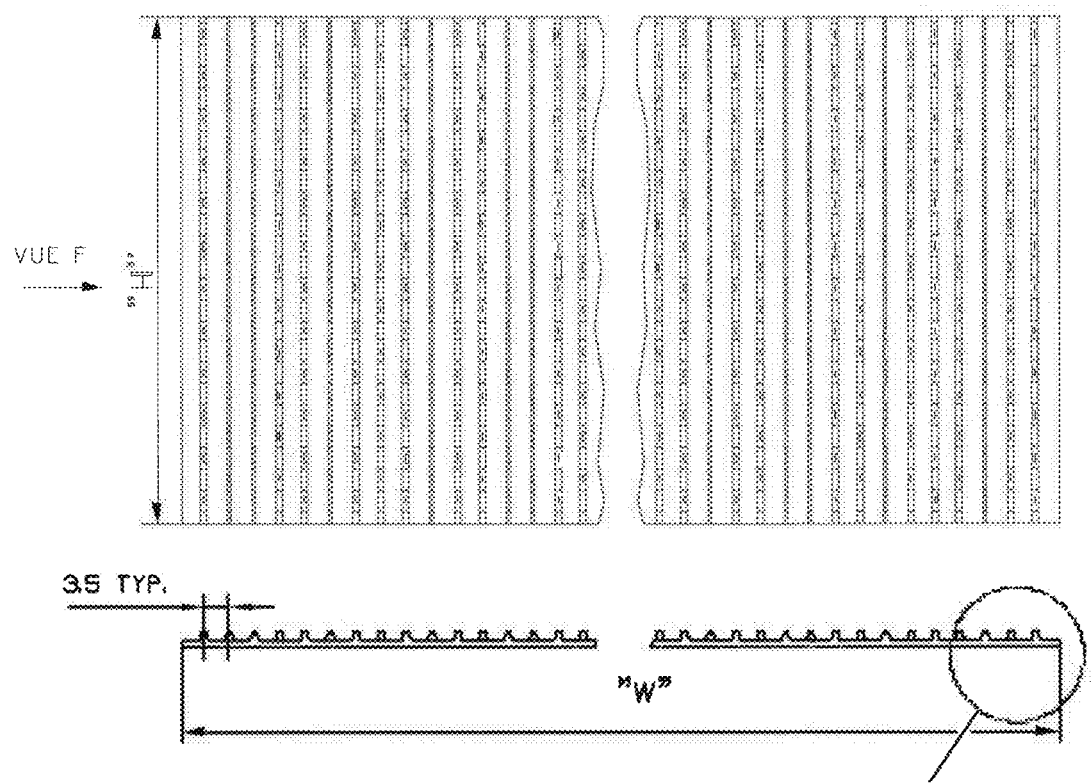
FIG. 11 includes two views of the profile of a serrated rib separator used in accordance with various embodiments described herein.

FIG. 11 includes two views of the profile of a serrated separator used in accordance with various embodiments described herein.

Figure 12:
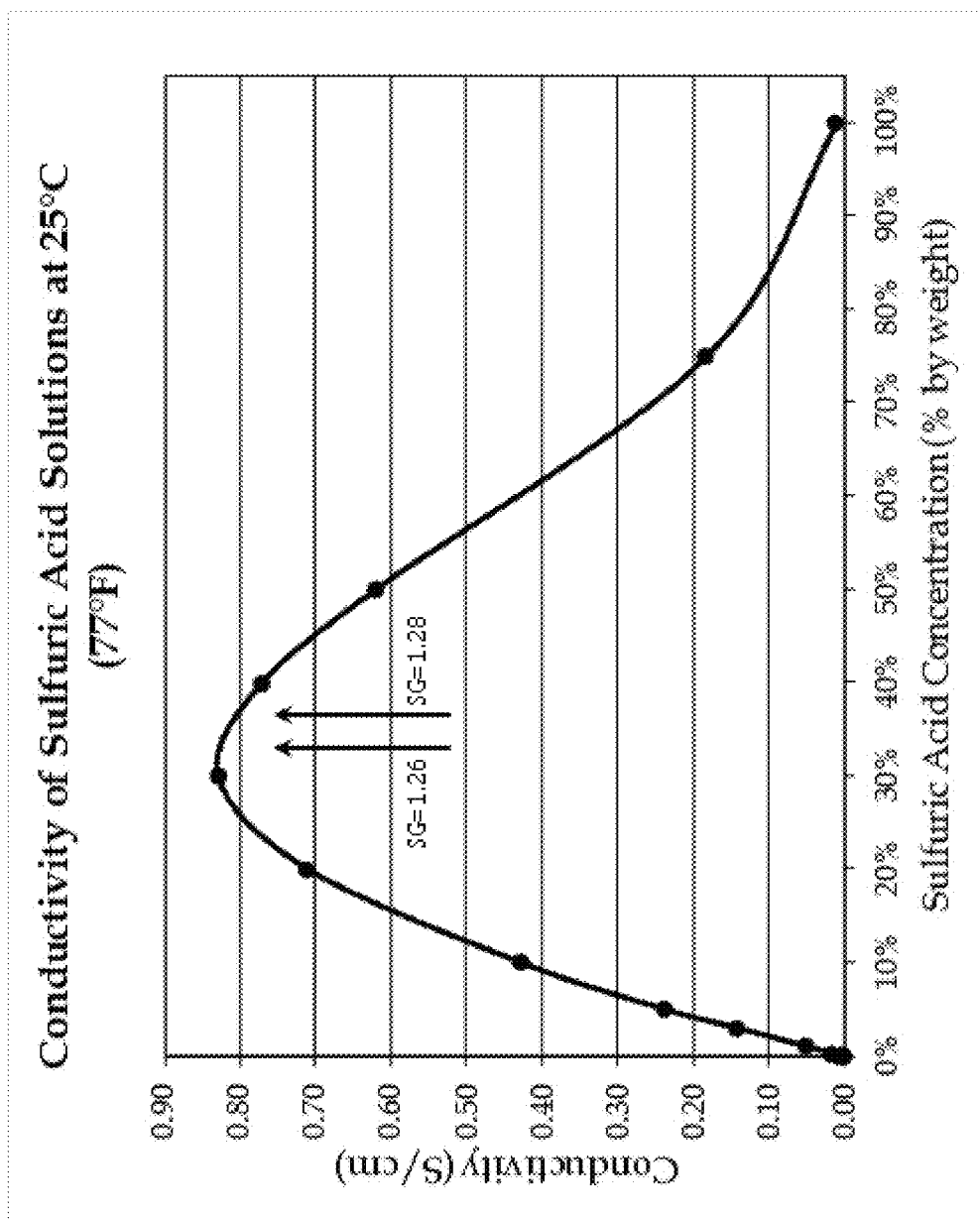
FIG. 12 depicts a graph of the conductivity of sulfuric acid solutions at 25° C. (77° F.). This graph aids in understanding that acid stratification can lead to non-uniform current due to differences in conductivity in the high and low acid regions of the cell and/or battery. The graph represents data gathered from http://myweb.wit.edu/sandinic/Research/conductivity%20v%20concentration.pdf, which was accessed on 26 Jul. 2016; wherein the conductivity is measured in siemens/centimeter and is represented as a function of the concentration of the sulfuric acid solution, as a percentage by weight.

FIG. 12 depicts a graph of the conductivity of sulfuric acid solutions at 25° C. This graph aids in understanding that acid stratification can lead to non-uniform current due to differences in conductivity in the high and low acid regions of the cell and/or battery.

Figure 13:
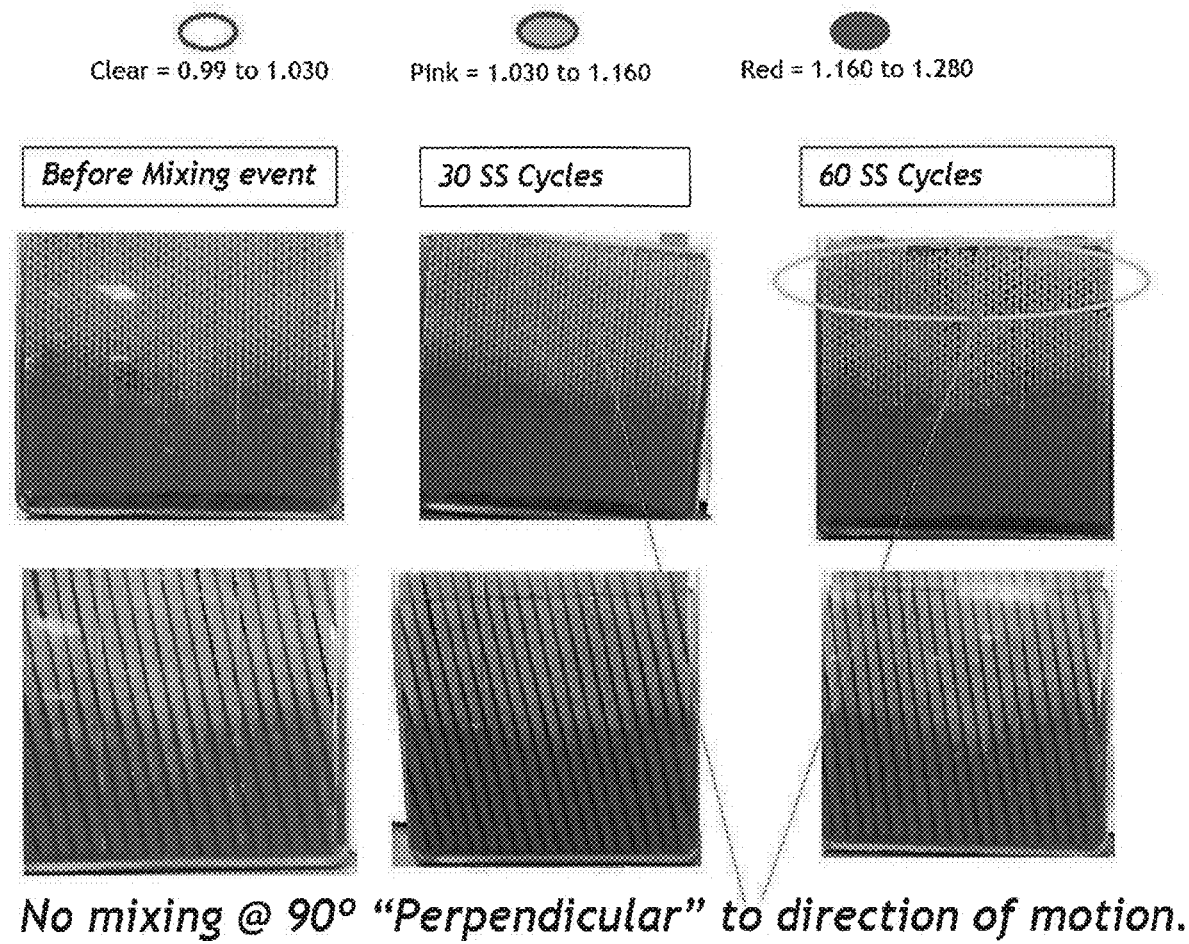
FIG. 13 includes photographs of cells constructed similarly to the cells depicted in FIG. 6. However, for the cells depicted in FIG. 13, the separator was inserted into the system perpendicular to the direction of motion of the vehicle, whereas for the cells depicted in FIG. 6, the separator was inserted into the system parallel to the direction of motion.

FIG. 13 includes photographs of cells constructed similarly to the cells depicted in FIG. 6. However, for the cells depicted in FIG. 13, the separator was inserted into the system perpendicular to the direction of motion of the vehicle. Whereas for the cells depicted in FIG. 6, the separator was inserted into the system parallel to the direction of motion, similar to the directional descriptions of FIG. 9 above. In various embodiments, it may be preferred that the separator is positioned parallel to the direction of motion for the vehicle and battery system. This is because the photographs shown in FIG. 13 reveal that acid stratification is still taking place after 60 start/stop cycles or events without good acid mixing. Using the top row of FIG. 13 as an example, even though a dimpled separator is used therein according to various embodiments of the present disclosure, acid stratification still took place and acid mixing was not optimal.

Figure 14:
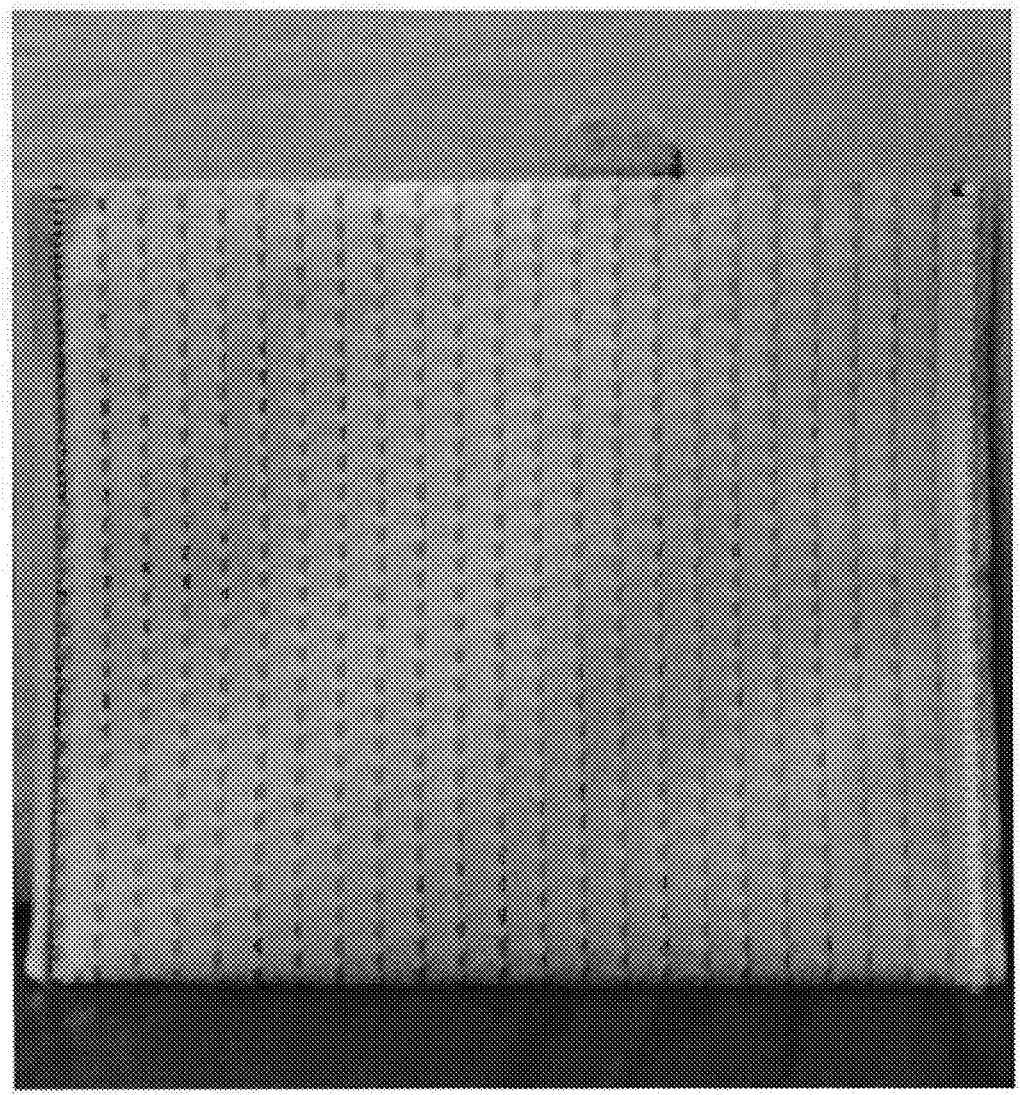
FIG. 14 includes a photograph of a battery separator containing serrated ribs according to various embodiments described herein, which separator was used to envelope electrodes for making a start/stop automotive flooded lead-acid battery for testing, results of which testing are described below.
Figure 15A:
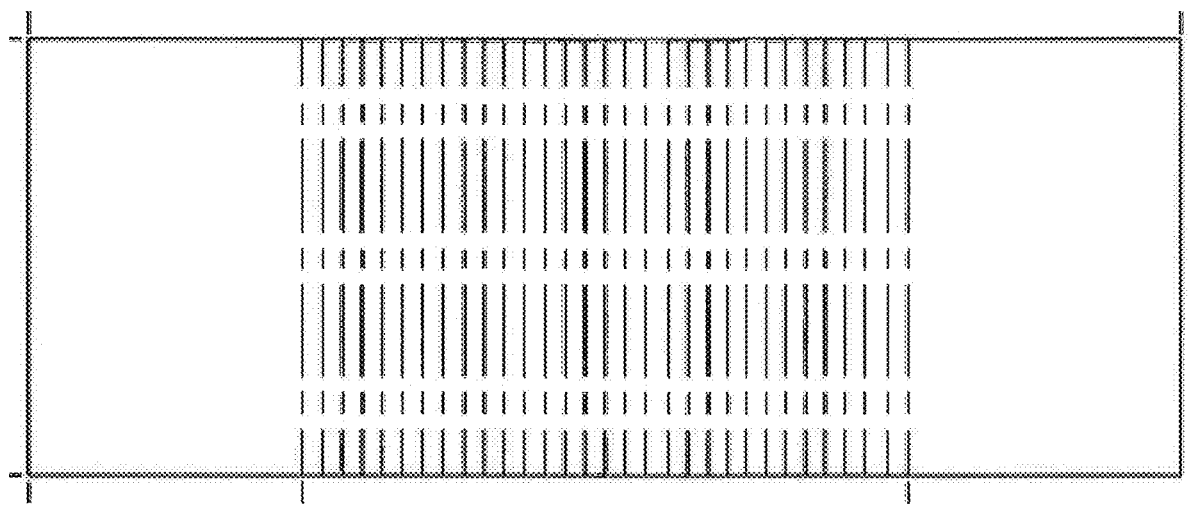
FIGS. 15A-15D include diagrams of several serrated profiles for a separator according to various embodiments herein. Various optimized profiles for separators for improving and enhancing acid mixing are disclosed herein, and the diagrams set forth in FIGS. 15A-15D are merely exemplary of such optimized profiles; many other optimized profiles fall within the scope of the improved separators, batteries, systems, and methods described and claimed herein.
Figure 15B:
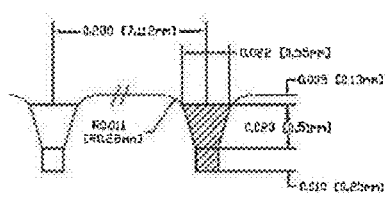
Figure 15C:
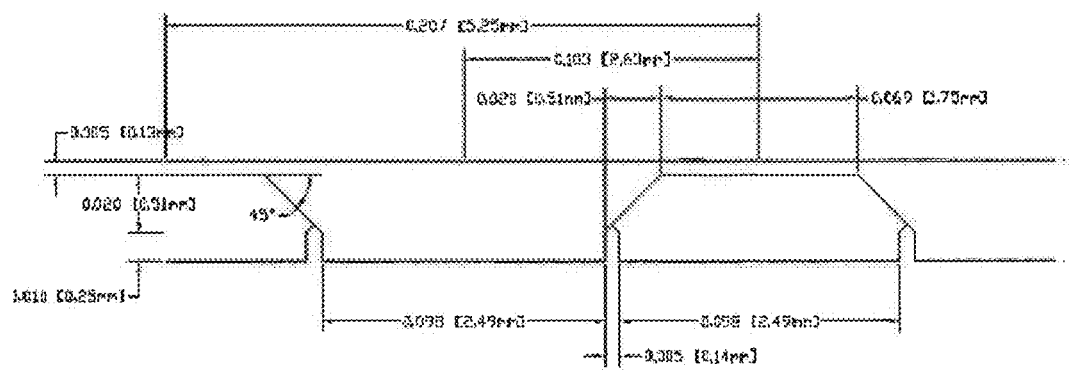
Figure 15D:
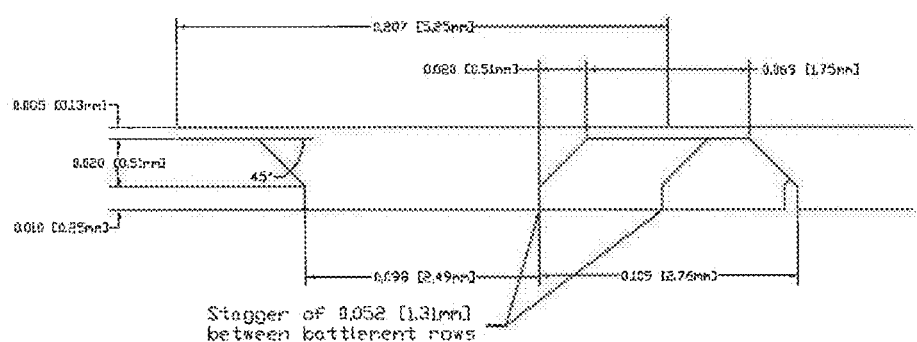

FIG. 14 includes a photograph of a battery separator containing serrated ribs according to various embodiments described herein, which separator was used to envelope electrodes for making a start/stop automotive flooded lead-acid battery for testing, results of which testing are described below.

FIGS. 15A-15D include diagrams of several serrated profiles for a separator according to various embodiments herein. Various optimized profiles for separators for improving and enhancing acid mixing are disclosed herein, and the diagrams set forth in FIGS. 15A-15D are merely exemplary of such optimized profiles. Many other optimized profiles fall within the scope of the improved separators, batteries, systems, and methods described herein.

Figure 16:
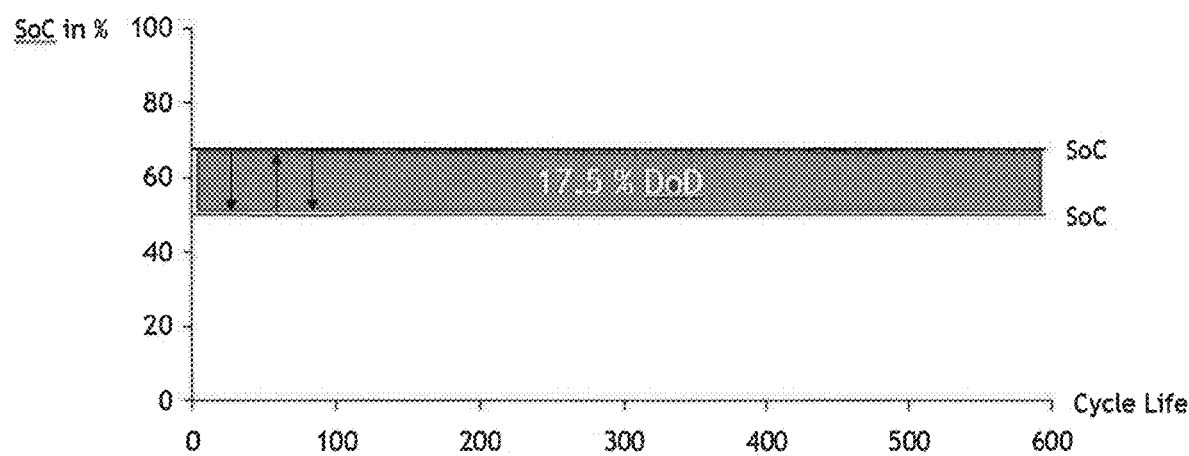
FIG. 16 includes a graph depicting a cycling test for one example of an enhanced flooded battery, or a flooded battery operating in an enhanced mode.

FIG. 16 includes a graph depicting a cycling test for one example of an enhanced flooded battery, or a flooded battery operating in an enhanced mode. In newer battery applications today, enhanced flooded batteries are operating in lower states of charge than previously known flooded lead-acid batteries that often operated in a state of overcharge or more than 100% charged. Thus, such an enhanced flooded battery may be operating in a state of charge (SoC) that is less than 95%, in some instances less than 90%, in some instances less than 85%, in some instances less than 80%, in still some instances less than 70%, in some instances less than 60%, in some instances less than 50%, in some instances less than 25%, in some instances even less than 10%. In this particular graph, the cycling test was performed for a battery with a 17.5% depth of discharge (DoD), and the separator used was a conventional ribbed separator such as the one shown in the bottom row of photographs in FIG. 1. This particular battery showed an ability to deliver energy, and to work well in a lead sulfate rich environment, under high cyclic conditions in a partially discharged state of charge. Batteries such as the one tested for FIG. 16 and used in start/stop applications have a dramatically increased throughput of energy compared with standard SLI batteries (such as those set forth in standards such as EN50342). Because such enhanced flooded batteries and/or flooded batteries for start/stop applications are operating in a partial state of charge, they need to have higher charge efficiency and/or need to more readily accept charge. In certain instances, enhanced flooded batteries employ various additives in conjunction with one or more of the electrodes to increase charge efficiency and/or to create a battery that more readily accepts charge. However, the enhanced separator(s) described herein can accomplish the same goal.

The separators, methods, batteries, and battery systems described herein may provide improved electrolyte circulation and mixing with less acid stratification over time. This is especially important for deep cycling and/or enhanced flooded lead-acid batteries, wherein acid stratification can significantly reduce battery performance. Various flooded lead-acid batteries, enhanced flooded lead-acid batteries, and applications therewith may benefit from the improved separators, methods, batteries, and systems described herein. Various start/stop vehicles, including but not limited to, various electric vehicles, automobiles, hybrid vehicles, fork trucks, golf carts, neighborhood electric vehicles, and so forth may benefit from the improved separators, batteries, battery systems, and methods described herein, particularly vehicles and/or batteries that do not get charged adequately and exist in a partial state of charge.

The exemplary embodiments of enhanced flooded separators described herein, which may be known as acid mixing separators, may be used in enhanced flooded batteries, particularly batteries in motion, and surprisingly and unexpectedly provide such enhanced flooded batteries with significantly improved acid mixing and/or acid circulation, thereby significantly reducing or altogether preventing acid stratification within the enhanced flooded battery. Such may be vitally important as the flow and circulation of acid along the entire separator means that the entire battery is being used versus some smaller portion of the battery being in use. Namely, using the enhanced separators, batteries, systems, and methods of the present disclosure, electrolyte (e.g., sulfuric acid) is freely flowing to and along all or almost all parts of the separator and therefore is freely flowing to and along all or almost all parts of the positive active material and the negative active material on the electrodes. Conversely, with acid stratification (see, by way of example only, the acid stratification present in the bottom rows of photographs in FIGS. 1-4, where red-colored indicator has been added to the acid such that acid is clearly visible and present in about the bottom halves of those test cells versus clear liquid, namely water, clearly visible and present in about the top halves of those test cells), entire portions of the separator, and therefore entire portions of the positive active material and negative active material on either side of such separator, are completely devoid of acid and therefore are not being used to their fullest potential to provide power to the underlying device/vehicle using the battery. Thus, the improved separators, batteries, systems, and methods described herein greatly reduce acid stratification in a flooded lead-acid battery, for example, an enhanced flooded battery.

The reason for concern about acid stratification is the resulting current density non-uniformity across the surface of the positive and negative plates or electrodes. The graph shown in FIG. 12 illustrates the conductivity of $H_2SO_4$ vs. the concentration of sulfuric acid percentage by weight.

In some preferred embodiments of the present disclosure, the serrations, dimples, and/or broken ribs present on one or more surfaces of the separator are non-uniformly distributed. Additionally, in some preferred embodiments, the serrations, dimples, and/or broken ribs present on one or more surfaces of the separator are different in certain zones or regions on at least one side of the separator. For example, the serrations and dimples themselves may be non-uniform in size (e.g., may be sized randomly), and the spacing between the serrations and/or dimples may be random and/or non-uniform. By way of example, various serrations and/or dimples used herein may be present on one or both surfaces of a separator in an ordered or a disordered array. Additionally, various ribs used herein, e.g., serrated ribs, may be non-linear. For example, some serrated ribs may be wavy in pattern or non-linear in pattern.

In various embodiments, the effects of the enhanced flooded separators for the enhanced flooded batteries described herein are highlighted when the separator is positioned within the enhanced flooded battery such that the enhancements on the separator run parallel with the direction of motion in which a battery in motion is traveling. Such effects can be seen by comparing the desirable results of FIG. 6 with the less desirable results of FIG. 13. In the photographs in FIG. 13, acid stratification is still observed even though separators having enhanced profiles for acid mixing are used. This is because the cells in FIG. 13 were positioned such that the enhancements on the separator and electrodes are perpendicular to the direction of motion in which the battery is traveling in the vehicle. The placement of the battery in the vehicle with the electrodes and separators parallel to the start and stop inertia may, in some cases, allow for better mixing of acid than perpendicular positioning.

The various enhanced separators described herein, for example, those with serrations for improving acid mixing and acid circulation, may have different spacing and/or different patterns. By way of example only, FIGS. 15A-15D show examples of serrated ribs that may be effective in the present exemplary embodiments. Such patterns, and other patterns (both uniform and non-uniform, and both ordered and disordered) may allow for improved CCA (cold cranking amperage) within the flooded lead-acid battery as well as other key improvements in electrical performance of the battery. In serration patterns like the ones featured in FIGS. 15A-15D (by way of example only), there is about a 53% reduction in surface area vs. a separator having a solid rib (a control) allowing for less rib contact on the PAM (the positive active material) resulting in improved CCA performance. In such patterns like the ones shown in FIGS. 15A-15D, there may be 33% less rib mass, compared with a solid rib profile (a control) allowing for more acid availability and improved performance. Additionally, it may be important to maintain PAM (positive active material) compression with a balance of rib mass and openings for acid mixing and availability.

Further, the placement of the protrusion(s) (such as dimples, serrations or the like) and design must be optimized for compression as not to facilitate PAM shedding and preferred to be supported over the grid frame as not to push the pellet from intimate contact with the positive grid frame or current collector.

The batteries of the present disclosure may provide for cost savings with less lead needed for superior performance resulting from increased PAM utilization. In turn, such could lower the cost of the battery, which is a need for car makers, and could lower the weight of the battery, which is also a need for car makers.

In some instances, the enhanced separators used in the present disclosure may have optimized profiles that have a rib surface area, compared with the rib surface area of a conventional rib profile such as a solid vertical rib profile, that is 10-90% of that conventional rib surface area, preferably 30-70% of that conventional rib surface area, and more preferably, in some instances, 40-60% of that conventional rib surface area. All of this depends on the rib geometry, rib spacing and the final goal of improving the acid mixing and preventing the acid stratification, all of which are optimized.

EXAMPLES

FIGS. 8 and 9 show battery experiments that were conducted in a cell container. The battery test cell shown in these photographs with a white case and a group of lead electrodes, had the following general properties:

TABLE 2

|  | Length (mm) | Width (mm) | Height (mm) | Thickness (mm) | Comment |
| --- | --- | --- | --- | --- | --- |
| Cell container | 158 | 48 | 202 | N/A | Acid level 173 mm |
| Positive plate 10 ea. | N/A | 142 | 129 | 2.0 | N/A |
| Negative plate 11 ea. | N/A | 142 | 129 | 1.5 | N/A |
| Group of plates | 142 with separator overlap | 48 | 146 mm includes strap | N/A | Group is all the plates welded together with a strap over the top |

In additional examples, shown below, a commercial group 31 19 plate/group Ca/Ca expanded battery testing data. In this table, the separators marked "new" have the serrated profile shown in the envelope of FIG. 14, while the results marked "control" have solid ribs along the separator vertically. These results proved out unexpected and/or surprising findings regarding the improvement in battery performance for start/stop enhanced flooded lead-acid batteries using enhanced separators according to the present disclosure. Significantly, the results in the table below showed improvements even when the batteries had not been placed into significant motion in a vehicle but rather had just been in general motion while moving from place to place within a plant for testing. Thus, combined with the motion from a vehicle and/or the energy from various start/stop events, the battery performance results may improve even more significantly.

TABLE 3

| Sample | High Rate Discharge (HRD) | CCA on Midtronic | Voltage |
| --- | --- | --- | --- |
| New-1 | 1347 | 930 | 12.98 |
| New-2 | 1369 | 935 | 12.98 |
| New-3 | 1352 | 910 | 12.96 |
| New-4 | 1371 | 925 | 12.96 |
| New-5 | 1348 | 913 | 12.98 |
| New-6 | 1377 | 931 | 12.98 |
| New-7 | 1374 | 930 | 12.98 |
| New-8 | 1368 | 933 | 12.98 |
| New-9 | 1380 | 934 | 12.98 |
| New-10 | 1368 | 927 | 12.95 |
| Average | 1365.4 | 926.8 | 12.973 |
| Std deviation | 12.02 | 8.64 | 0.01 |
| Control-1 | 1295 | 874 | 12.86 |
| Control-2 | 1321 | 902 | 12.86 |
| Control-3 | 1303 | 884 | 12.86 |
| Control-4 | 1323 | 890 | 12.89 |
| Control-5 | 1316 | 894 | 12.87 |
| Control-6 | 1312 | 883 | 12.88 |
| Control-7 | 1314 | 895 | 12.86 |
| Control-8 | 1328 | 897 | 12.86 |
| Control-9 | 1319 | 886 | 12.89 |
| Control-10 | 1343 | 928 | 12.89 |
| Average | 1317.4 | 893.3 | 12.872 |
| Std deviation | 13.19 | 14.63 | 0.01 |
| New to ControlAvg improvement | 48 | 33.5 | 0.101 |
| % Improvement | 3.5% | 3.6% | 0.8% |
| Std deviation improvement | (1.17) | (5.99) | (0.00) |
| Comments | Higher discharge performance with improved quality | Improved Cold Cranking with standard deviation | |

The CFD examples discussed in relation to FIGS. 18A-32B depict a cell in a short battery such as those used in ISS, SLI, or golf car batteries. The CFD examples discussed in FIGS. 35-37 and 39 depict a cell in a tall battery such as those used in the motive power industry, for instance, fork truck batteries.

The short cell examples depict a separator that is approximately 142 mm wide by approximately 129 mm tall, a backweb thickness of approximately 250 μm, and a rib height of approximately 600 μm. The short cell examples also depict approximately 3 mm between either lateral edge of the separator and the sidewall boundary of the battery case, and a head space above the separator of approximately 44 mm.

The tall cell examples depict a separator that is approximately 158 mm wide by approximately 406 mm tall, a backweb thickness of approximately 500 µm, and a rib height of approximately 1.8 mm. The tall cell examples also depict approximately 3 mm between either lateral edge of the separator and the sidewall boundary of the battery case, and a head space above the separator of approximately 51 mm.

The significance of this Midtronic's CCA test is that is not a Global Standard test but a hand held device using an algorithm to quickly and easily calculate the performance of the battery. The increase of surface area of the Positive Grid exposed to acid using the acid mixing separator allows for improved conductance and improved electrode performance. Although not an industry standard it is used for simplicity and ease of use for purchasing decisions around the world today. Improving the performance of this algorithm tester is key to customer satisfaction and the improvements of the acid mixing separator facilitates that result as demonstrated in Table 3.

The following examples detail analyses of exemplary separators and batteries using Computational Fluid Dynamics (CFD) to quantify the efficacy of the exemplary embodiments disclosed herein to reverse, reduced, or completely eliminate acid stratification within a lead-acid battery or a flooded lead-acid battery or an enhanced flooded battery or an idle start/stop flooded battery. The models were generally started at a state of complete stratification, with the highest concentration of acid located in the lower portion of the battery and water in the higher portion of the battery with an interface disposed therebetween.

A sinusoidal graphical representation of a lateral motion is depicted in FIG. 17A. This motion may be described as moving the separators and/or batteries from a starting position in one direction to a positive 1 foot displacement, reversing direction to bring the modeled separators and/or batteries back to and past the starting position and to a negative 1 foot displacement, reversing direction to bring the model back to the starting position. This above-described motion takes place in 1 second. This pattern of motion was utilized in all CFD models simulating a horizontal lateral or horizontal sideways motion, and was repeated as many times as necessary to carry out the analyses for the desired amount of time. The CFD analyses described herein utilized a lateral or sideways motion that was in a direction parallel to the cross-machine direction of the exemplary separators. In other words, the motion was horizontal and in a direction parallel to the major plane of the exemplary separators.

In addition, the analysis of the CFD models derived a volume uniformity index ($\varphi$) of the acid volume fraction throughout the liquid electrolyte where a perfectly mixed electrolyte would have a uniformity index of 1.0. This value was calculated using Equation 1 below:

$$\varphi = 1 - \frac{\sum_c |\varphi_c - \overline{\varphi}| V_c}{2|\overline{\varphi}| \sum_c V_c} \quad \text{(Equation 1)}$$

Where,
$\overline{\varphi}$ is the volume average of $\varphi$;
$\varphi_c$ is the value of the selected scalar in a cell; and
$V_c$ is the cell volume.

Figure 17B:
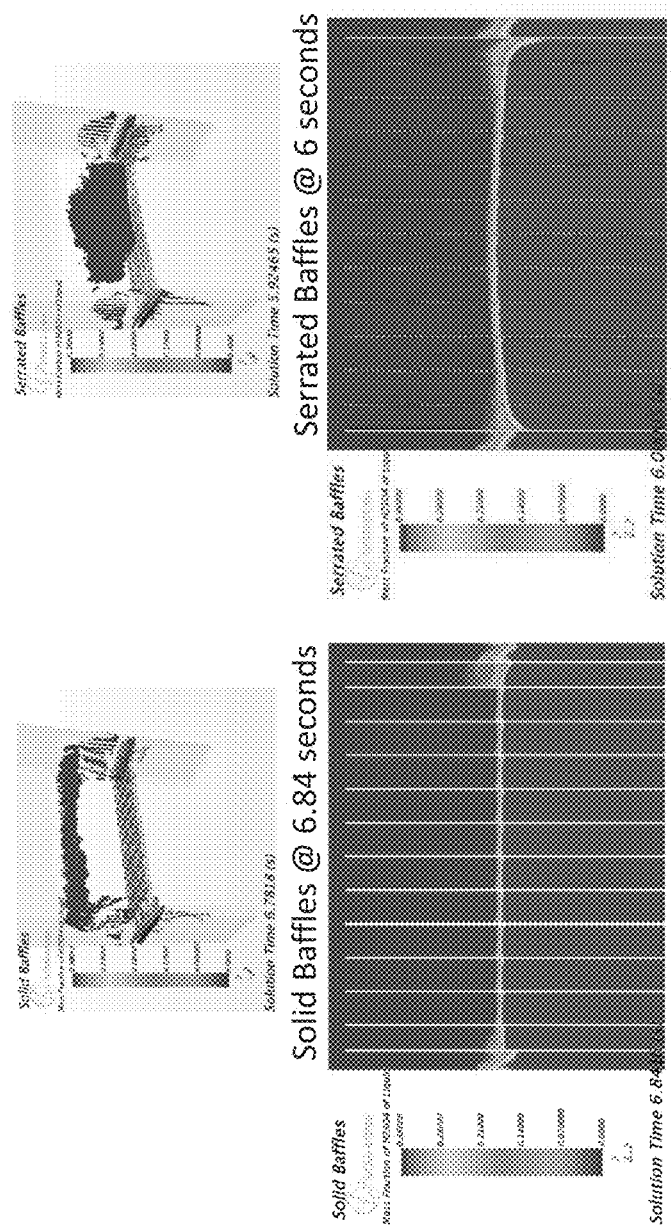
FIG. 17B shows a visual comparison of a solid rib separator and a serrated rib separator, each at about 6 seconds (as shown), and each subjected to the motion defined in FIG. 17A and analyzed using CFD. Both separators analyzed were enveloping a positive electrode plate ("positive enveloping" or "positive wrapping").

FIG. 17B shows a comparison of a solid rib separator and a serrated rib separator, each subjected to the motion defined in FIG. 17A and analyzed using CFD. Both analyzed separators were positive enveloping separators, meaning that the separators enveloped a positive electrode plate with the solid or serrated (and as described hereinbelow also broken) ribs facing the positive electrode plate.

Figure 18A:
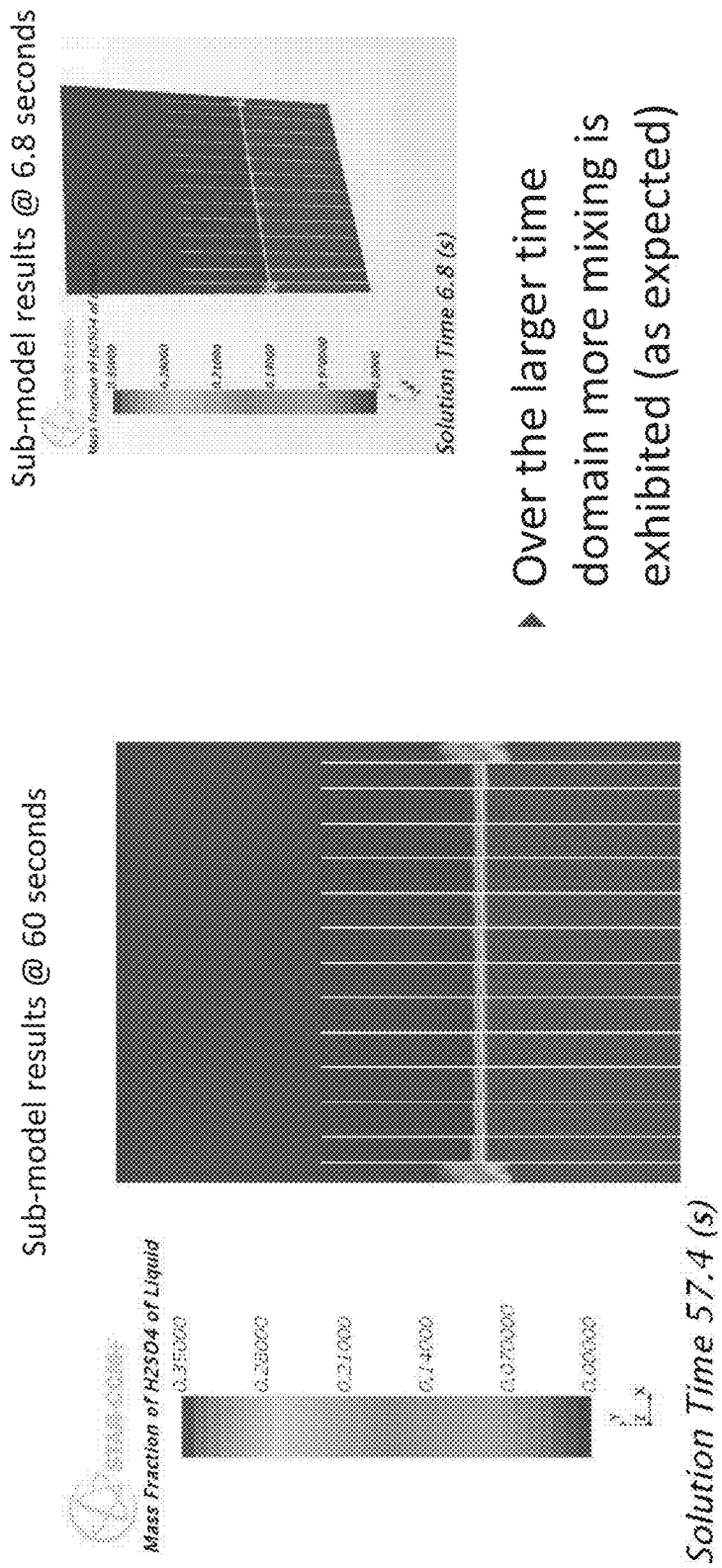
FIG. 18A shows a solid rib separator subjected to the motion defined in FIG. 17A with horizontal acceleration for 60 seconds and analyzed using CFD to show the mixing of a stratified electrolyte of a flooded lead-acid battery.
Figure 18B:
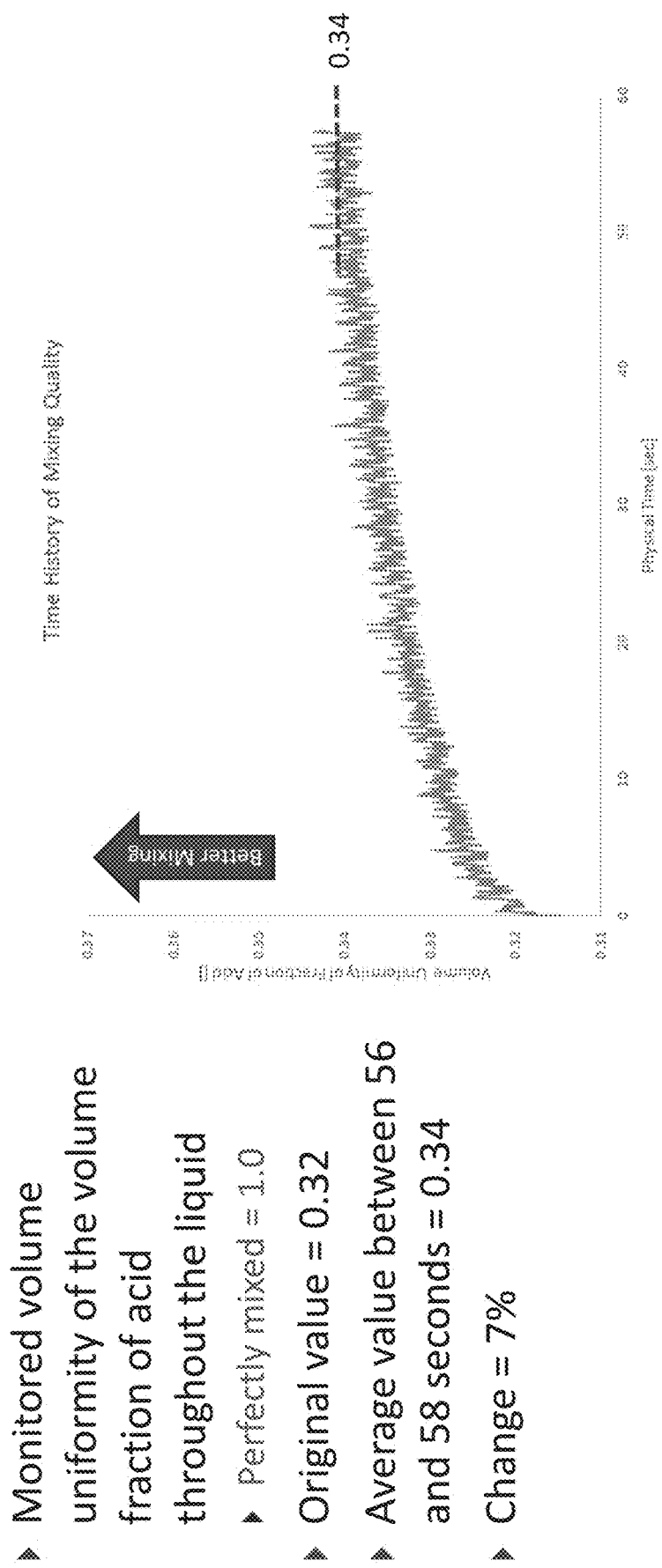
FIG. 18B depicts the volume uniformity of the acid fraction of the analysis of FIG. 18A.

FIG. 18A shows a positive enveloping solid rib separator subjected to lateral motion for 60 seconds and analyzed using CFD to show the mixing of a stratified electrolyte of a flooded lead-acid battery. It can be seen that there is a slight amount of mixing at the outer periphery of the separator, but very little, if any, mixing between the solid ribs. FIG. 18B depicts the volume uniformity of the analysis and reveals that the lateral motion mixing yielded a 7% increase in volume uniformity.

Figure 19A:
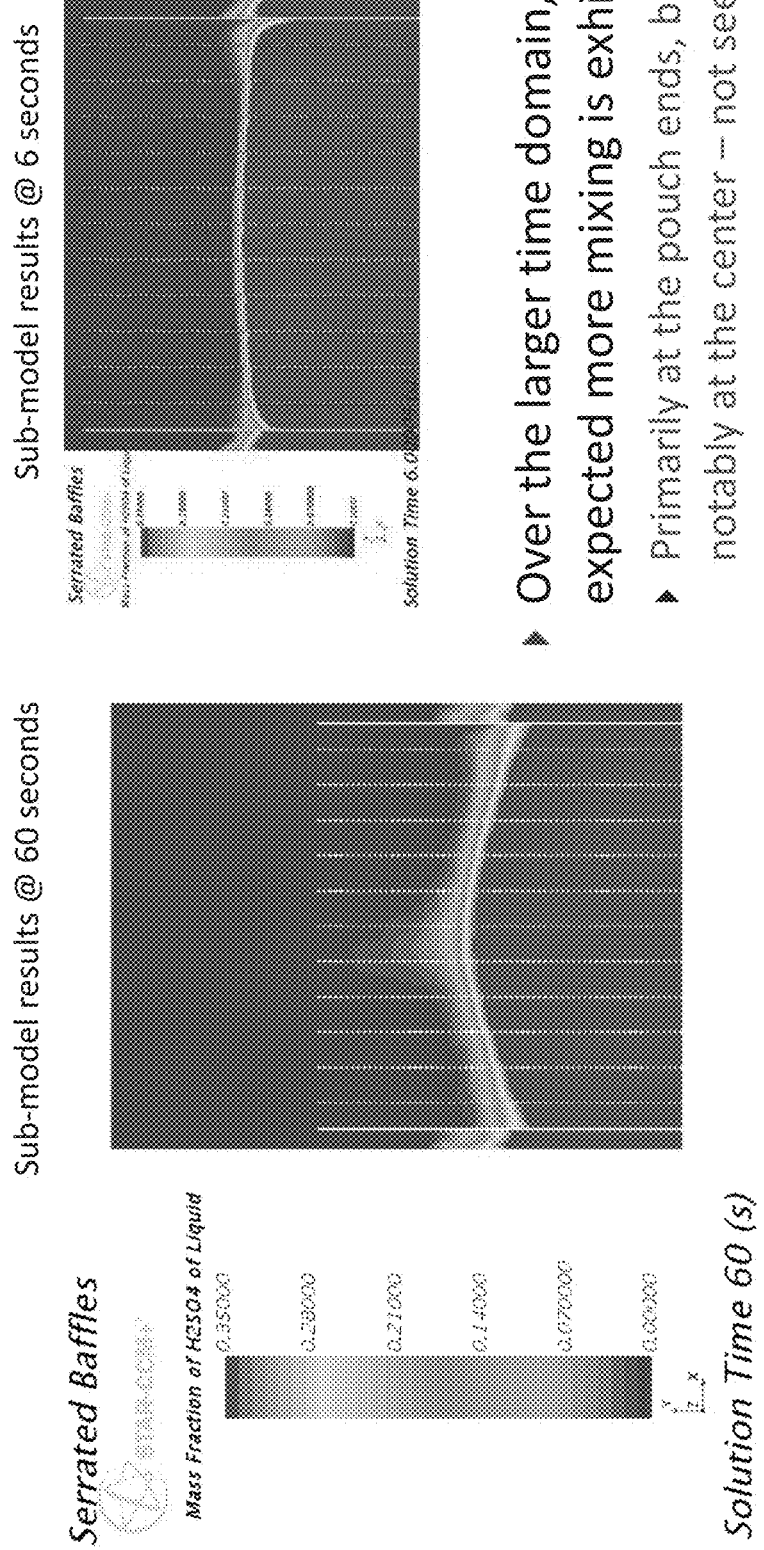
FIG. 19A shows a serrated rib separator subjected to the motion defined in FIG. 17A for 60 seconds and analyzed using CFD to show the mixing of a stratified electrolyte of a flooded lead-acid battery.
Figure 19B:
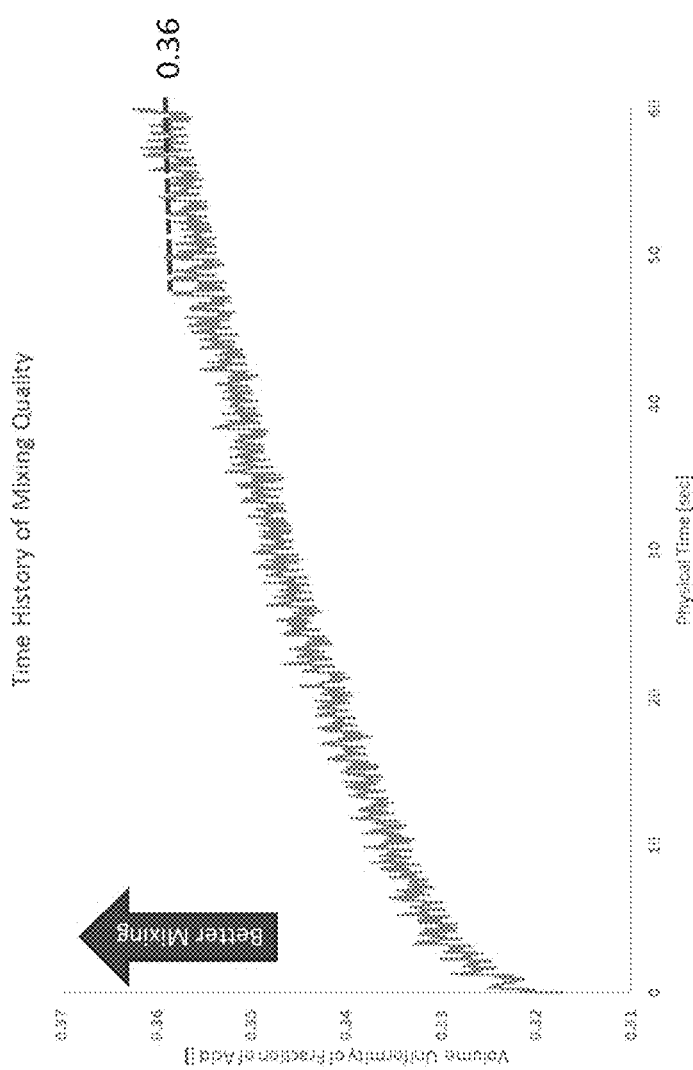
FIG. 19B depicts the volume uniformity of the analysis of FIG. 19A.

FIG. 19A shows a positive enveloping serrated rib separator subjected to lateral motion for 60 seconds and analyzed using CFD to show the mixing of a stratified electrolyte of a flooded lead-acid battery. It can be seen that there is some amount of mixing at the outer periphery of the separator with increased mixing between the interior serrated ribs. FIG. 19B depicts the volume uniformity of the analysis and reveals that the lateral motion mixing yielded a 12% increase in volume uniformity.

Figure 20A:
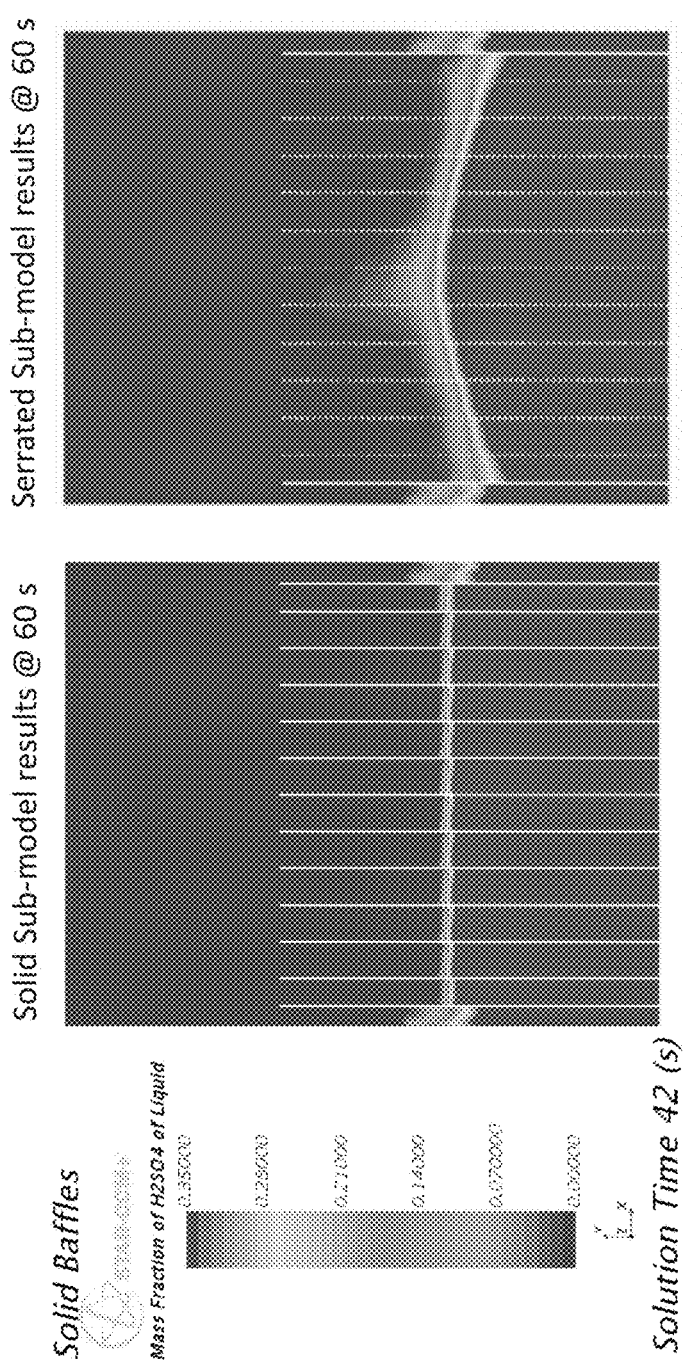
FIGS. 20A-20B depict a comparison of the CFD analyses of FIGS. 18A-18B and FIGS. 19A-19B FIG. 21 defines a rocking motion used in a CFD analysis of a serrated rib separator.
Figure 20B:
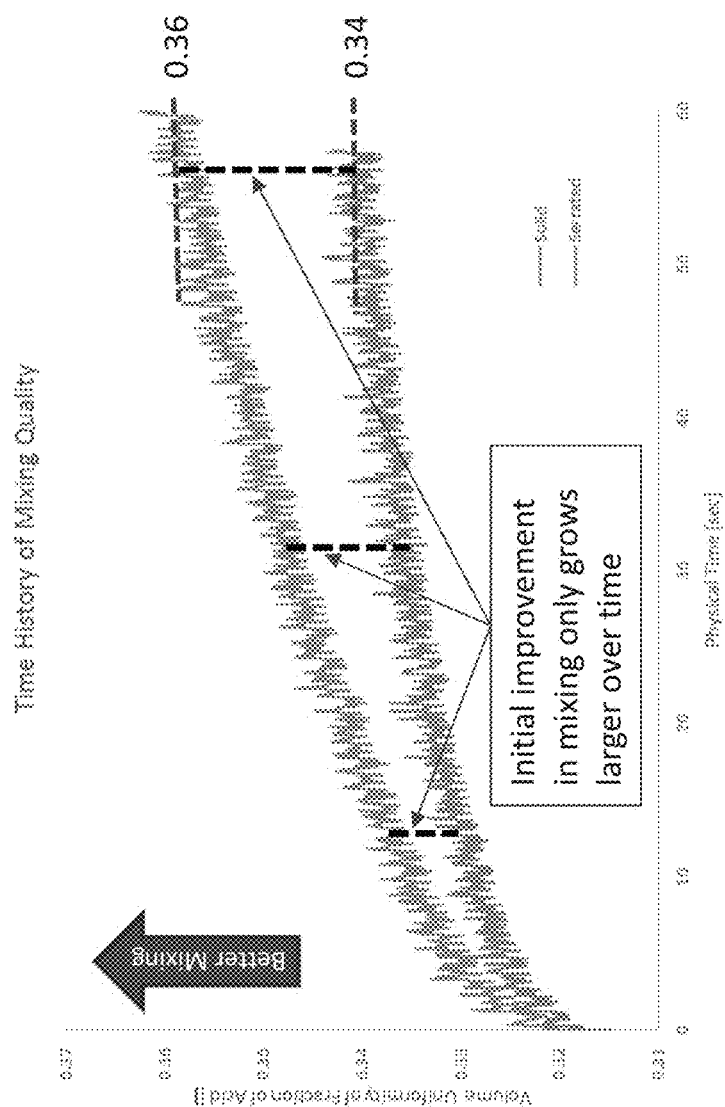

FIG. 20A is a side-by-side comparison of the CFD mixing results of the separators shown in FIGS. 18A and 19A. FIG. 20B shows that the positive enveloping serrated rib separator yields a 5% increase in mixing uniformity as compared to the positive enveloping solid rib separator.

Figure 21:
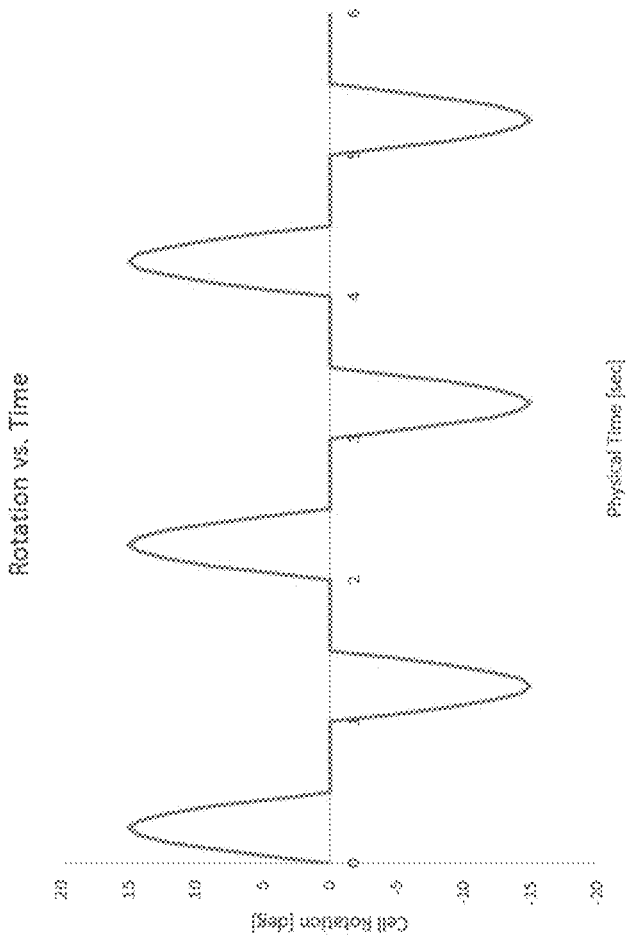
Figure 22:
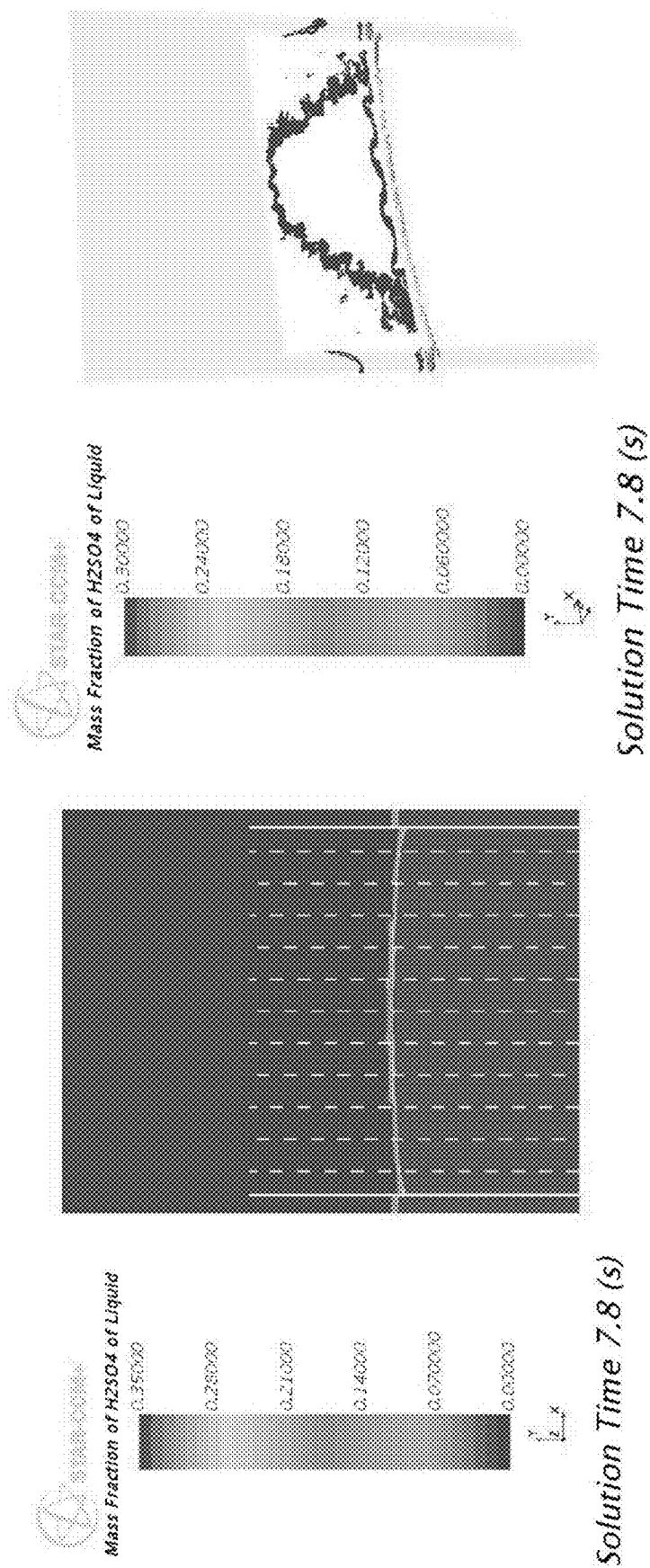
FIG. 22 shows a pictorial representation of the CFD analysis of a serrated rib separator subjected to the motion described in FIG. 21.

FIG. 21 defines a rocking motion used in a CFD analysis of a positive enveloping serrated rib separator. FIG. 22 shows a pictorial representation the CFD analysis of a serrated rib separator subjected to the rocking motion described in FIG. 21.

Figure 23:
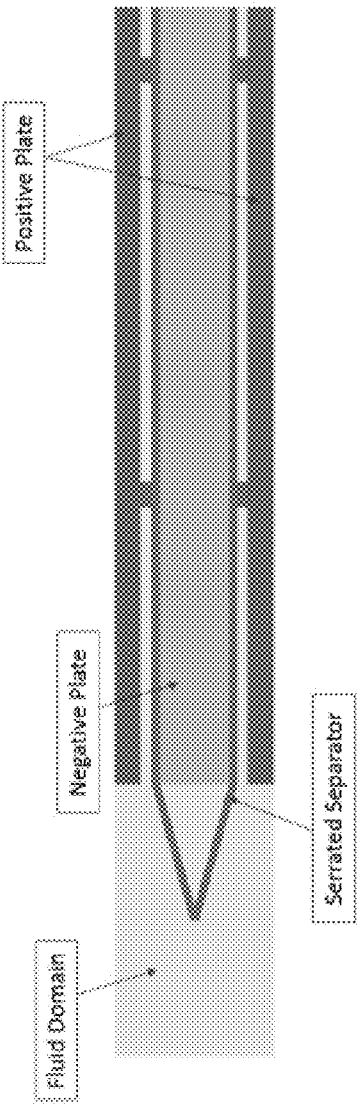
FIG. 23 is a schematic representation of a separator enveloping a negative electrode plate ("negative enveloping" or "negative wrapping") of a flooded lead-acid battery, such as an enhanced flooded lead-acid battery and/or an ISS flooded lead-acid battery.

FIG. 23 is a schematic representation of a separator containing or enveloping a negative electrode plate (negative enveloping) of a flooded lead-acid battery with the solid or serrated (and as described hereinbelow, broken) ribs facing the positive electrode plate.

Figure 24A:
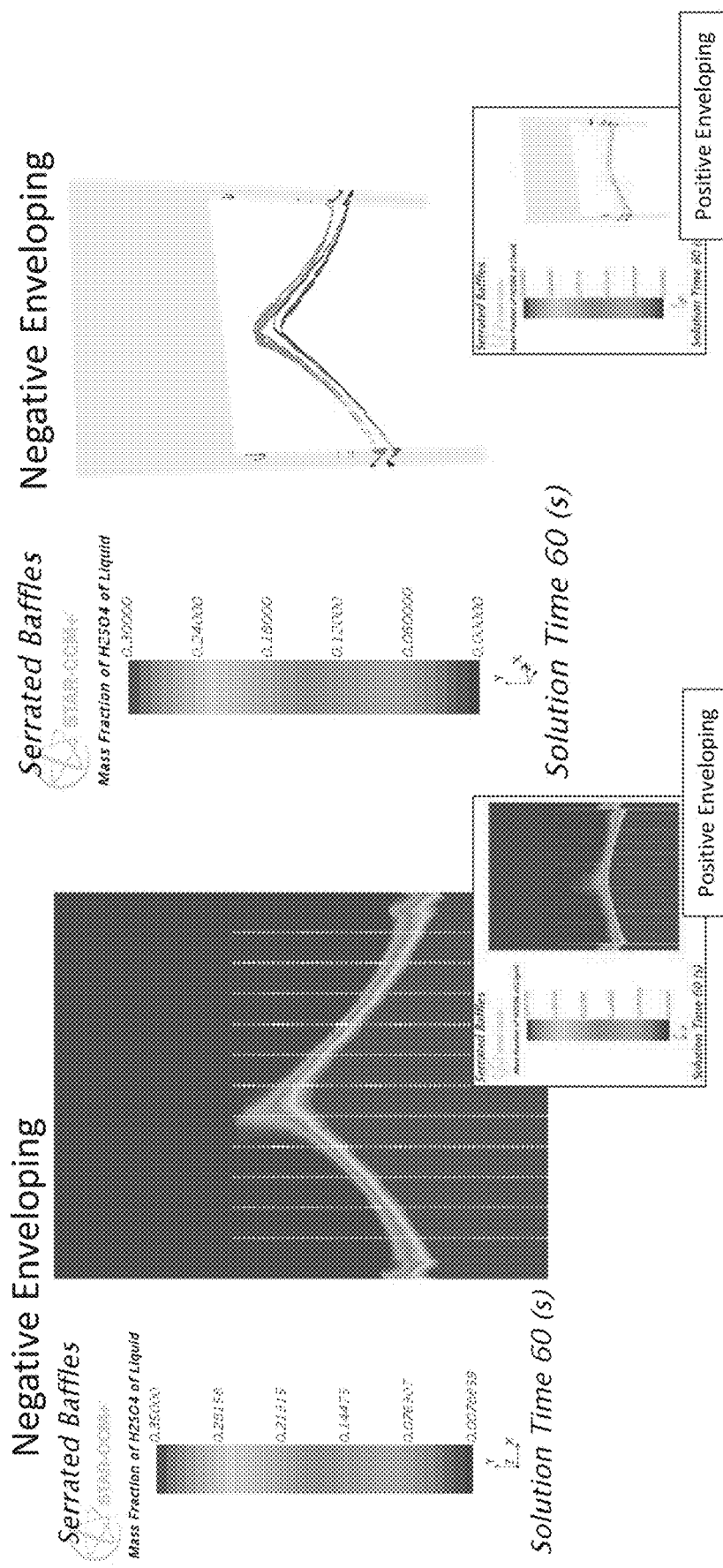
FIG. 24A is a graphical representation of a CFD analysis of a negative enveloping serrated rib separator subject to a lateral motion, and further compares this to a graphical representation of a CFD analysis of a positive enveloping serrated rib separator subjected to the same lateral motion.
Figure 24B:
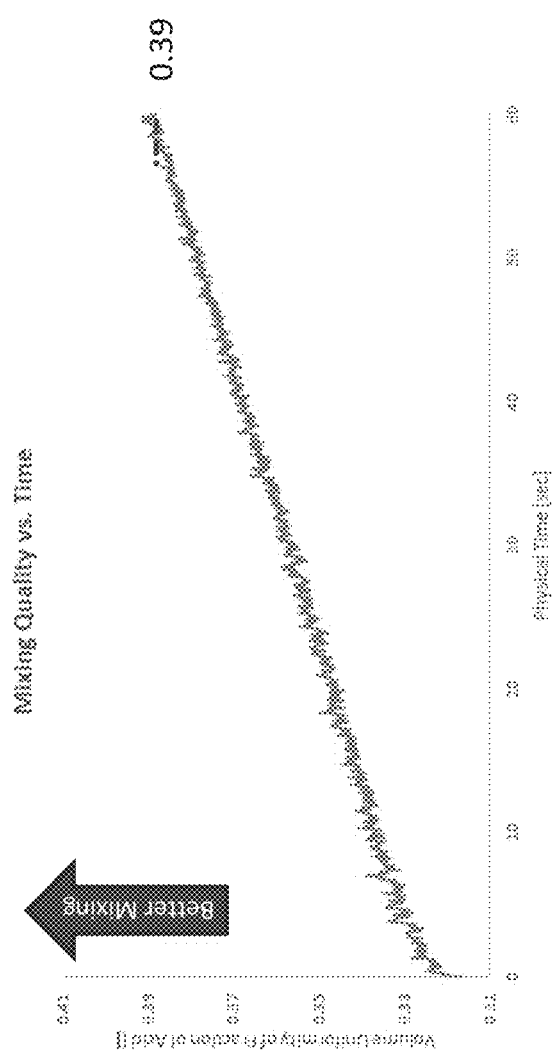
FIG. 24B is a graphical representation of the volume uniformity of the negative enveloping serrated rib separator of FIG. 24A.
Figure 24C:
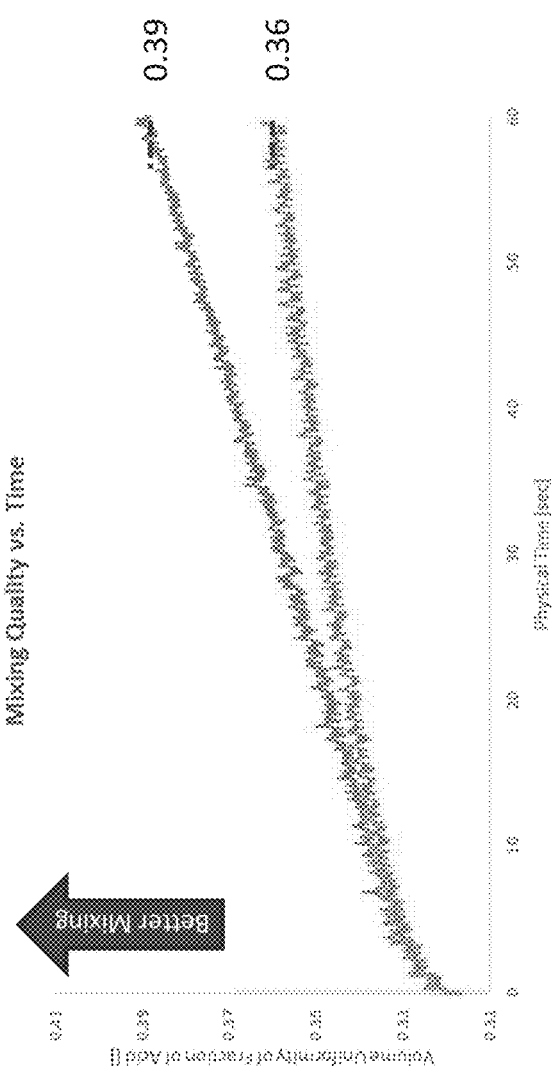
FIG. 24C is a graphical comparison of the volume uniformity of negative enveloping and positive enveloping serrated rib separators.
Figure 25A:
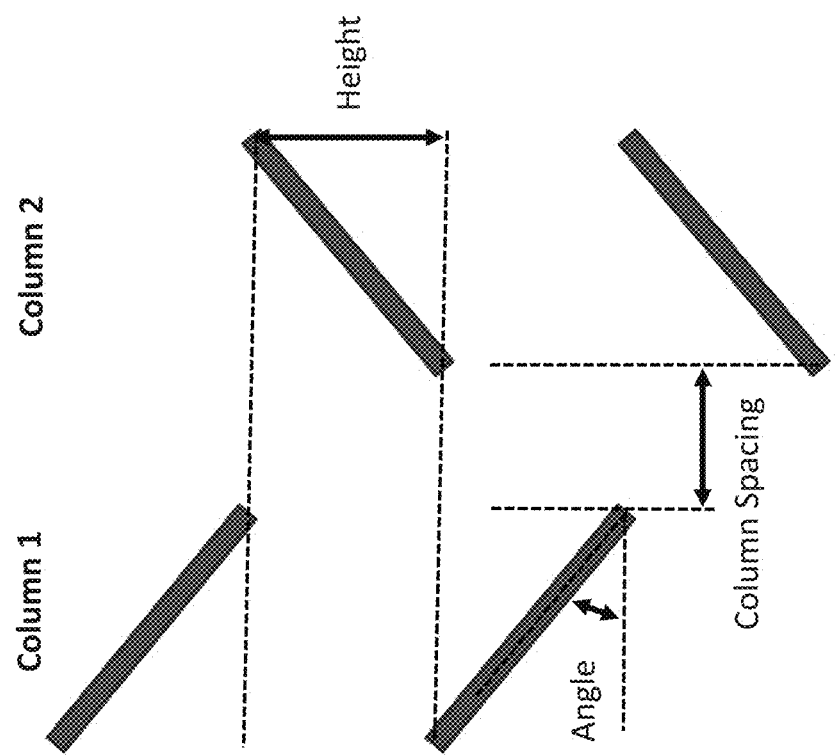
FIGS. 25A-25F depict variables of broken rib patterns according to exemplary embodiments of the present disclosure.
Figure 25B:
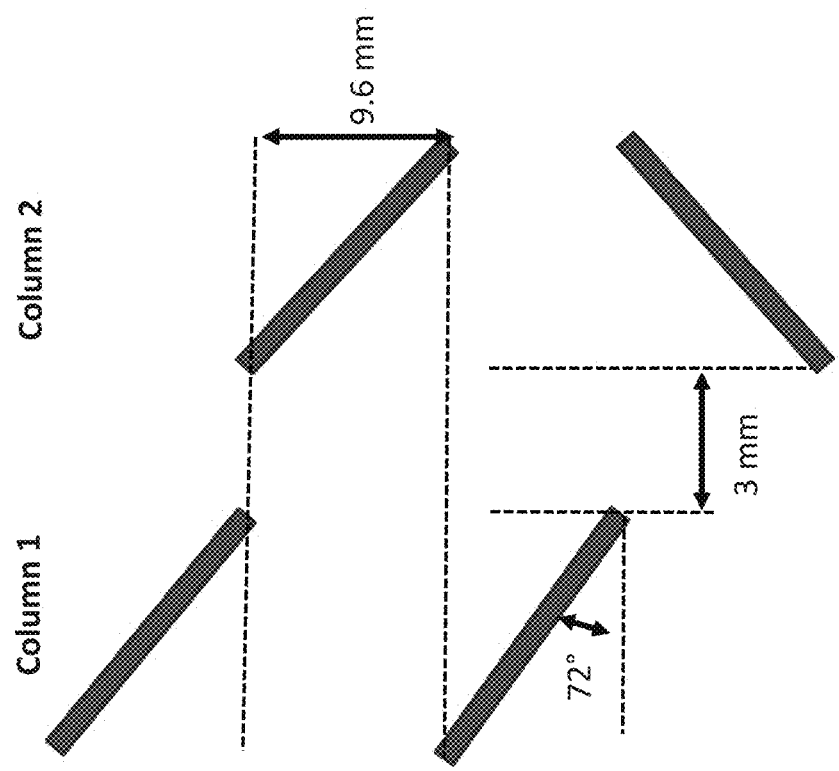
Figure 25C:
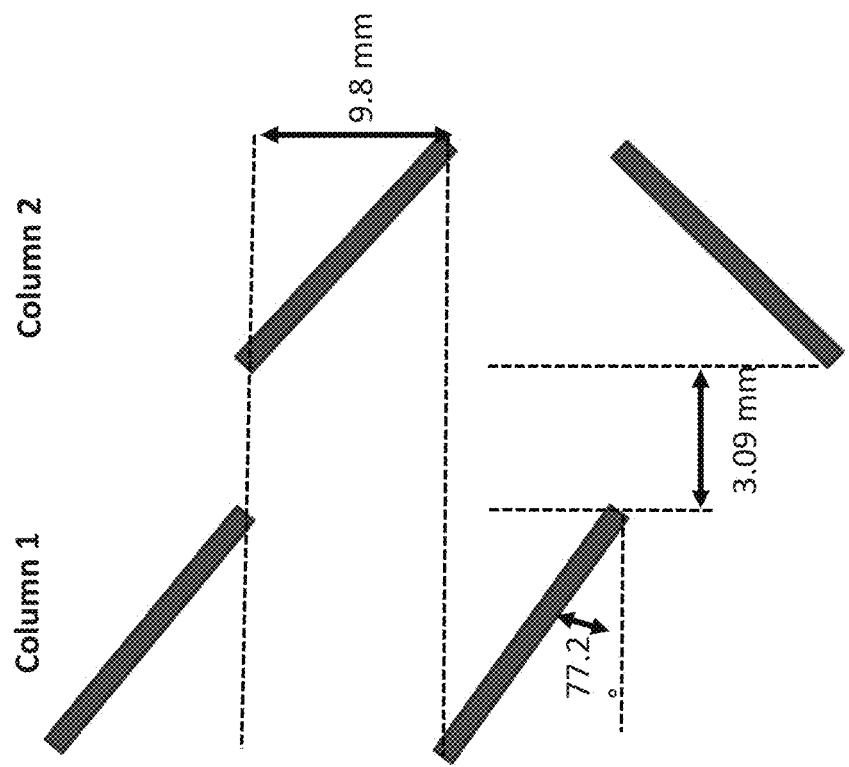
Figure 25D:
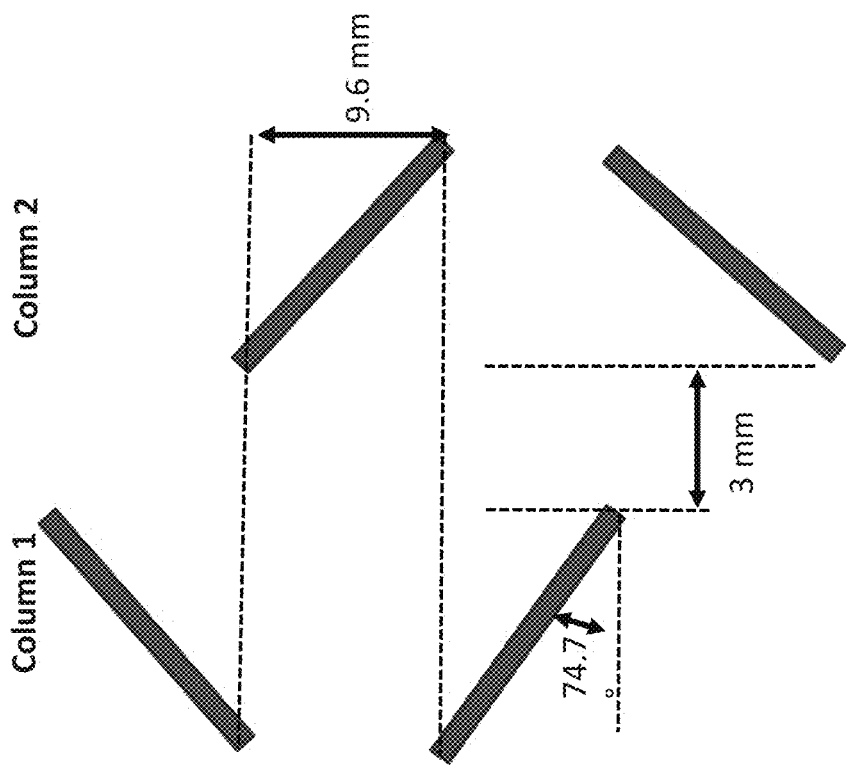
Figure 25E:
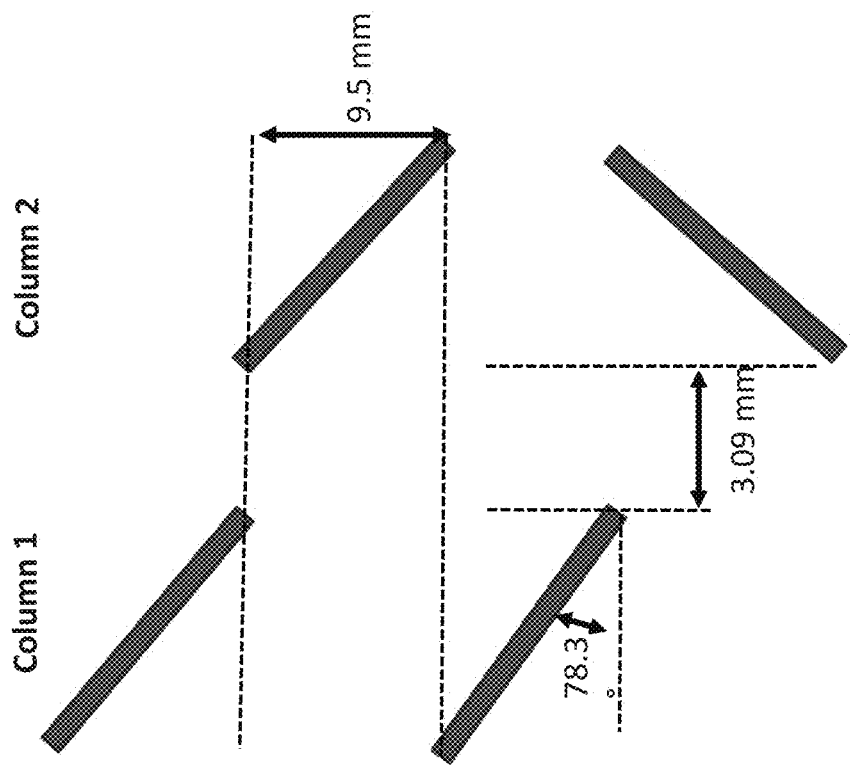
Figure 25F:
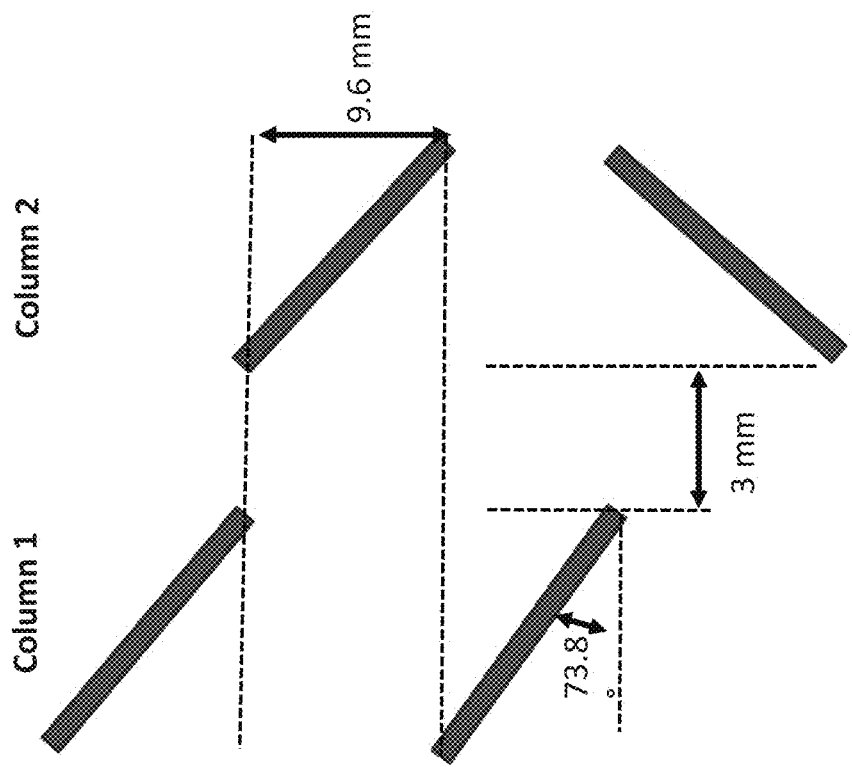

FIG. 24A is a graphical representation of a CFD analysis of a negative enveloping serrated rib separator subject to a lateral motion, and further compares this to a graphical representation of a CFD analysis of a positive enveloping serrated rib separator subjected to the same lateral motion. FIG. 24B is a graphical representation of the volume uniformity of the negative enveloping serrated rib separator of FIG. 24A revealing a 22% change in volume uniformity from the beginning stratification to 60 seconds of mixing. FIG. 24C is a graphical comparison of the volume uniformity of a negative enveloping and positive enveloping serrated rib separators, which shows that the negative enveloping separator has a 10% increase in mixing over the positive enveloping separator.

Turning now to FIGS. 25A-25F, several exemplary embodiments depict broken rib arrangements with variables that define various broken rib patterns that were used in CFD analyses. FIGS. 26A-26G illustrate battery separators with broken ribs according to exemplary embodiments of the present disclosure and as defined in the patterns of FIGS. 25A-25F. Exemplary battery separators are shown in FIGS. 26A-26G; additionally, exemplary battery separators disclosed herein may have any number of columns $2606^1$-$2006^n$.

Figure 26C:
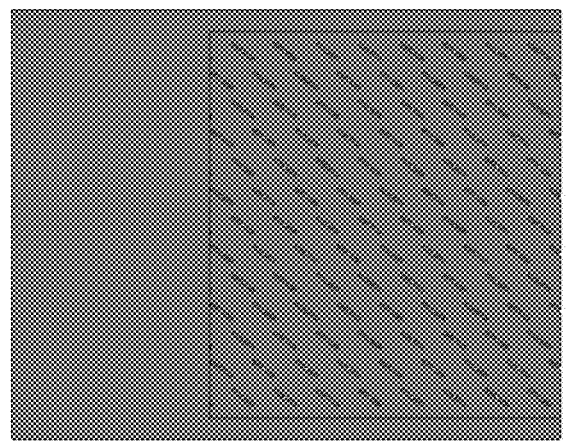
Figure 26B:
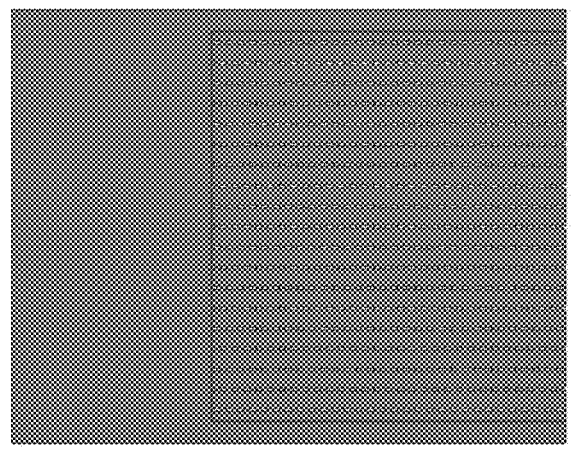
Figure 26A:
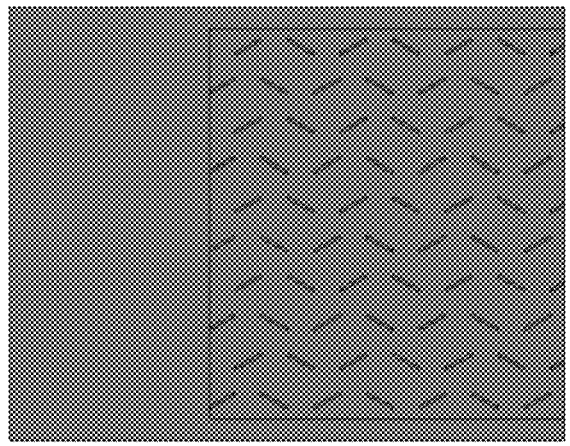
Figure 26D:
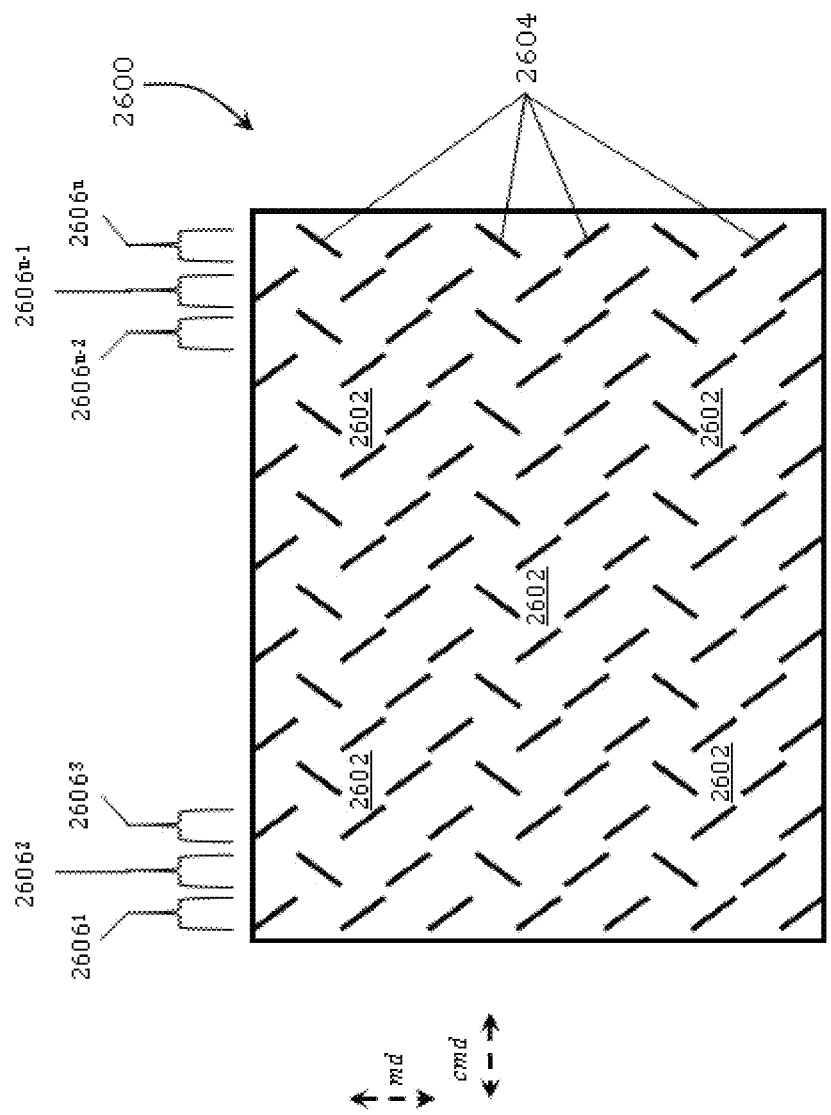
Figure 26E:
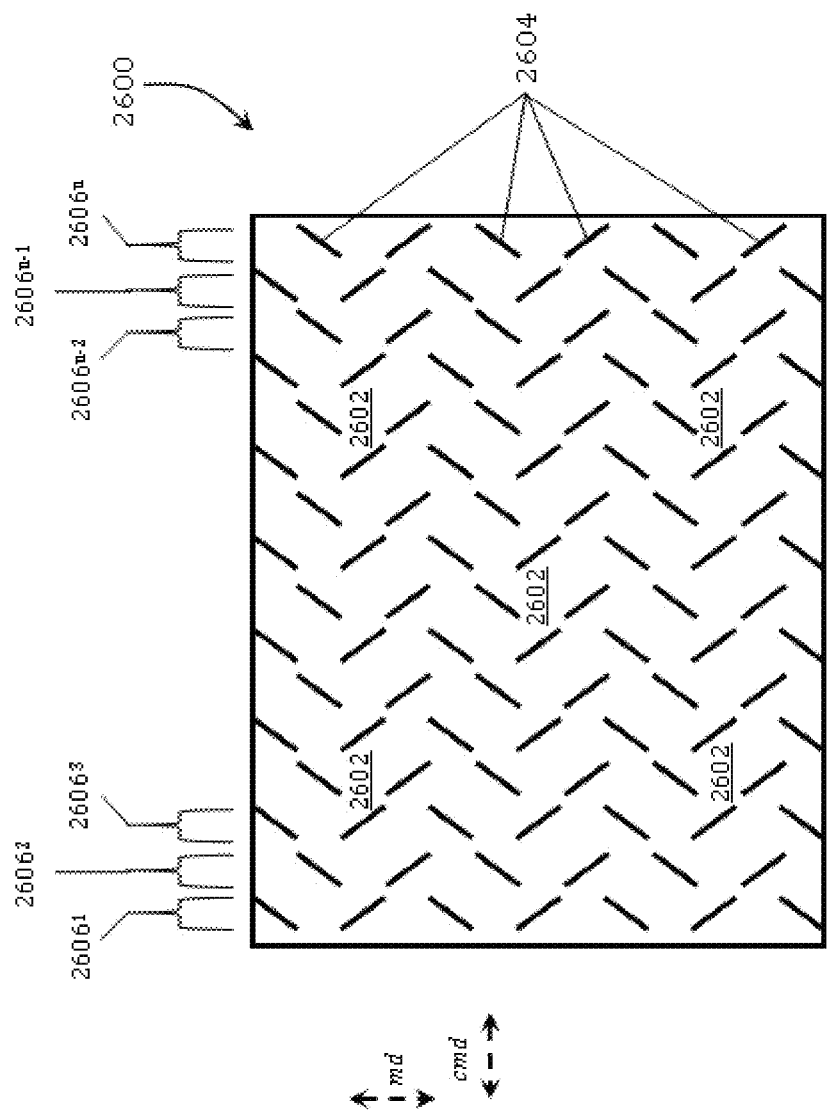
Figure 26G:
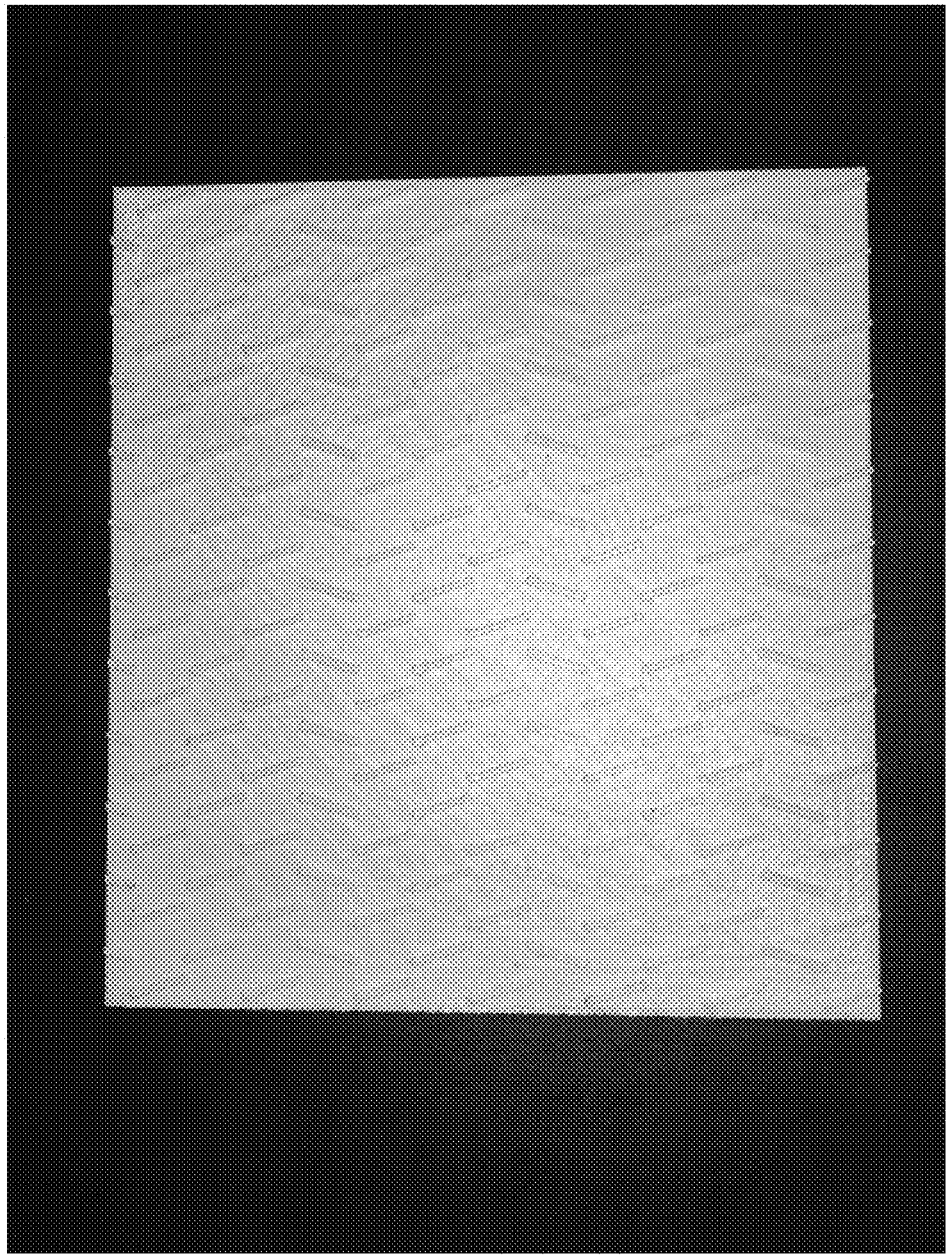
Figure 27A:
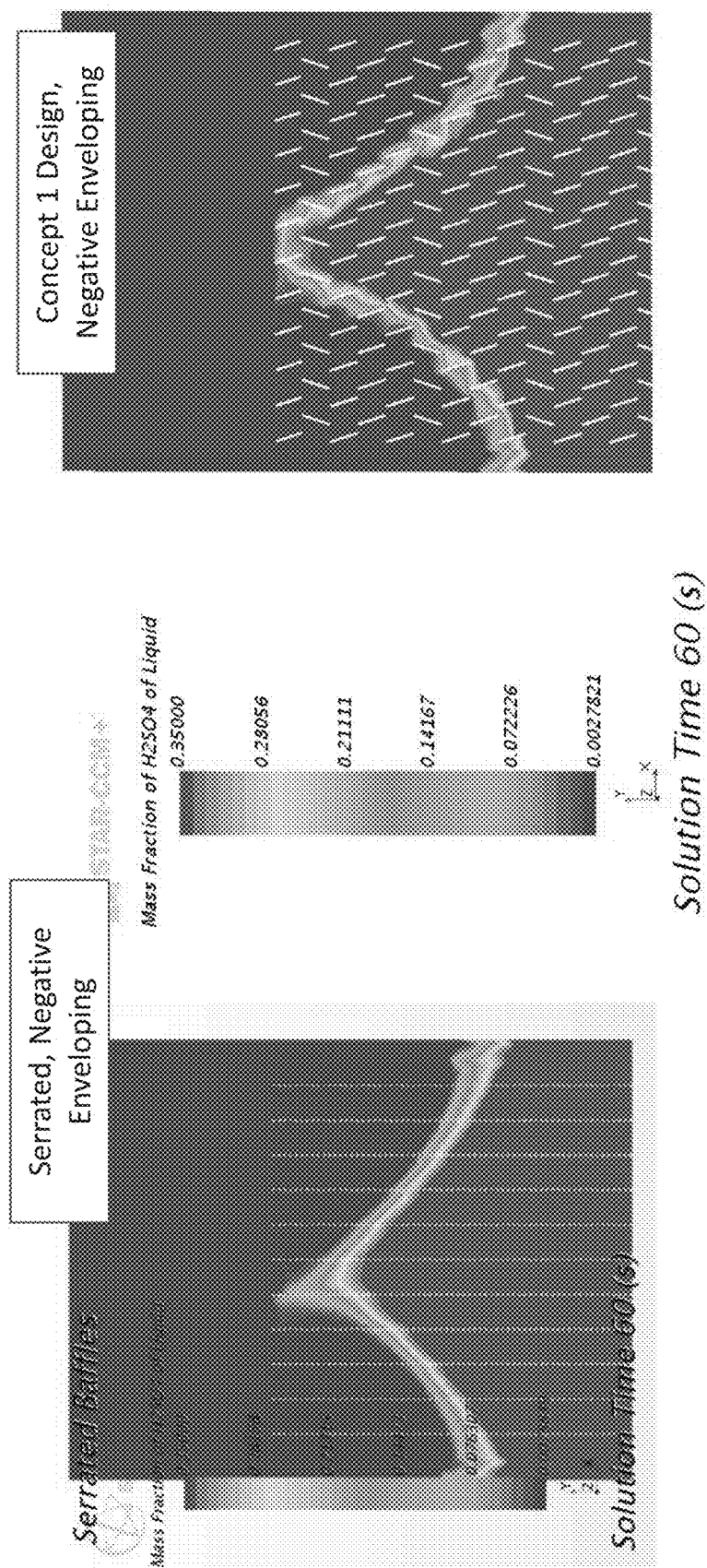
FIG. 27A is a graphical comparison of a CFD analysis of a negative enveloping serrated rib separator and a negative enveloping broken rib separator subjected to a lateral motion.
Figure 27B:
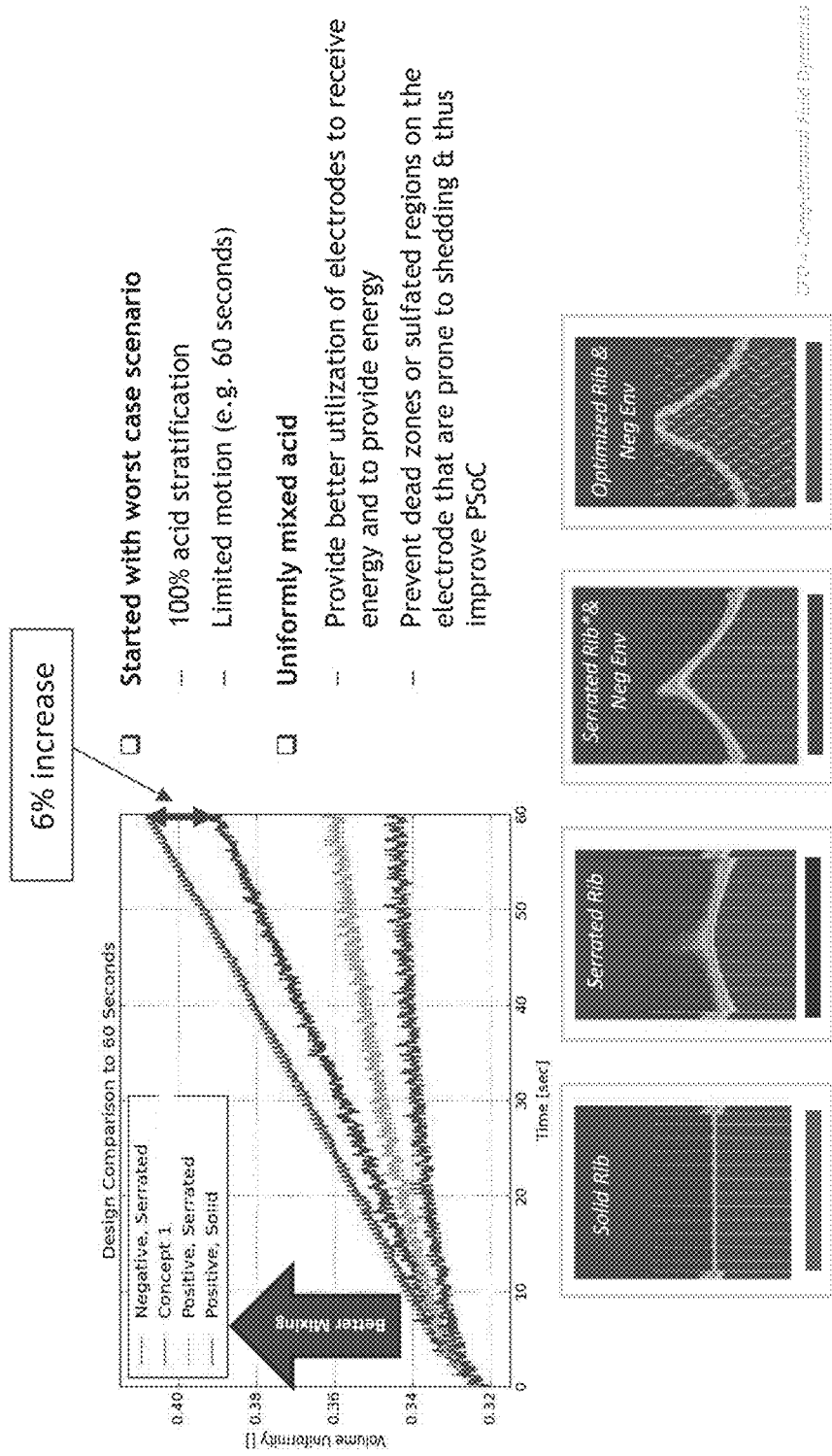
FIG. 27B depicts a comparison of the volume uniformity of several CFD analyses of previously described separators subjected to a lateral motion.

FIG. 27A is a graphical comparison of a CFD analysis of a negative enveloping serrated rib separator and a negative enveloping broken rib separator (as depicted in FIG. 26D) subjected to a substantially lateral or horizontal motion. FIG. 27B depicts a comparison of the volume uniformity of several CFD analyses of previously described separators subjected to a lateral motion. The negative enveloping broken rib separator yields a 26% increase in mixing at 60 seconds as compared to the negative enveloping serrated rib separator.

Figure 28A:
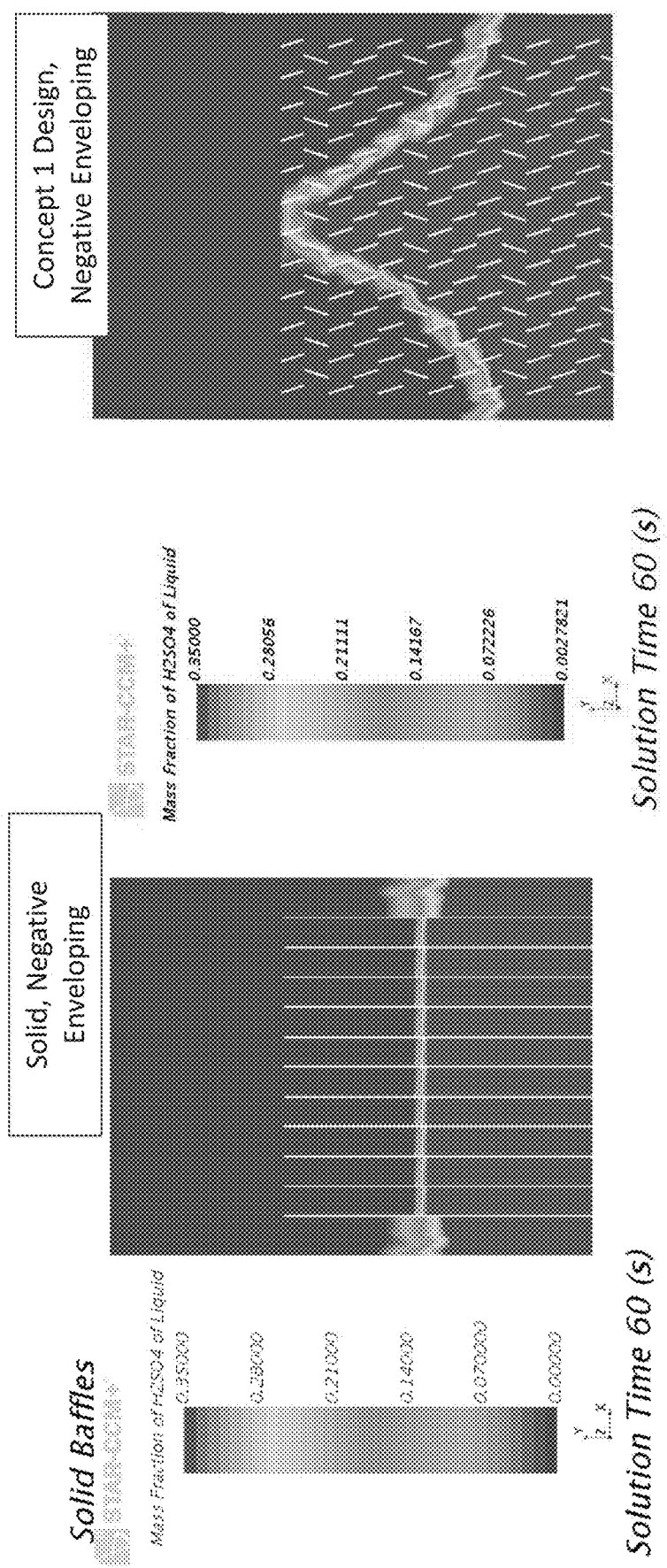
FIG. 28A is a graphical comparison of a CFD analysis of a negative enveloping solid rib separator and a negative enveloping broken rib separator subjected to a lateral motion.
Figure 28B:
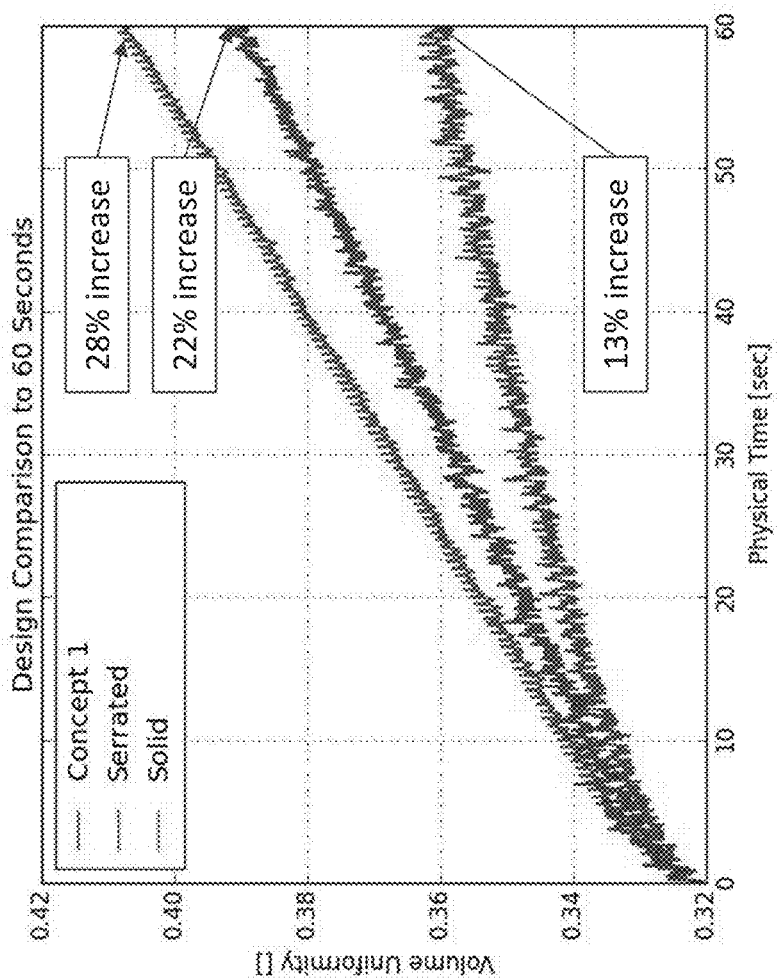
FIG. 28B depicts a comparison of the volume uniformity of several CFD analyses of a solid rib separator, a serrated rib separator, and a broken rib separator—all negative enveloping.

Turning now to FIG. 28A, it depicts a graphical comparison of a CFD analysis of a negative enveloping solid rib separator and a negative enveloping broken rib separator (as depicted in FIG. 26D), subjected to a substantially lateral or horizontal motion as shown. FIG. 28B depicts a comparison of the volume uniformity of several CFD analyses of previously described separators subjected to a substantially lateral or horizontal motion. The negative enveloping broken rib separator yields a 28% increase in mixing at 60 seconds.

Figure 29A:
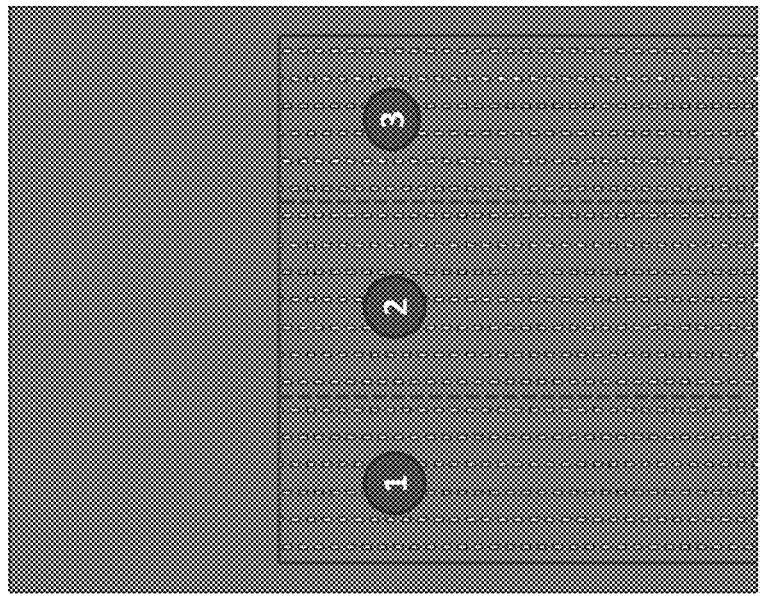
FIG. 29A details a separator having three zones of varying broken rib patterns.

FIG. 29A details a separator having three zones of varying broken rib patterns, with the zones changing in a lateral direction along the cross-machine direction of the separator. It is noted that the zones may also be spread in the machine direction of the separator, or in both the machine and cross-machine directions of the separator. It is further appreciated that there may be any number of zones in either or both directions. In addition, the edges of the separator themselves may be their own zone(s), such that the edges are optimized with a distinct design and/or ribbed pattern and/or broken rib pattern or the like for even better results. In certain preferred embodiments herein, the zones of the separator (for a multi-zoned separator) are formed such that the mass of the patterning in each zone is relatively consistent and/or such that the patterned separator runs well on battery formation equipment and/or such that batter formation is faster because of efficiency in acid filling.

Figure 29B:
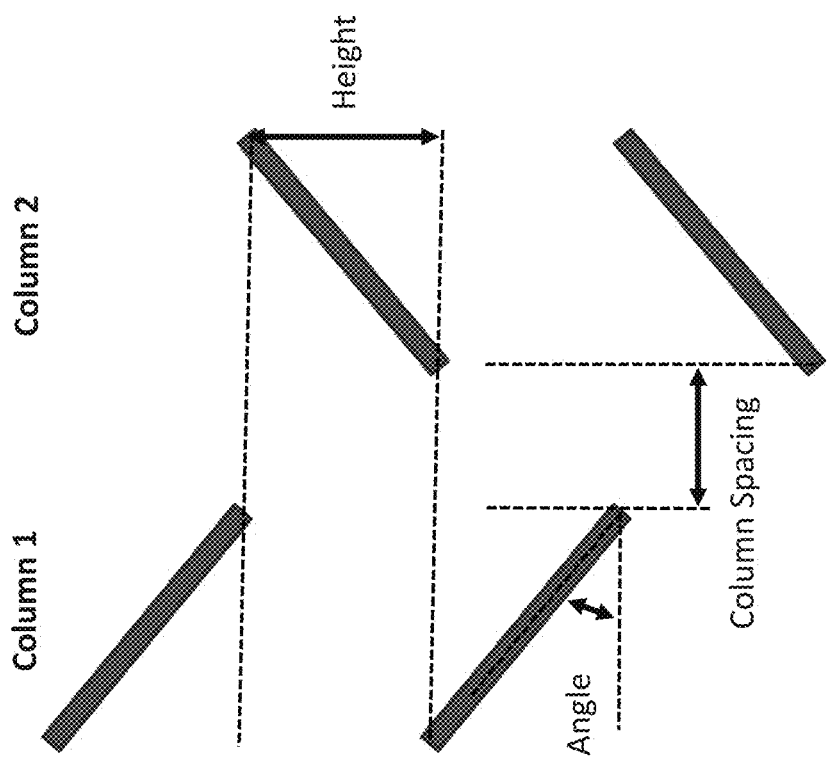
FIG. 29B depicts broken rib variables for a three-zoned broken rib separator.
Figure 29C:
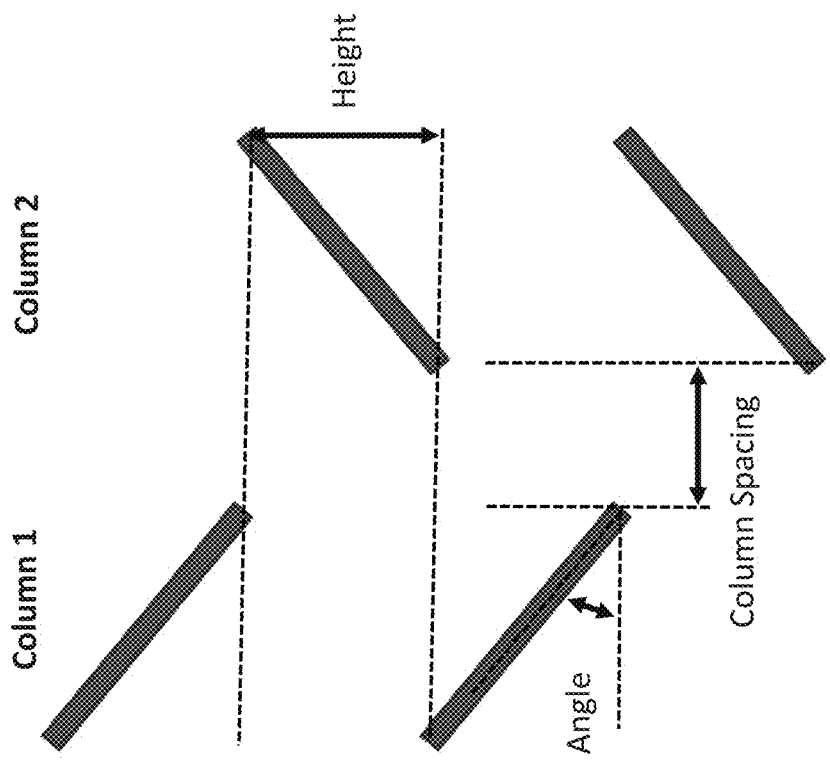
FIG. 29C depicts broken rib variables for a single-zoned broken rib separator.
Figure 30C:
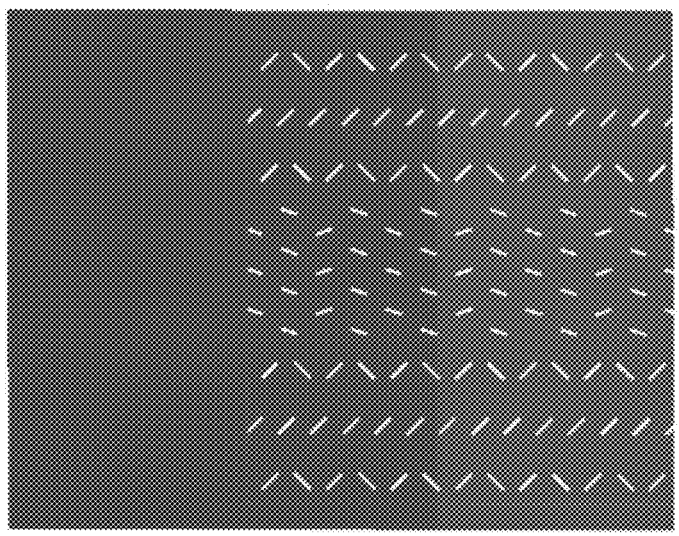
FIGS. 30A-30H depict variations of multiple-zoned broken rib patterned separators.
Figure 30B:
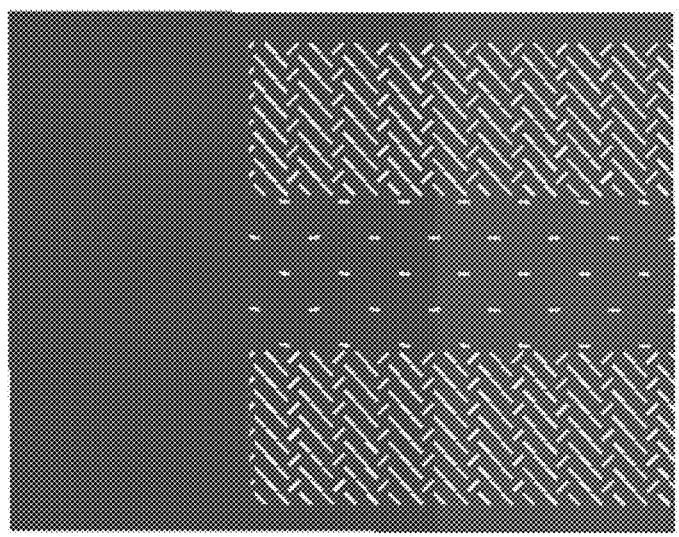
Figure 30A:
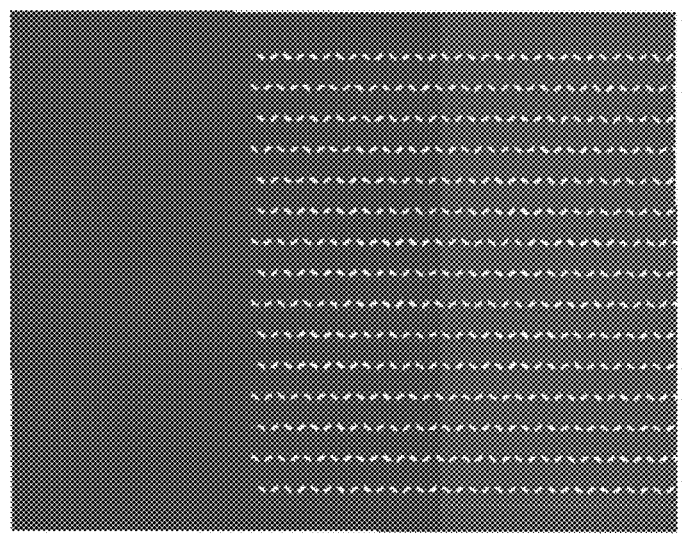
Figure 30D:
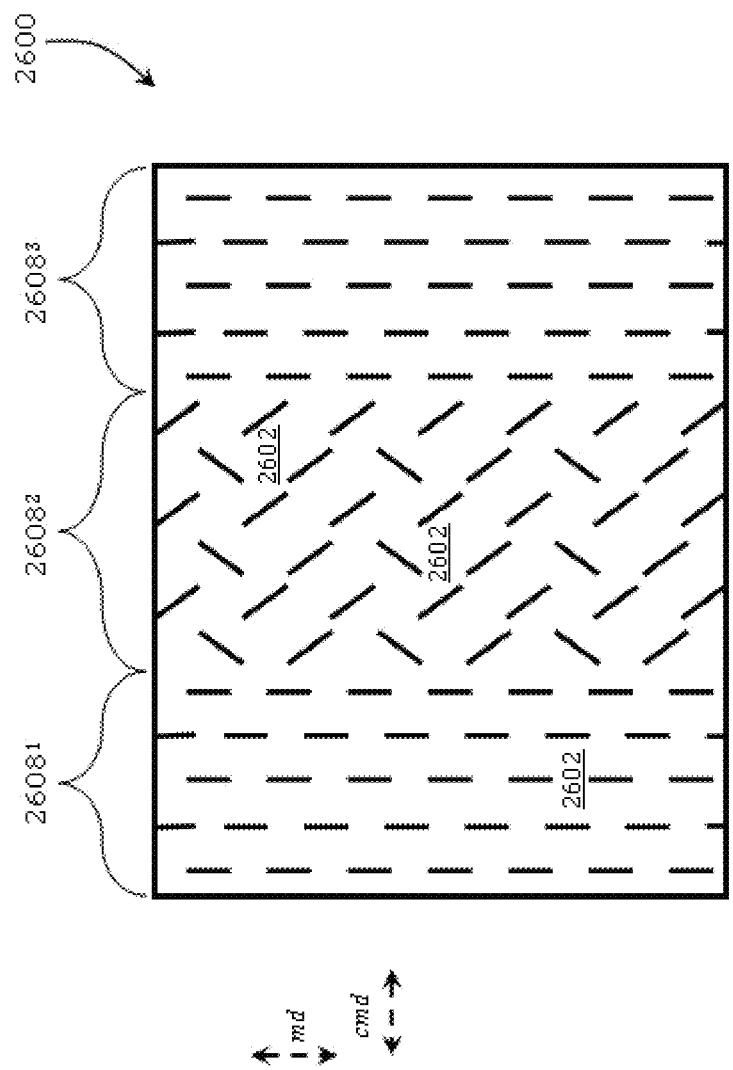
Figure 30E:
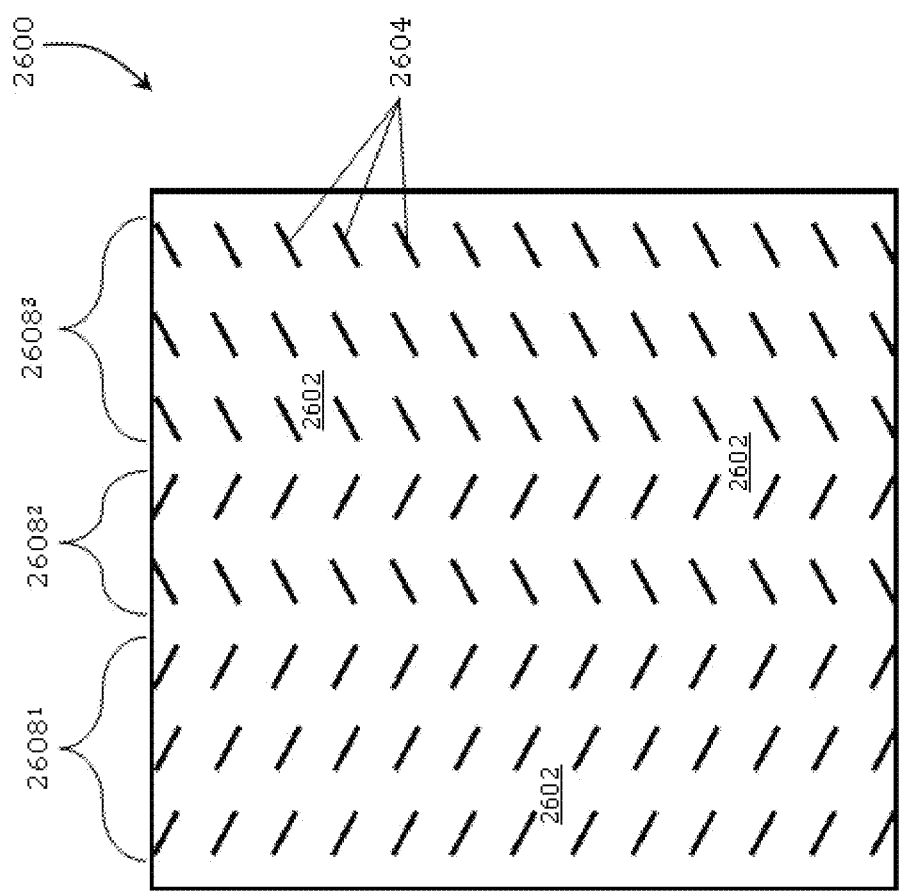
Figure 30F:
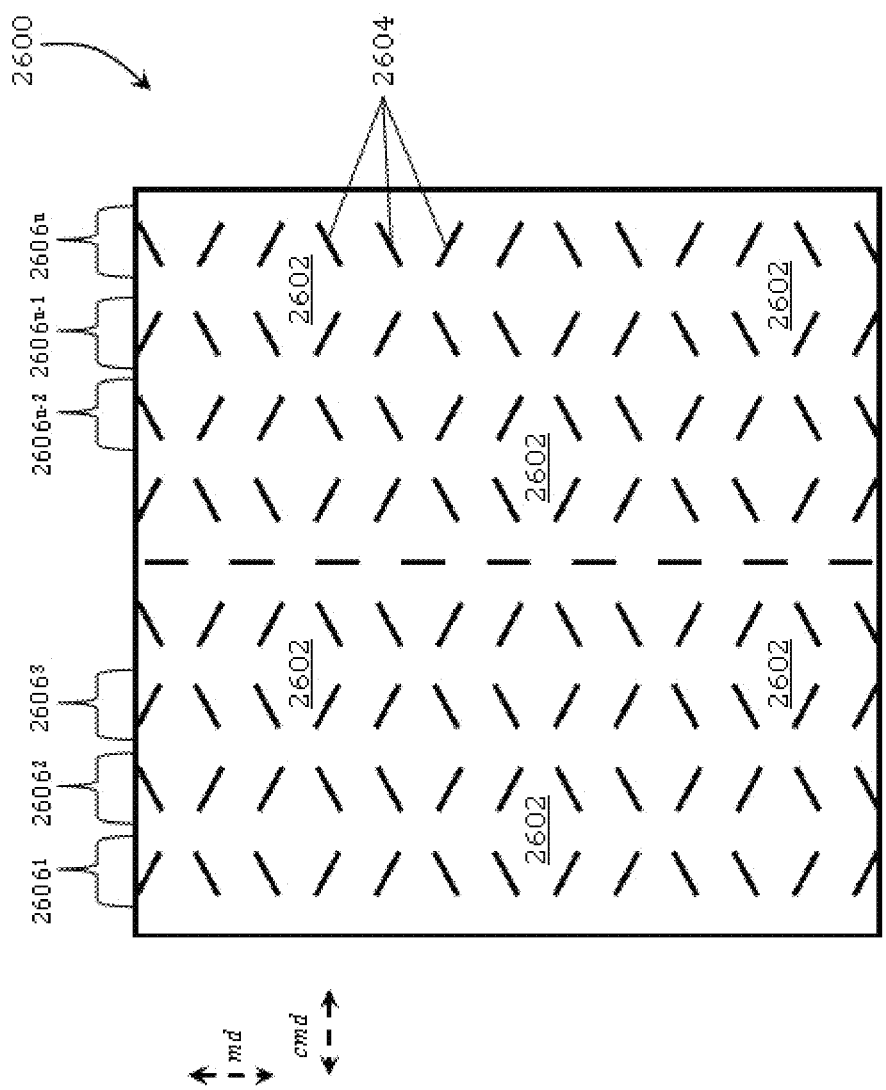
Figure 30G:
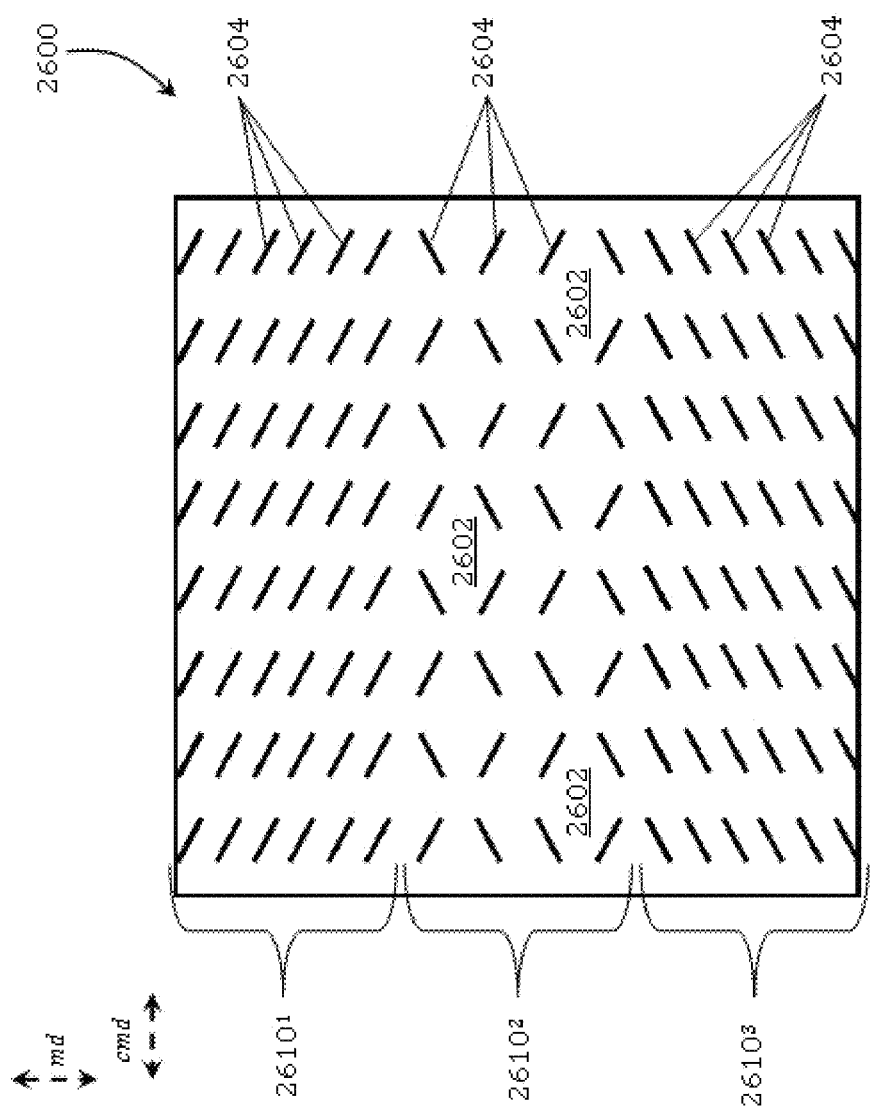
Figure 30H:
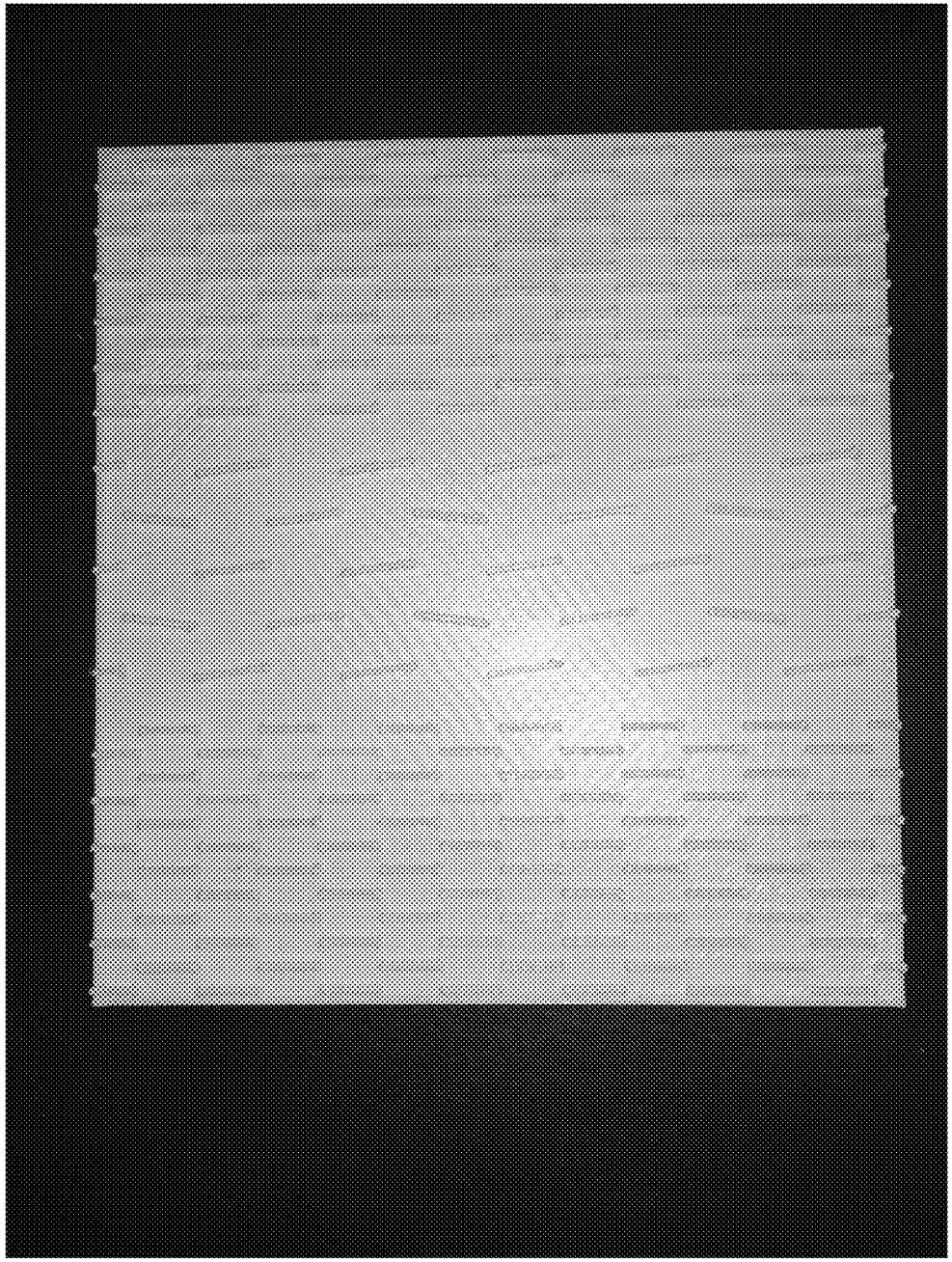

FIG. 29B depicts broken rib pattern variables for the zoned separator. The subscript numbers "1" and "2" relate to two different broken rib patterns. In certain embodiments, zone 1 and zone 3 (subscript "1") incorporate identical patterns, such as broken rib patterns, with zone 2 (subscript "2") having a pattern, such as a broken rib pattern, that varies from that in zones 1 and 3. FIG. 29C depicts broken rib variables for a single-zoned broken rib separator.

FIGS. 30A-30H depict variations of three-zoned broken rib patterned separators.

Figure 31:
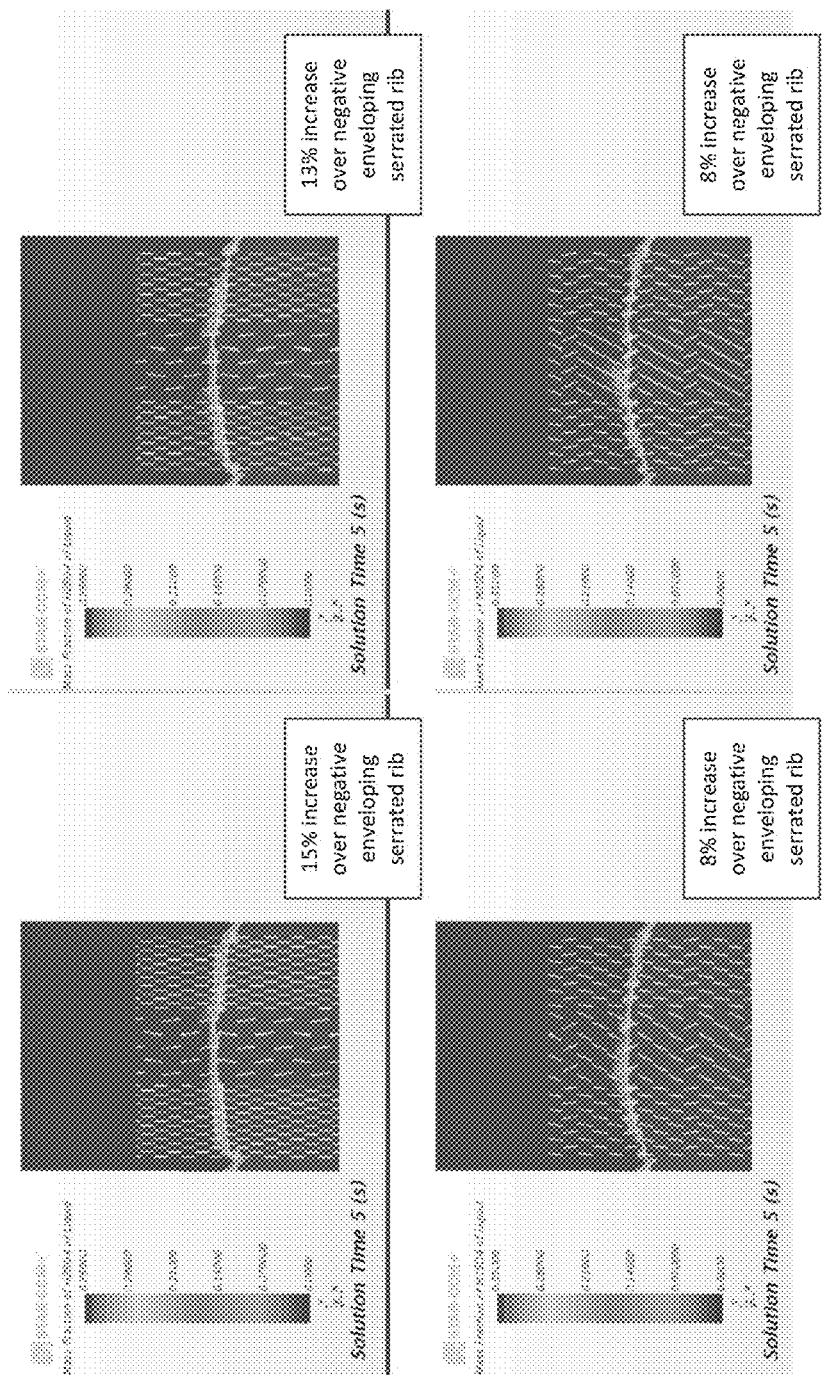
FIG. 31 depicts graphical representations of CFD analyses of four different three-zoned broken rib patterned negative enveloping separators.

FIG. 31 depicts graphical representations of CFD analyses of four different three-zoned broken rib patterned negative enveloping separators.

Figure 32A:
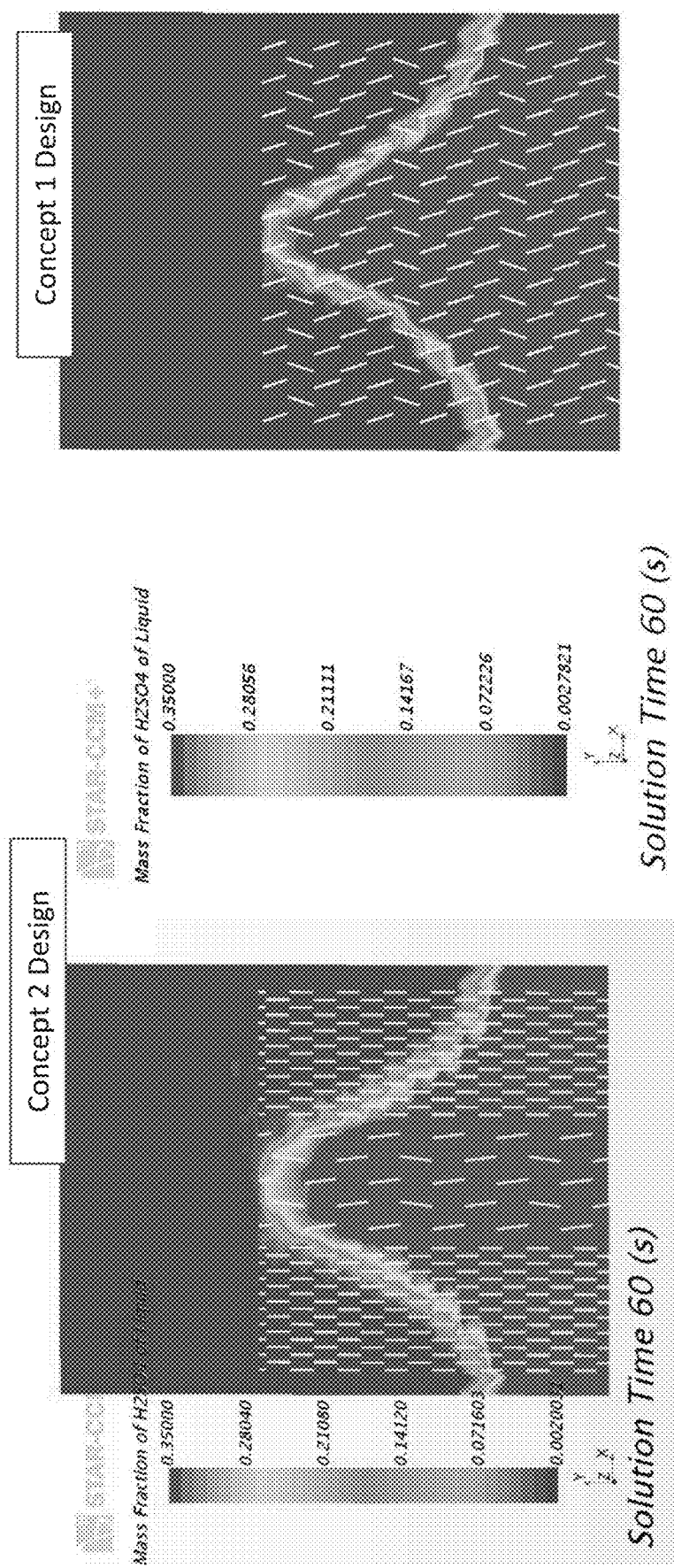
FIG. 32A is a graphical comparison of CFD analyses of a negative enveloping three-zoned broken rib patterned separator and a negative enveloping single zoned broken rib separator (as depicted in FIG. 26D) subjected to a lateral motion.
Figure 32B:
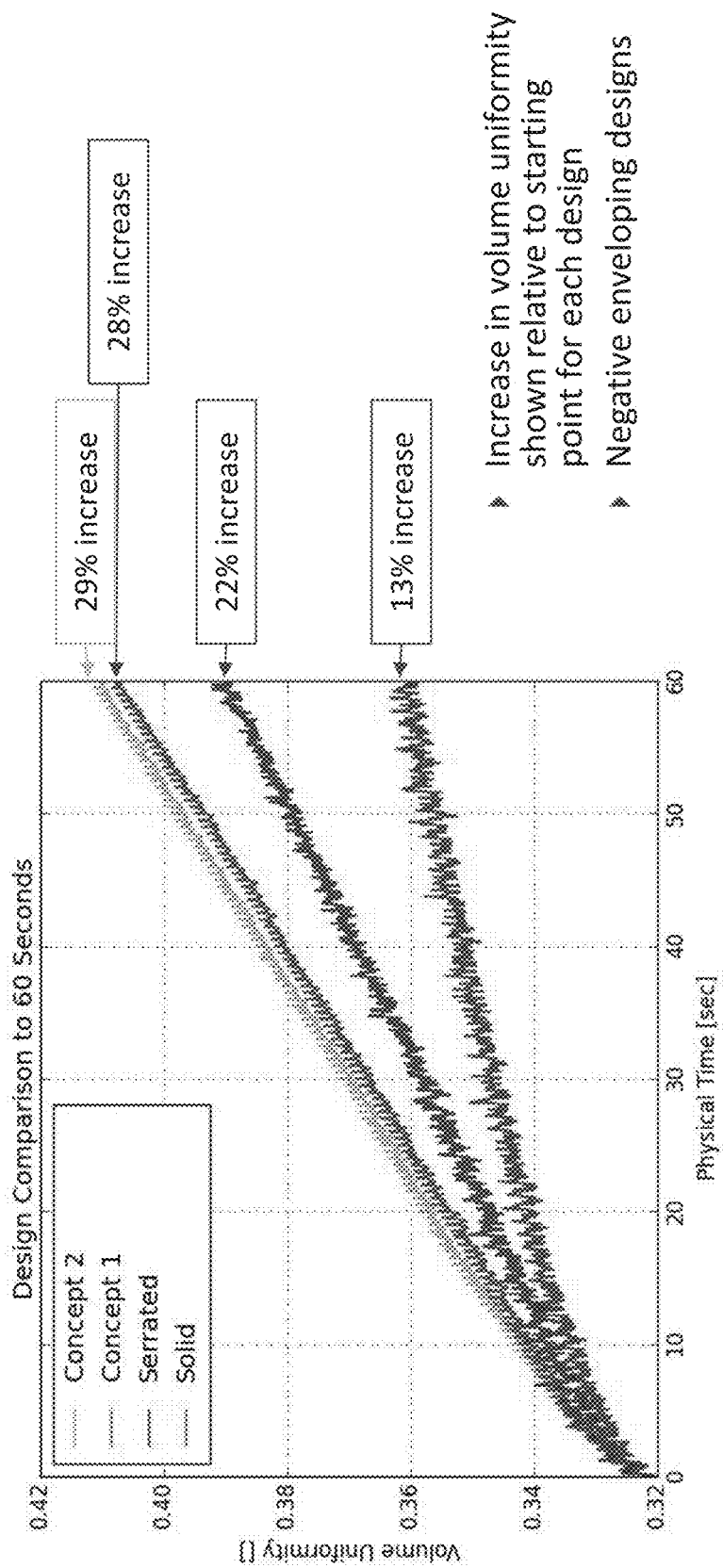
FIG. 32B depicts a comparison of the volume uniformity of several CFD analyses of previously described separators subjected to a lateral motion.

FIG. 32A is a graphical comparison of CFD analyses of a negative enveloping three-zoned broken rib patterned separator and a negative enveloping single zoned broken rib separator (as depicted in FIG. 26D) subjected to a lateral motion. FIG. 32B depicts a comparison of the volume uniformity of the acid fraction of several CFD analyses of previously described separators subjected to a lateral motion; in this graph, the three-zoned separator is shown to yield a 1% increase in mixing as compared to the single-zoned separator.

Figure 33A:
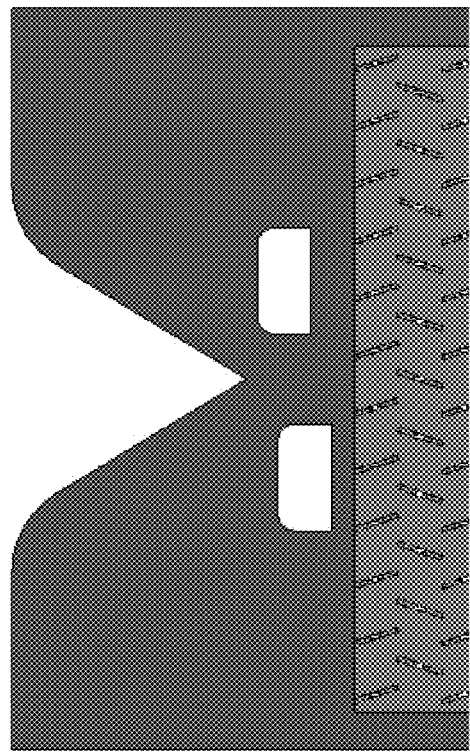
FIGS. 33A-33C illustrate the head space of batteries with splash baffles according to exemplary embodiments of the present disclosure.
Figure 33B:
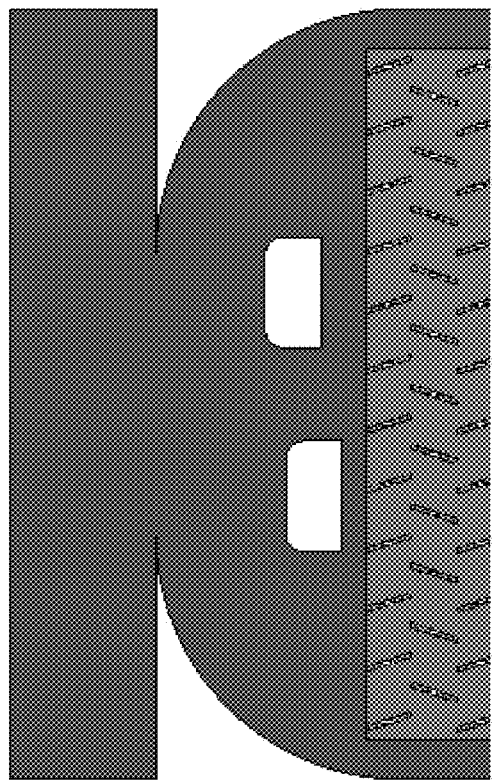
Figure 33C:
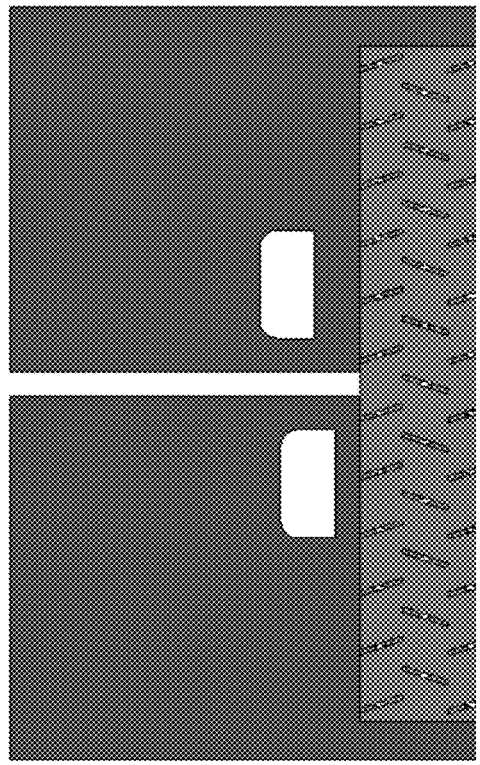
Figure 34A:
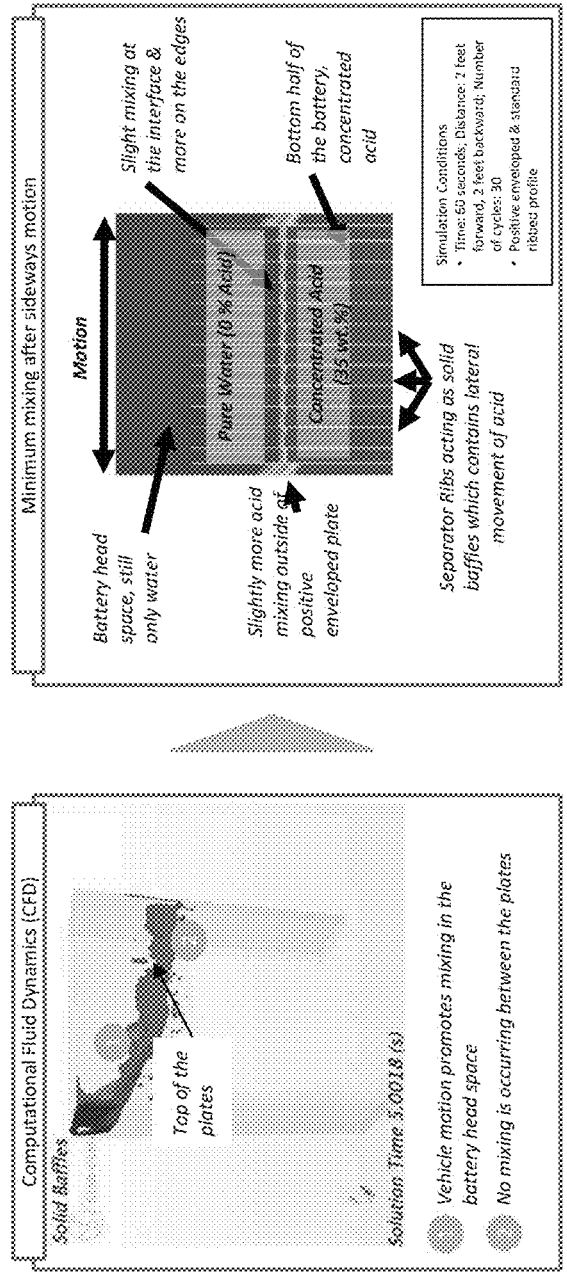
Figure 34B:
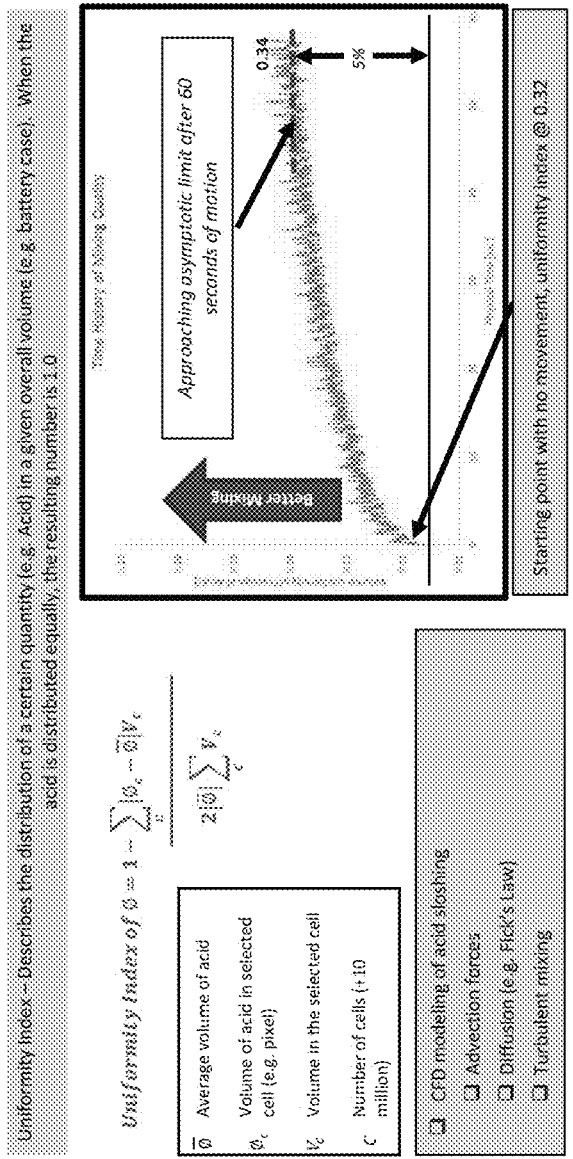
Figure 34C:
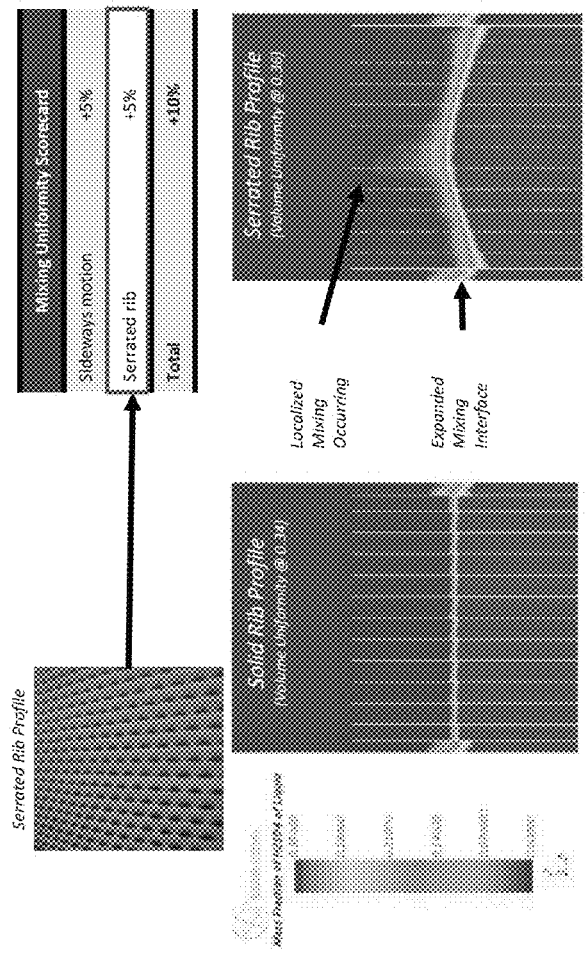
Figure 34D:
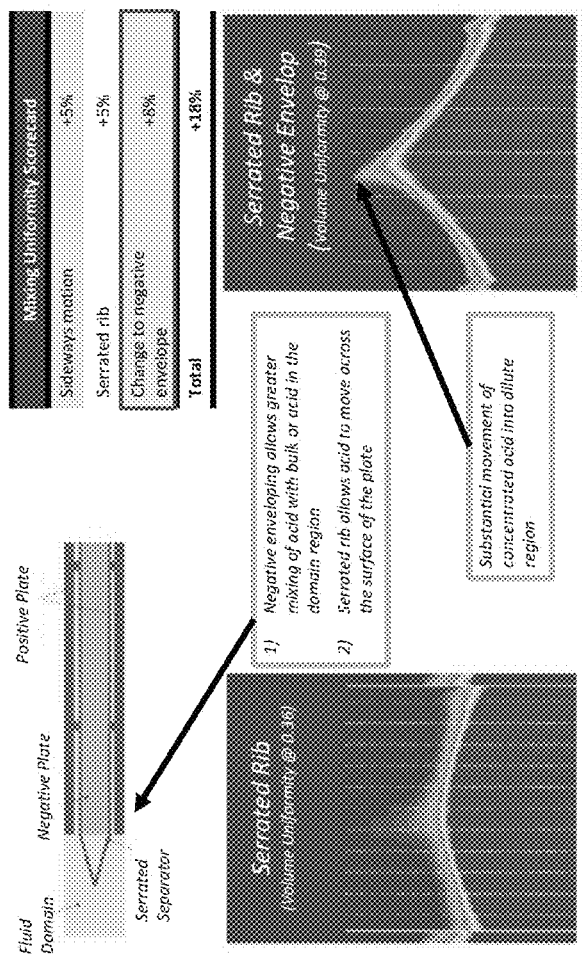
Figure 34E:
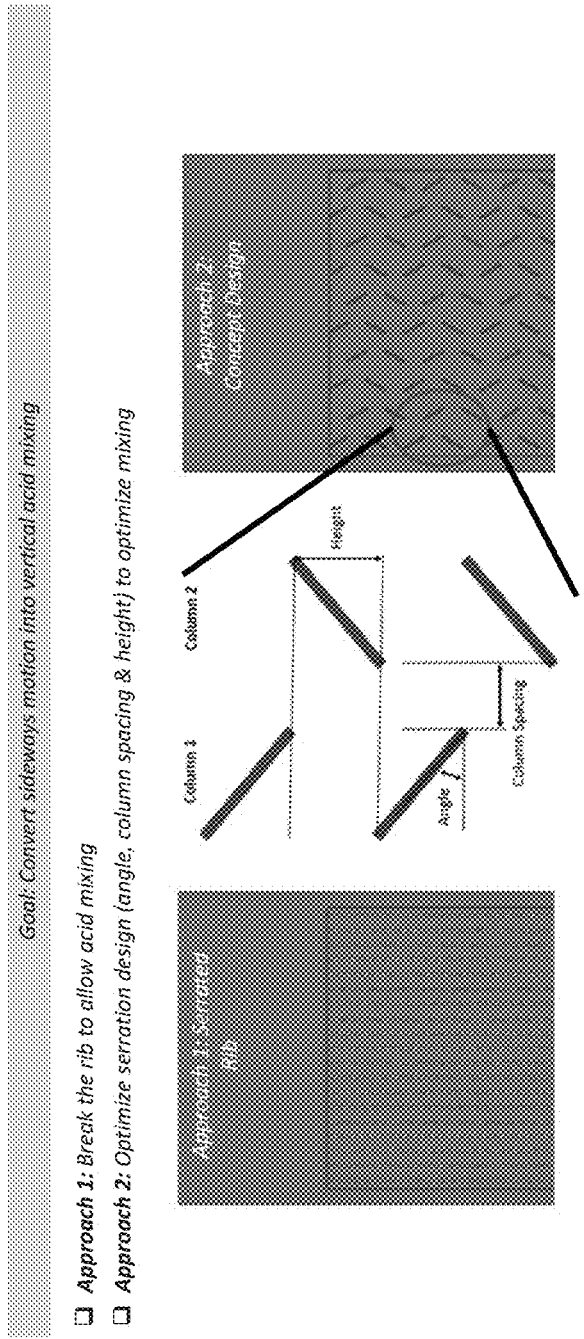
Figure 34F:
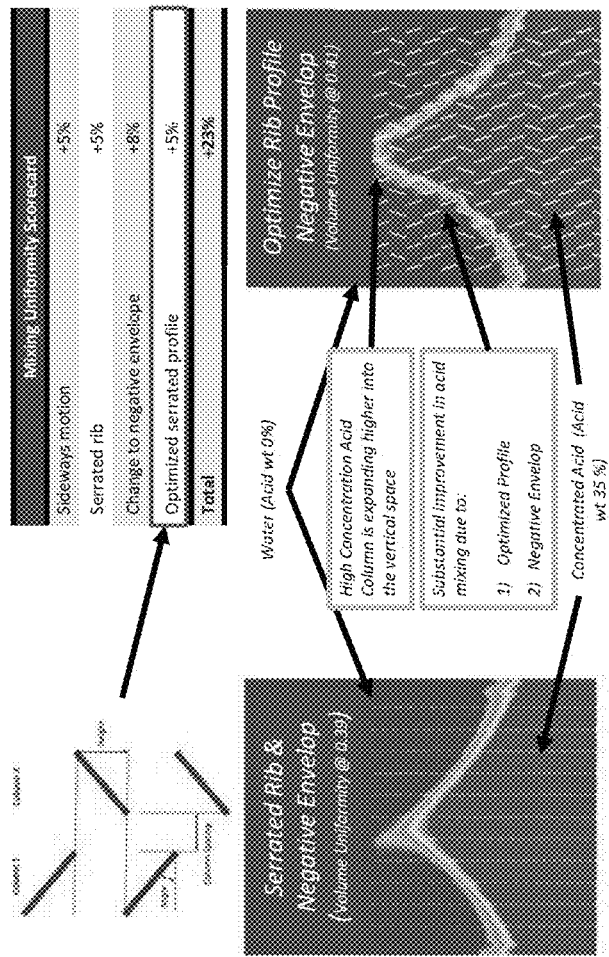
Figure 34G:
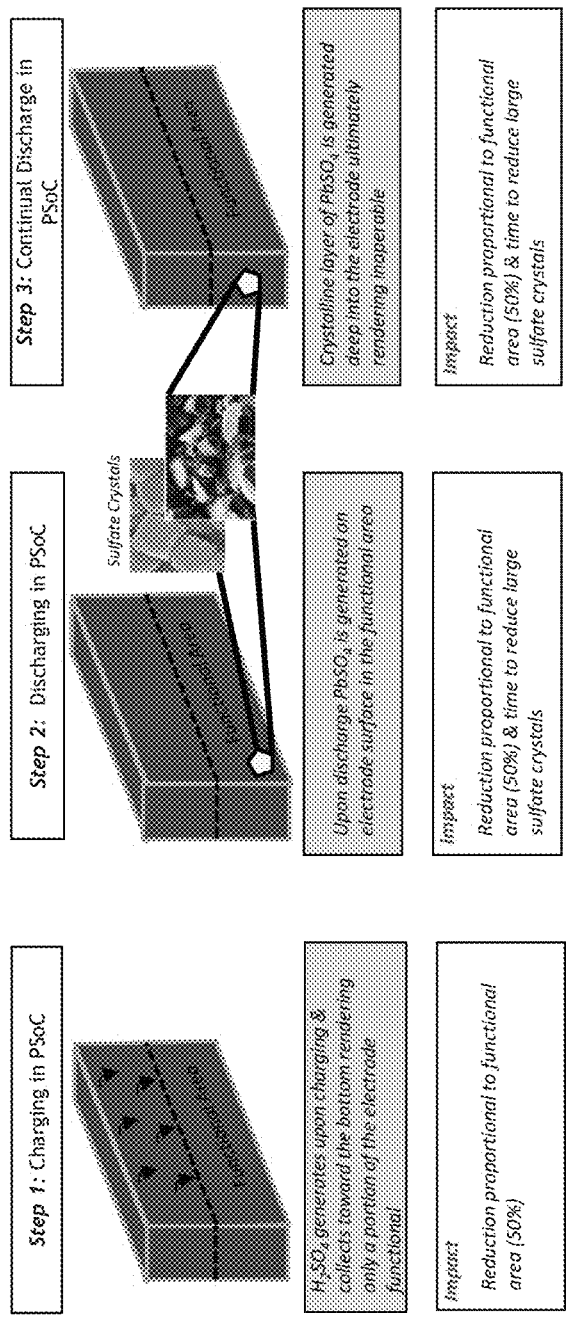
Figure 34H:
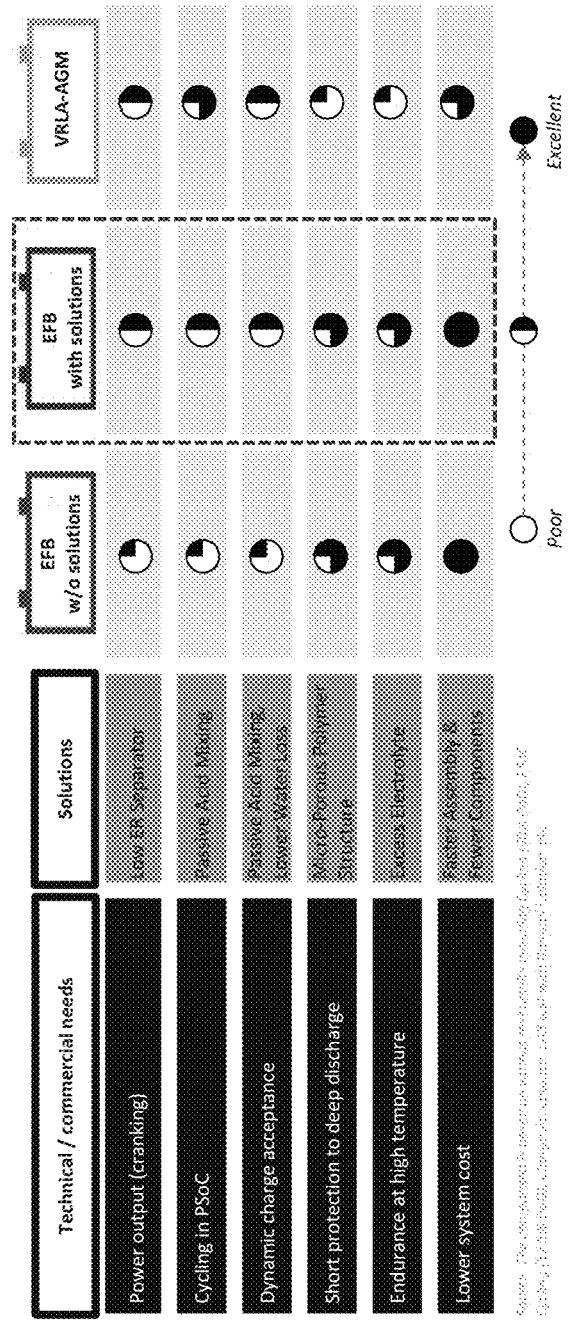

FIGS. 33A-33C illustrate the head space of batteries with splash baffles according to exemplary embodiments of the present disclosure. These splash baffles may be used with any of the exemplary separators described herein. In these embodiments, the head space of each battery is optimized so as to better harness the power or energy (both horizontal and vertical energy) of the moving or sloshing electrolyte and/or acid wave or wave motion to further increase acid mixing and volume uniformity of acid fraction throughout the lead acid batter and along all portions of the electrode plates within the battery so as to approach or even attain a volume uniformity of 1.0 (fully mixed). The splash baffles may be formed or mounted to the lid or interior walls of the battery case, or may take the form of an apparatus that clips onto the electrode straps. The splash baffles may further have flat surfaces, curved convex or concave shapes, concavo-convex shapes, sharp or filleted edges, or any other shape. In addition, the electrode straps may be designed or moved to better cooperate with the splash baffles or any other splashing and/or movement that the electrolyte may experience during the movement of the battery. The splash baffles may also float on the electrode or incorporate one or more pivots so as to optimize the effects of any splashing and/or movement that the electrolyte may experience during the movement of the battery.

Moreover, the battery design may change to help facilitate acid destratification. One such example may include mounting the battery on elastic mounts, such as, for example, springs, or rubber or other visco-elastic material to allow the battery to continue to move or shake after a change in velocity. The battery case may be made taller with more electrolyte added so as to increase head pressure of the overall electrolyte supply within the battery. The battery may also be designed as a horizontal cylinder or oval, or even as a sphere. In addition, the case lid may be designed as a dome.

FIGS. 34A-34I illustrate varied details of exemplary embodiments of the present disclosure.

Figure 35:
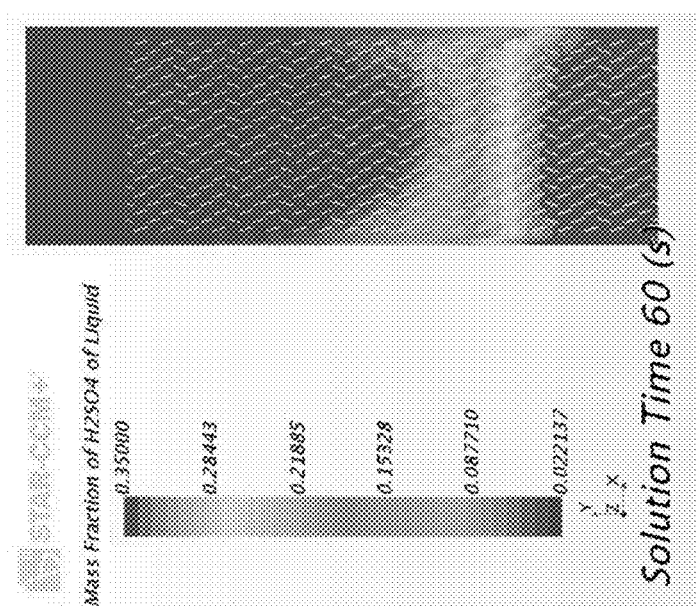
FIG. 35 depicts a separator for a tall cell battery having a rib pattern as substantially shown in FIG. 26D.
Figure 36:
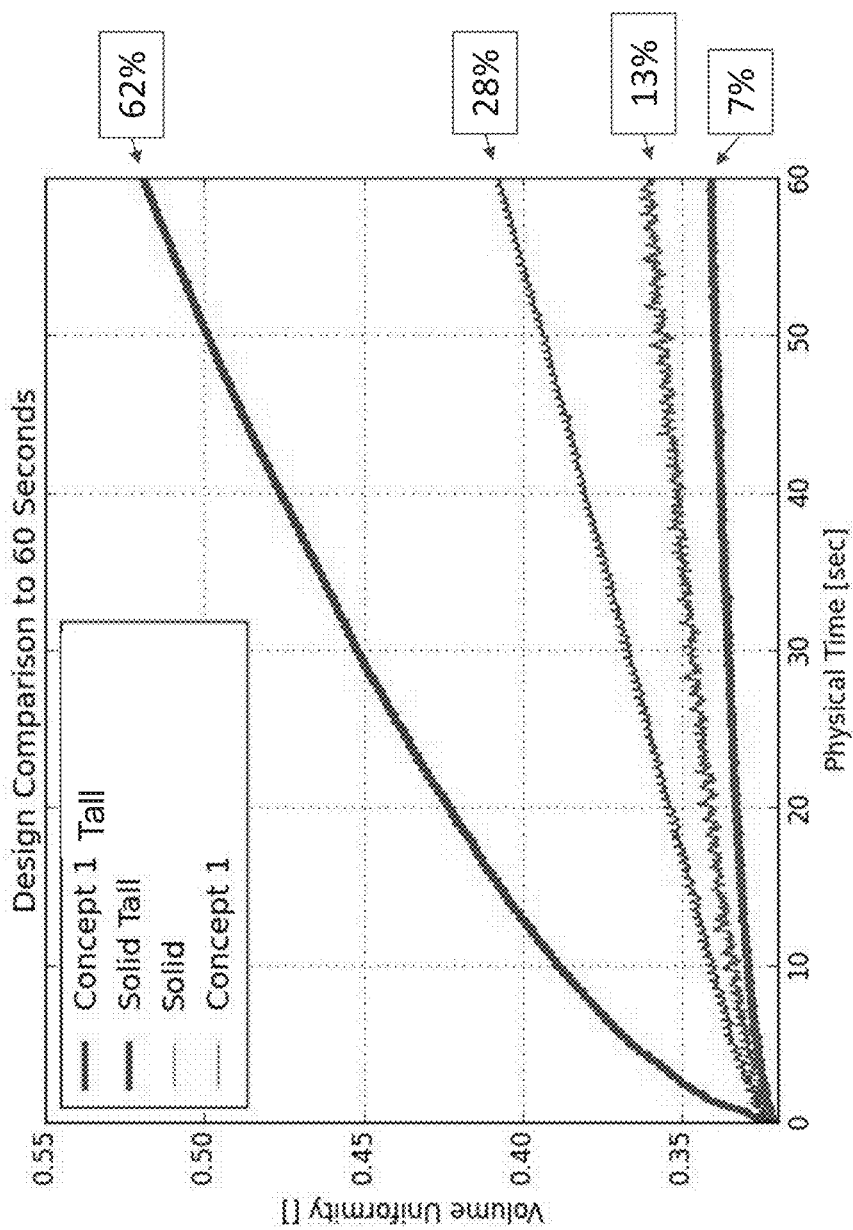
FIG. 36 depicts a changing volume uniformity over time of the CFD analysis of the separator depicted in FIG. 35 compared to that of other separator designs.

FIG. 35 depicts a separator for a tall cell battery having a rib pattern as substantially shown in FIG. 26D. FIG. 36 depicts a changing volume uniformity over time derived from CFD analysis of the separator depicted in FIG. 35 compared to that of other separator designs. The test cells were simulated as being subjected to lateral movement as shown in FIG. 17A, with the separators being parallel to the direction of motion for 60 seconds. The thin bottom line represents a short separator with a solid rib pattern, and the thick bottom line represents a tall separator with a solid rib design. The top thin line represents a short separator with a preferred broken rib pattern, and the top thick line represents a tall separator with a preferred broken rib pattern. As can be seen, the short separator with a solid rib pattern showed a 13% increase in its volume uniformity, compared to the tall separator with a solid rib pattern, which only showed a 7% increase. The short separator with a preferred broken rib pattern showed a 28% increase in its volume uniformity. The tall separator with a preferred broken rib pattern showed a 62% increase in its volume uniformity over 60 seconds of lateral motion. The best increase of the tested lot.

Figure 37:
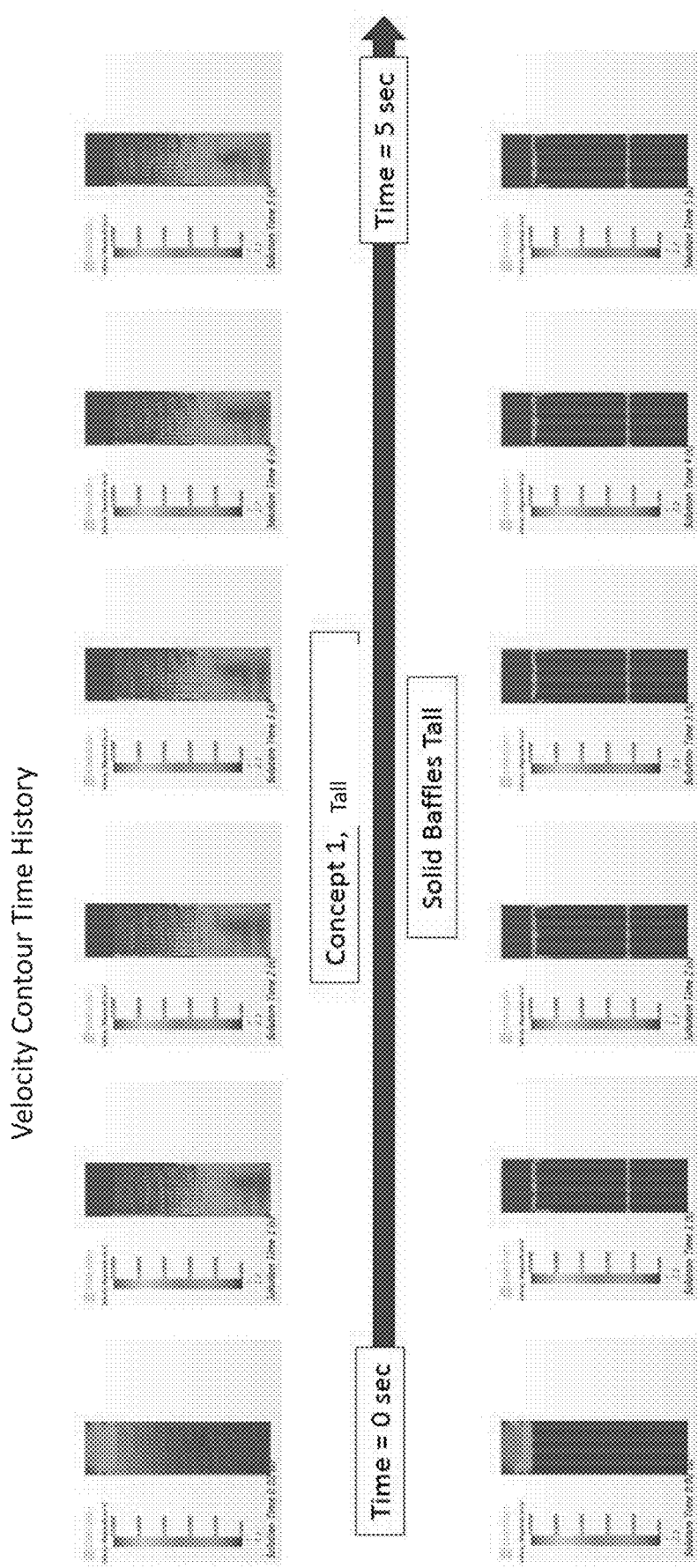
FIG. 37 depicts Velocity Contour Time History comparisons of inventive Concept 1 Tall acid mixing profile with conventional Solid Baffles Tall profile.

FIG. 37 depicts Velocity Contour Time History comparisons of inventive Concept 1 Tall acid mixing profile with conventional Solid Baffles Tall profile.

Figure 38:
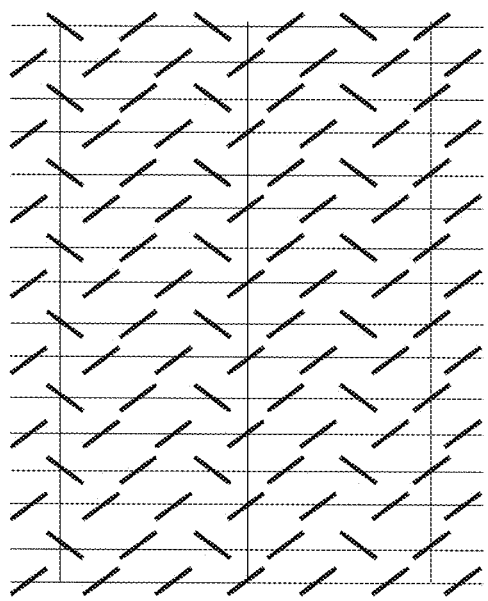
FIG. 38 depicts an exemplary inventive spacer having a pattern of broken ribs that may be placed, for example, between a flat separator and an electrode.

FIG. 38 depicts an exemplary inventive spacer having a pattern of broken ribs that may be placed between a separator and an electrode. As can be seen the broken ribs are held in place by a network of thin stringers. The stringers are shown in a vertical and horizontal arrangement, however it is appreciated that other angles may be incorporated.

Figure 39B:
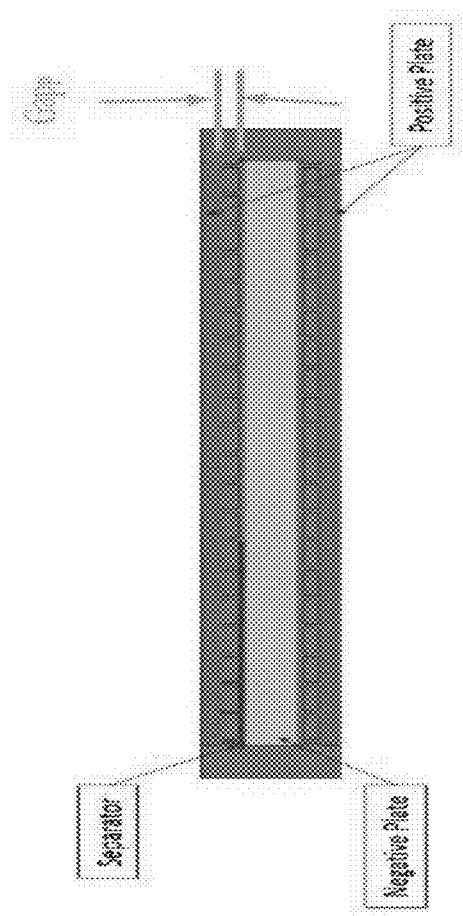
Figure 39C:
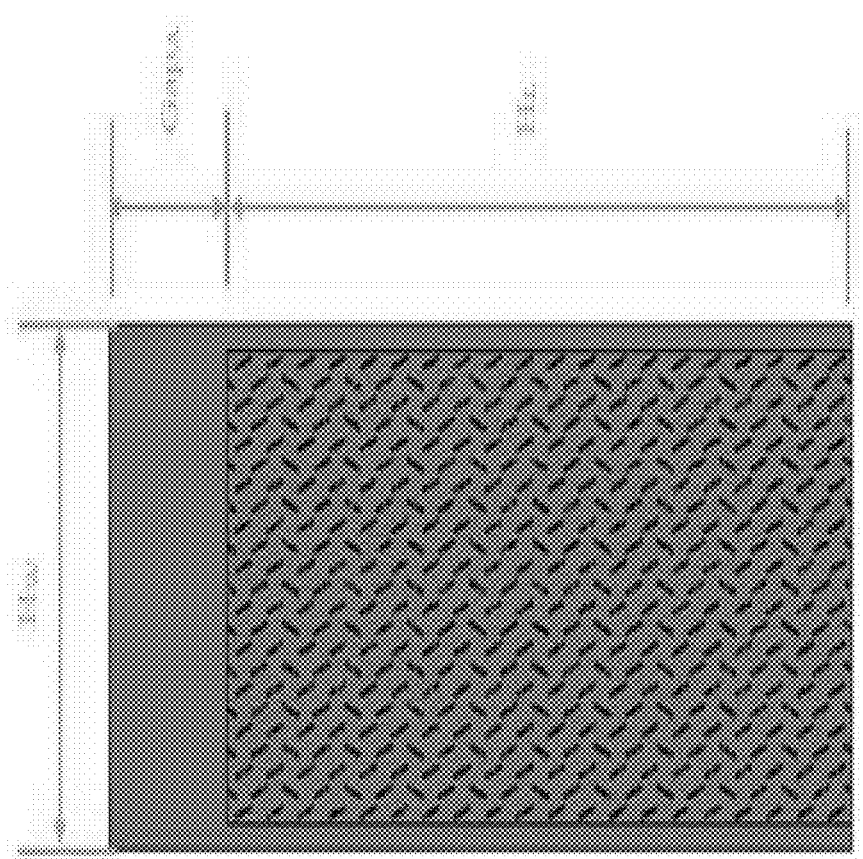

FIGS. 39A-39C depict exemplary embodiments of dimension values depicting inventive Motive Power type separator profiles, spacing, and head space in, for example, tall batteries or battery cases.

Figure 40:
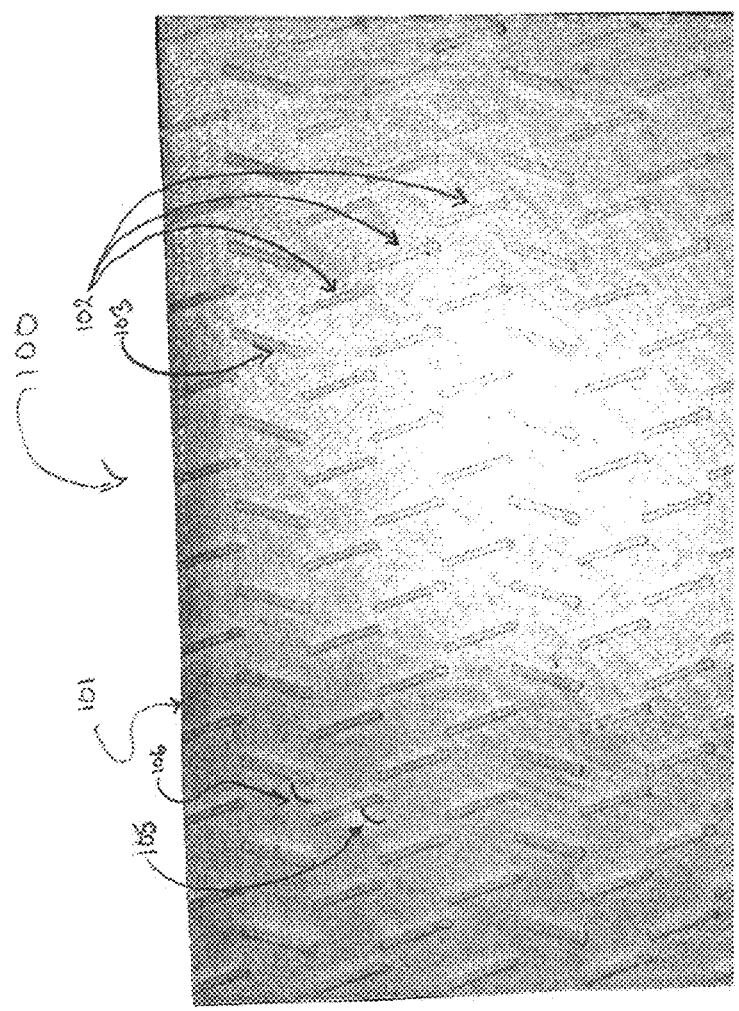
FIGS. 40 and 41 depict profile prototypes of exemplary inventive acid mixing profiles.
Figure 41:
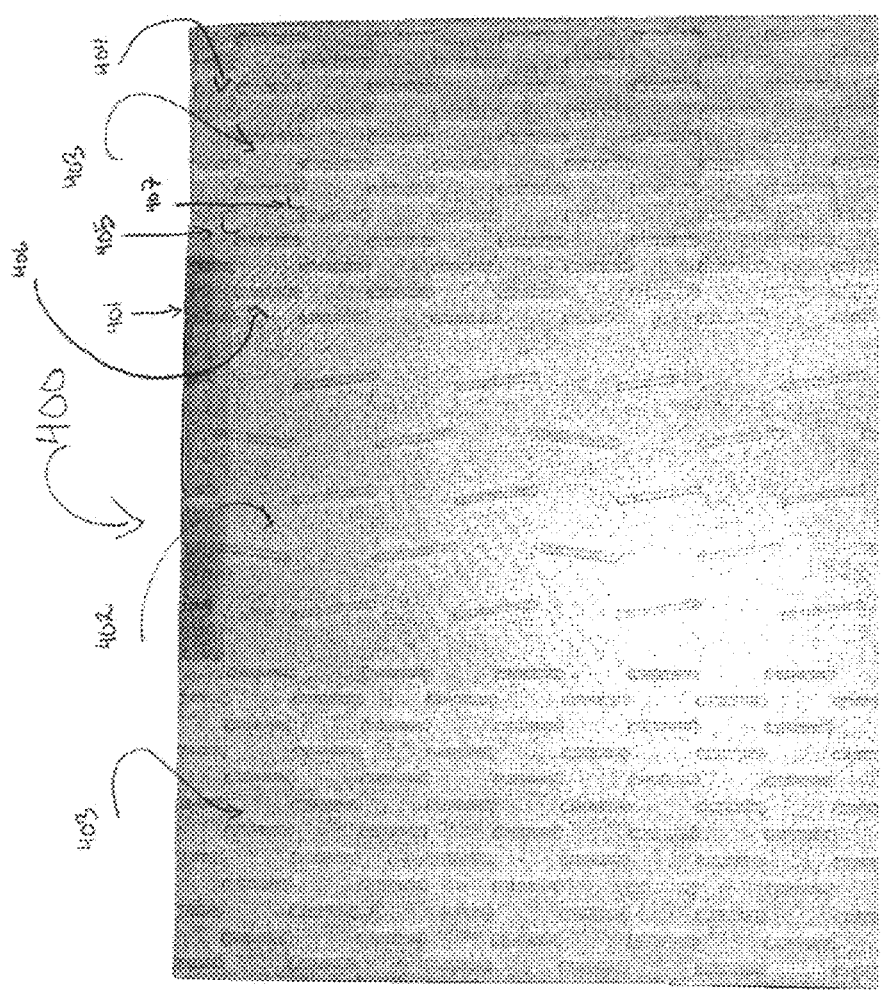

FIGS. 40 and 41 depict profile prototypes of exemplary inventive acid mixing profiles.

FIG. 42 includes images which show the mixing benefit of an inventive profile over a conventional solid rib profile.

Moreover, the battery design may change to help facilitate acid destratification. One such example may include mounting the battery on elastic mounts, such as, for example, springs, or rubber or other visco-elastic material to allow the battery to continue to move or shake after a change in velocity. The battery case may be made taller with more electrolyte added so as to increase head pressure of the overall electrolyte supply within the battery. The battery may also be designed as a horizontal cylinder or oval, or even as a sphere. In addition, the case lid may be designed as a dome.

The separators described herein may further be used in combination with other devices used for acid stratification prevention/reversal, such as, for example, weir devices, dip tubes, acid pumps or bubblers, displacement devices or any combination thereof. Many such devices are disclosed in the following: U.S. Patent App. Pub. Nos. 2012/0214032 to Franklin, et al., 2004/0067410 to Jones, and 2003/0148170 to Jones, and U.S. Pat. No. 6,274,263 to Jones, U.S. Pat. No. 4,629,622 to Yonezu, et al., and U.S. Pat. No. 4,565,748 to Dahl; all of which are incorporated herein by reference. The separator may be proved in leafed form, envelope, or as a full tube/sleeve. The separator may further be provided with a full side crimp/seal or intermittent crimps/seals, and may even be provided with openings at the bottom crease of the folded separator.

It is appreciated that any of the rib patterns described herein may have a spacing between columns to allow for gas to rise during over-charging events. Further, the broken rib pattern may have no spacing in the machine direction between the rows of broken ribs to provide strength if the separator is folded to form an envelope. In addition, the broken rib separators may further be embossed. It is further appreciated that any of the rib patterns or other protrusions may be disposed on any interior surface of the battery case or on any surface on either or both of the positive and negative electrodes. For batteries placed in vehicles, a preferred embodiment may place the separators in an orientation that is generally parallel to the motion of the vehicle so as to take advantage of the starting and stopping motion of that vehicle.

It is believed that the improved separators described herein, such as the broken rib separators described herein, may further help to prevent the formation of sulfation crystals, and may also assist in provided a more uniform thermal distribution and/or thermal mixing and/or thermal or heat dissipation (dissipating heat in a lower amount of time, compared with known separators, such as solid ribbed separators, for flooded lead acid batteries) across the separator. It is also believed that the exemplary broken rib separators described herein may also provide improved or faster or more efficient filling of flooded lead acid batteries, gel batteries, and/or enhanced flooded batteries.

In various embodiments of the present disclosure, the disclosed separator provides for reduced acid stratification, or even the complete elimination of acid stratification altogether, such that the mixing level or volume uniformity of the acid or electrolyte within the flooded lead acid battery is 1.0 or nearly approaches 1.0. In various embodiments, the separator disclosed herein is also a low electrical resistance (ER) separator. In such embodiments, the separator may contain improvements, such as improved fillers, which increase the porosity, pore size, internal pore surface area, wettability and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. By way of example, the improved separator is formed using a silica having an intrinsic oil absorption value of about 175-350 ml/100 g, in some embodiments, 200-350 ml/100 g, in some embodiments, 250-350 ml/100 gm, and in some further embodiments, 260-320 ml/100 g, though other oil absorption values are possible as well.

The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (such as polar species, such as metals) that facilitate the flow of electrolyte and ions across the separator. Such also leads to decreased overall electrical resistance as such a separator is used in a flooded battery, such as an enhanced flooded battery.

The low ER microporous separators herein further may comprise a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In some instances, the improved battery comprising the improved separator with the improved pore morphology and/or fibril morphology may exhibit 20% lower, in some instances, 25% lower, in some instances, 30% lower electrical resistance, and in some instances, even more than a 30% drop in electrical resistance ("ER") (which may reduce battery internal resistance) while such a separator retains and maintains a balance of other key, desirable mechanical properties of lead acid battery separators. Further, in certain embodiments, the separators described herein have a novel and/or improved pore shape such that more electrolyte flows through or fills the pores and/or voids as compared to known separators. The ultrahigh molecular weight polyethylene in the separator may comprise polymer in a shish-kebab formation comprising a plurality of extended chain crystals (the shish formations) and a plurality of folded chain crystals (the kebab formations), wherein the average repetition or periodicity of the kebab formations is from 1 nm to 150 nm, preferably, from 10 nm to 120 nm, and more preferably, from 20 nm to 100 nm (at least on portions of the rib side of the separator). In certain of these low ER embodiments of the present separator, the separator for a lead acid battery described herein comprises a filler selected from the group consisting of silica, precipitated silica, fumed silica, and precipitated amorphous silica; wherein the molecular ratio of OH to Si groups within said filler, measured by $^{29}$Si-NMR, is within a range of from 21:100 to 35:100, in some embodiments, 23:100 to 31:100, in some embodiments, 25:100 to 29:100, and in certain preferred embodiments, 27:100 or higher.

In certain selected embodiments, the disclosed separators exhibit decreased electrical resistance, for instance, an electrical resistance no greater than about 200 mΩ·cm², 180 mΩ·cm², 160 mΩ·cm², 140 mΩ·cm², 120 mΩ·cm², 100 mΩ·cm², 80 mΩ·cm², 60 mΩ·cm², 50 mΩ·cm², 40 mΩ·cm², 30 mΩ·cm², or 20 mΩ·cm². In various embodiments, the separators described herein exhibit about a 20% or more reduction in ER compared with a known separator of the same thickness. For example, a known separator may have an ER value of 60 mΩ·cm²; thus, a separator according to the present invention at the same thickness would have an ER value of less than about 48 mΩ·cm². The separators described herein having low ER may have any or all of the features set forth in U.S. Provisional Patent Application No. 62/319,959, owned by Daramic, LLC and filed Apr. 8, 2016, which provisional application is hereby incorporated by reference in its entirety.

In accordance with at least selected embodiments, the present disclosure is directed to improved lead-acid batteries, such as flooded lead-acid batteries, improved systems that include a lead-acid battery, and/or a battery separator, improved battery separators, improved vehicles including such systems, methods of manufacture or use, or combinations thereof. In accordance with at least certain embodiments, the present disclosure is directed to improved flooded lead-acid batteries, improved battery separators for such batteries, and/or methods of manufacturing, testing, or using such improved flooded lead-acid batteries, or combinations thereof. In addition, disclosed herein is a method, system, battery, and/or battery separator for reducing acid stratification, enhancing battery life and performance in a flooded lead-acid battery.

Exemplary separators as disclosed herein may preferably be characterized by having or by providing improved conductance over time. Conductance may be determined as cold-cranking amps (CCA), measured for instance in a Midtronics tester. For instance, a lead-acid battery equipped with the inventive separator can exhibit a decrease of less than 10%, less than 9%, less than 8%, less than 7%, less than 6%, less than 5%, less than 4%, less than 3%, less than 2%, less than 1%, or less than 0.5% CCA over a period of 30 days as measured by a Midtronics CCA tester.

The inventive separator preferably includes a porous membrane (such as a microporous membrane having pores less than about 1 micron, mesoporous, or a macroporous membrane having pores greater than about 1 micron) made of natural or synthetic materials, such as polyolefin, polyethylene, polypropylene, phenolic resin, PVC, rubber, synthetic wood pulp (SWP), glass fibers, cellulosic fibers, or combinations thereof, more preferably a microporous membrane made from thermoplastic polymers. The preferred microporous membranes may have pore diameters of about 0.1 micron (100 nanometers) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, such as ultrahigh molecular weight polyethylene (UHMWPE), and polypropylene. One preferred embodiment may include a mixture of filler (for example, silica) and UHMWPE.

The porous membrane layer can include a polyolefin, such as polypropylene, ethylene-butene copolymer, and preferably polyethylene, more preferably high molecular weight polyethylene, (e.g., polyethylene having a molecular weight of at least 600,000), even more preferably ultra-high molecular weight polyethylene, (e.g., polyethylene having a molecular weight of at least 1,000,000, in particular more than 4,000,000, and most preferably 5,000,000 to 8,000,000 (measured by viscosimetry and calculated by Margolie's equation)), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the porous membrane can include an ultrahigh molecular weight polyethylene (UHMWPE) mixed with a processing oil and precipitated silica. In accordance with at least one embodiment, the microporous membrane can include an ultrahigh molecular weight polyethylene (UHMWPE) mixed with a processing oil, additive and precipitated silica. The mixture may also include minor amounts of other additives or agents as is common in the separator arts (such as wetting agents, colorants, antistatic additives, and/or the like). In certain instances, the microporous polymer layer can be a homogeneous mixture of 8 to 100 vol. % of polyolefin, 0 to 40 vol. % of a plasticizer and 0 to 92 vol. % of inert filler material. The filler may be dry, finely divided silica. The preferred plasticizer is petroleum oil. Since the plasticizer is the component which is easiest to remove from the polymer-filler-plasticizer composition, it is useful in imparting porosity to the battery separator.

In some embodiments, the porous membrane may be made by mixing, in an extruder, about 30% by weight silica with about 10% by weight UHMWPE, and about 60% processing oil. The microporous membrane can be made by passing the ingredients through a heated extruder, passing the extrudate generated by the extruder through a die and into a nip formed by two heated calender rolls to form a continuous web, extracting a substantial amount of the processing oil from the web by use of a solvent, drying the extracted web, slitting the web into lanes of predetermined width, and winding the lanes into rolls. The calender rolls may be engraved with various groove patterns to impart ribs, serrations, embossments and the like to the membrane. Alternatively, or additionally, ribs and the like may be imparted to the porous membrane by passing the extruded membrane through additional appropriately grooved calender rolls or presses.

The porous membrane can be provided in various ways with the additive, surfactant, agents, fillers, or additives. For example, the additive or additives may be applied to the porous membrane when it is finished (e.g., after the extraction) and/or added to the mixture used to produce the membrane. According to a preferred embodiment, the additive or a solution of the additive is applied to the surface of the porous membrane. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the microporous membrane.

The application may also take place by dipping the microporous membrane in the additive or a solution of the additive and subsequently optionally removing the solvent, e.g. by drying. In this way the application of the additive can be combined for example with the extraction often applied during separator production.

Another preferred option is to mix the additive or additives into the mixture of thermoplastic polymer and optionally fillers and other additives which is used to produce the porous membrane. The additive-containing homogeneous mixture is then formed into a web-shaped material.

The inventive separator may be a Low ER separator, a Low Water Loss separator, and/or can have at least a portion including protrusions, broken ribs, serrated ribs, discontinuous ribs, and/or the like (rather than solid ribs) to improve the acid mixing or conductance of the separator. Protrusions include features such as short rib segments, nubs, embossments, and the like. The protrusions can be on either face, or both faces of the separator. Typically, the protrusions will at least be on the side facing the positive plate (the positive active material or PAM). The protrusions can be arranged in rows, the protrusions in each row being spaced apart from each other and from the protrusions in adjacent rows. In some instances, the protrusions can be located on the side of the separator facing the positive active material, the side of the separator facing the negative active material (or NAM), or both sides of the separator.

In some embodiments of the present invention, the protrusions are ribs having a rib height of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, or 1.5 mm.

In some embodiments of the present invention, the protrusions are short length ribs having a rib width of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, or 1.5 mm. The ribs can have a width between about 0.005-1.5 mm, 0.01-1.0 mm, 0.025-1.0 mm, 0.05-1.0 mm, 0.075-1.0 mm, 0.1-1.0 mm, 0.2-1.0 mm, 0.3-1.0 mm, 0.4-1.0 mm, 0.5-1.0 mm, 0.4-0.8 mm or 0.4-0.6 mm.

The separator may include negative longitudinal or cross-ribs or mini-ribs, such as negative ribs having a height of about 25 to 250 microns, possibly preferably about 50 to 125 microns, and more preferably about 75 microns.

In certain embodiments, the protrusions can include ribs, wherein each rib has a longitudinal axis disposed at an angle from 0° to less than 180° relative to the top edge of the separator. In some instances, all the ribs in the separator can be disposed at the same angle, whereas in other embodiments, there can be ribs disposed at different angles. For instance, in some embodiments, the separator can include rows of ribs, wherein at least some of the rows have ribs at an angle θ relative to the top edge of the separator. All the ribs in a single row can have the same approximate angle, although in other cases a single row can contain ribs at differing angles.

In certain cases, an entire face of the separator will contains rows of protrusions, while in other embodiments, certain fragments of the separator face will not include protrusions. These fragments may occur along any edge of the separator, including top, bottom or sides, or may occur towards the middle of the separator, wherein the fragment is surround on one or more sides with portions having protrusions.

In certain possibly preferred embodiments with broken ribs (see FIG. 1), the portion will contain at least two sets of rows, wherein ribs in the first row are disposed at an angle from 0° to less than 180°, and ribs in the second row are disposed an angle from 0° to less than 180°, which may be the same or different than the angle for the ribs in the first set of rows. FIG. 40 includes a depiction of a separator (100) including a top edge (101) having sets of first (102) and second (103) rows.

In certain other possibly preferred embodiments (see FIG. 41), the second portion will contain at least two sets of rows, wherein ribs in the first row are disposed at an angle from 0° to less than 180°, and ribs in the second row are disposed an angle from 0° to less than 180°, which may be the same or different than the angle for the ribs in the first set of rows. FIG. 41 includes a depiction of a separator (400) including a top edge (401) having a central first portion (402) and outer second (403) portions.

In some instances, the second portion will include a fifth set of rows having ribs, designated herein $R^5$ (404), having an angle $\theta^5$ (405) relative to the top edge of the backweb, wherein $\theta^5$ is from 0° to 90°, from 30° to 85°, from 45° to 85°, from 60° to 85°, from 60° to 80°, or from 60° to 75°. A preferred value for $\theta^5$ is 90°. The portion can include a sixth set of rows, designated herein $R^6$ (406), having an angle $\theta^6$ (407), having ribs having an angle $\theta^6$ relative to the top edge of the backweb, wherein $\theta^6$ is from 90° to less than 180°, from 95° to 150°, from 95° to 120°, from 100° to 120°, or from 105° to 120°. A preferred value for $\theta^6$ is 90°. The ribs in different rows can have the same (as shown in 400) or different dimensions. The distance between adjacent rows can be from −5 to 5 mm, wherein negative numbers indicate the degree of overlap of the rows. The distance can be measured center-rib to center-rib.

When different rows are present, the rows may occur in a repeating pattern. The simplest repeating pattern $-R^5-R^6-$, may be seen in (400). Other patterns include $-R^5-R^5-R^6-$; $-R^5-R^5-R^5-R^6-$; $-R^5-R^5-R^6-R^6-$; $-R^5-R^5-R^5-R^5-R^6-$; $-R^6-R^5-R^5-R^5-R^6-$; $-R^5-R^5-R^5-R^6-R^6-$; and the like.

In some selected embodiments, the porous separator can have negative longitudinal or cross-ribs on the opposite face of the membrane as the protrusions. The negative or back rib can be parallel to the top edge of the separator, or can be disposed at an angle thereto. For instance, the cross ribs can be oriented about 90°, 80°, 75°, 60°, 50°, 45°, 35°, 25°, 15° or 5° relative to the top edge. The cross-ribs can be oriented about 90-60°, 60-30°, 60-45°, 45-30°, or 30-0° relative to the top edge. Typically the cross ribs are on the face of the membrane facing the negative electrode. In some embodiments of the present invention, the ribbed membrane can have a transverse cross-rib height of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib height of no greater than about 1.0 mm, 0.5 mm, 0.25 mm, 0.20 mm, 0.15 mm, 0.10 mm or 0.05 mm.

In some embodiments of the present invention, the ribbed membrane can have a transverse cross-rib width of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib width of no greater than about 1.0 mm, 0.5 mm, 0.25 mm, 0.20 mm, 0.15 mm, 0.10 mm or 0.05 mm.

In certain selected embodiments the porous membrane can have a transverse cross-rib height of about 0.10-0.15 mm, and a longitudinal rib height of about 0.1-0.15 mm. In some embodiments, the porous membrane can have a transverse cross-rib height of about 0.10-0.125 mm, and a longitudinal rib height of about 0.1-0.125 mm.

The microporous membrane can have a backweb thickness that is at least 0.1 mm, 0.2 mm, 0.3 mm, 0.4 mm, 0.5 mm 0.6 mm, 0.7 mm, 0.8 mm, 0.9 mm or 1.0 mm. The ribbed separator can have a backweb thickness that is no more than about 1.0 mm, 0.9 mm, 0.8 mm, 0.7 mm, 0.6 mm, 0.5 mm, 0.4 mm, 0.3 mm, 0.2 mm or 0.1 mm. In some embodiments, the microporous membrane can have a backweb thickness between about 0.1-1.0 mm, 0.1-0.8 mm, 0.1-0.5 mm, 0.1-0.5 mm, 0.1-0.4 mm, 0.1-0.3 mm. In some embodiments, the microporous membrane can have a backweb thickness of about 0.2 mm.

The separators of the present invention can be provided either in sheet form or in the form of a wrap, sleeve, pocket, or envelope. In some embodiments, a microporous membrane, which may be covered on at least one side with at least one fibrous layer, is provided as a pocket or envelope. When the fibrous layer is present, it is preferred that the microporous membrane has a larger surface area than the fibrous layers. Thus, when combining the microporous membrane and the fibrous layers, the fibrous layers do not completely cover the microporous layer. It is preferred that at least two opposing edge regions of the membrane layer remain uncovered to provide edges for heat sealing which facilitates the formation of pockets or envelope. The separators can be processed to form hybrid envelopes. The hybrid envelope can be formed by forming one or more slits or openings before, during or after, folding the separator sheet in half and bonding edges of the separator sheet together so as to form an envelope. The sides are bonded together using welds or mechanical seals to form seams that bring one side of the separator sheet into contact with another side of the separator sheet. Welds can be accomplished, for instance, using heat or ultrasonic processes. This process results in an envelope shape having a bottom folded edge and two lateral edges.

Separators disclosed herein in the form of an envelope may have one or more slits or openings along the folded or sealed creases of the envelope. The length of the openings can be at least $1/50^{th}$, $1/25^{th}$, $1/20^{th}$, $1/15^{th}$, $1/10^{th}$, $1/8^{th}$, $1/5^{th}$, $1/4^{th}$, or $1/3^{rd}$ the length of the entire edge. The length of the openings can be $1/50^{th}$ to $1/3^{rd}$, $1/25^{th}$ to $1/3^{rd}$, $1/20^{th}$ to $1/3^{rd}$, $1/20^{th}$ to $1/4^{th}$, $1/15^{th}$ to $1/4^{th}$, $1/15^{th}$ to $1/5^{th}$ or $1/10^{th}$ to $1/5^{th}$ the length of the entire edge. The hybrid envelope can have 1-5, 1-4, 2-4, 2-3 or 2 openings, which may or may not be equally disposed along the length of the bottom edge. It is preferred that no opening is in the corner of the envelope. The slits may be cut after the separator has been folded and sealed to give an envelope, or the slits may be formed prior to shaping the porous membrane into the envelop.

Separators as disclosed herein may be characterized by improved conductance over time. Conductance may be determined as cold-cranking amps (CCA), measured for instance in a Midtronics tester. For instance, a lead-acid battery equipped with the inventive separator can exhibit a decrease of less than 10%, less than 9%, less than 8%, less than 7%, less than 6%, less than 5%, less than 4%, less than 3%, less than 2%, less than 1%, or less than 0.5% CCA over a period of 30 days as measured by a Midtronics CCA tester. In contrast, the CCA decrease observed for conventional batteries under similar conditions is often much greater.

The separators provided herein permit the production of batteries with reduced water loss and float currents in batteries compared to batteries made from conventional separators. In some embodiments, water loss can be reduced by more than 10%, 20%, 30%, 40%, 50%, 60%, 70% or 80%. In some embodiments, float current can be reduced by more than 10%, 20%, 30%, 40%, 50%, 60%, 70% or 80%. Batteries prepared using the disclosed separators exhibit reduced internal resistance increase over time, and in some cases exhibit no increased internal resistance.

Besides lowering water loss and leading to extended battery life, possibly preferred separators are also designed to bring other benefits. With regard to assembly, the separators have the negative cross rib design to maximize bending stiffness and ensure highest manufacturing productivity. To prevent shorts during high speed assembly and later in life, the separators have superior puncture and oxidation resistance when compared to standard PE separators.

In accordance with at least selected embodiments, the present disclosure or invention is directed to improved battery separators, Low ER or high conductance separators, improved lead-acid batteries, such as flooded lead-acid batteries, high conductance batteries, and/or, improved vehicles including such batteries, and/or methods of manufacture or use of such separators or batteries, and/or combinations thereof. In accordance with at least certain embodiments, the present disclosure or invention is directed to improved lead acid batteries incorporating the improved separators and which exhibit increased conductance.

It is believed that the improved separators described herein, such as the broken rib separators described herein, may further help to prevent the formation of sulfation crystals, and may also assist in provided a more uniform thermal distribution and/or thermal mixing and/or thermal or heat dissipation (dissipating heat in a lower amount of time, compared with known separators, such as solid ribbed separators, for flooded lead acid batteries) across the separator. It is also believed that the exemplary broken rib separators described herein may also provide improved or faster or more efficient filling of flooded lead acid batteries, gel batteries, and/or enhanced flooded batteries.

In various embodiments of the present disclosure, the disclosed separator provides for reduced acid stratification, or even the complete elimination of acid stratification altogether, such that the mixing level or volume uniformity of the acid or electrolyte within the flooded lead acid battery is 1.0 or nearly approaches 1.0. In various embodiments, the separator disclosed herein is also a low electrical resistance (ER) separator. In such embodiments, the separator may contain improvements, such as improved fillers, which increase the porosity, pore size, internal pore surface area, wettability and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. By way of example, the improved separator is formed using a silica having an intrinsic oil absorption value of about 175-350 ml/100 g, in some embodiments, 200-350 ml/100 g, in some embodiments, 250-350 ml/100 gm, and in some further embodiments, 260-320 ml/100 g, though other oil absorption values are possible as well.

The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (such as polar species, such as metals) that facilitate the flow of electrolyte and ions across the separator. Such also leads to decreased overall electrical resistance as such a separator is used in a flooded battery, such as an enhanced flooded battery.

The low ER microporous separators herein further may comprise a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In some instances, the improved battery comprising the improved separator with the improved pore morphology and/or fibril morphology may exhibit 20% lower, in some instances, 25% lower, in some instances, 30% lower electrical resistance, and in some instances, even more than a 30% drop in electrical resistance ("ER") (which may reduce battery internal resistance) while such a separator retains and maintains a balance of other key, desirable mechanical properties of lead acid battery separators. Further, in certain embodiments, the separators described herein have a novel and/or improved pore shape such that more electrolyte flows through or fills the pores and/or voids as compared to known separators. The ultrahigh molecular weight polyethylene in the separator may comprise polymer in a shish-kebab formation comprising a plurality of extended chain crystals (the shish formations) and a plurality of folded chain crystals (the kebab formations), wherein the average repetition or periodicity of the kebab formations is from 1 nm to 150 nm, preferably, from 10 nm to 120 nm, and more preferably, from 20 nm to 100 nm (at least on portions of the rib side of the separator). In certain of these low ER embodiments of the present separator, the separator for a lead acid battery described herein comprises a filler selected from the group consisting of silica, precipitated silica, fumed silica, and precipitated amorphous silica; wherein the molecular ratio of OH to Si groups within said filler, measured by $^{29}$Si-NMR, is within a range of from 21:100 to 35:100, in some embodiments, 23:100 to 31:100, in some embodiments, 25:100 to 29:100, and in certain preferred embodiments, 27:100 or higher.

In certain selected embodiments, the disclosed separators exhibit decreased electrical resistance, for instance, an electrical resistance no greater than about 200 m$\Omega$·cm$^2$, 180 m$\Omega$·cm$^2$, 160 m$\Omega$·cm$^2$, 140 m$\Omega$·cm$^2$, 120 m$\Omega$·cm$^2$, 100 m$\Omega$·cm$^2$, 80 m$\Omega$·cm$^2$, 60 m$\Omega$·cm$^2$, 50 m$\Omega$·cm$^2$, 40 m$\Omega$·cm$^2$, 30 m$\Omega$·cm$^2$, or 20 m$\Omega$·cm$^2$. In various embodiments, the separators described herein exhibit about a 20% or more reduction in ER compared with a known separator of the same thickness. For example, a known separator may have an ER value of 60 m$\Omega$·cm$^2$; thus, a separator according to the present invention at the same thickness would have an ER value of less than about 48 m$\Omega$·cm$^2$. The separators described herein having low ER may have any or all of the features set forth in U.S. Provisional Patent Application No. 62/319,959, owned by Daramic, LLC and filed Apr. 8, 2016, which provisional application is hereby incorporated by reference in its entirety.

In accordance with at least selected embodiments, the present disclosure is directed to improved lead-acid batteries, such as flooded lead-acid batteries, improved systems that include a lead-acid battery, and/or a battery separator, improved battery separators, improved vehicles including such systems, methods of manufacture or use, or combinations thereof. In accordance with at least certain embodiments, the present disclosure is directed to improved flooded lead-acid batteries, improved battery separators for such batteries, and/or methods of manufacturing, testing, or using such improved flooded lead-acid batteries, or combinations thereof. In addition, disclosed herein is a method, system, battery, and/or battery separator for reducing acid stratification, enhancing battery life and performance in a flooded lead-acid battery.

In various embodiments of the present disclosure, the disclosed separator provides for reduced acid stratification, or even the complete elimination of acid stratification altogether, such that the mixing level or volume uniformity of the acid or electrolyte within the flooded lead acid battery is 1.0 or nearly approaches 1.0. In various embodiments, the separator disclosed herein is also a low electrical resistance (ER) separator. In such embodiments, the separator may contain improvements, such as improved fillers, which increase the porosity, pore size, internal pore surface area, wettability and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. By way of example, the improved separator is formed using a silica having an intrinsic oil absorption value of about 175-350 ml/100 g, in some embodiments, 200-350 ml/100 g, in some embodiments, 250-350 ml/100 gm, and in some further embodiments, 260-320 ml/100 g, though other oil absorption values are possible as well.

The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (such as polar species, such as metals) that facilitate the flow of electrolyte and ions across the separator. Such also leads to decreased overall electrical resistance as such a separator is used in a flooded battery, such as an enhanced flooded battery.

The low ER microporous separators herein further may comprise a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In some instances, the improved battery comprising the improved separator with the improved pore morphology and/or fibril morphology may exhibit 20% lower, in some instances, 25% lower, in some instances, 30% lower electrical resistance, and in some instances, even more than a 30% drop in electrical resistance ("ER") (which may reduce battery internal resistance) while such a separator retains and maintains a balance of other key, desirable mechanical properties of lead acid battery separators. Further, in certain embodiments, the separators described herein have a novel and/or improved pore shape such that more electrolyte flows through or fills the pores and/or voids as compared to known separators. The ultrahigh molecular weight polyethylene in the separator may comprise polymer in a shish-kebab formation comprising a plurality of extended chain crystals (the shish formations) and a plurality of folded chain crystals (the kebab formations), wherein the average repetition or periodicity of the kebab formations is from 1 nm to 150 nm, preferably, from 10 nm to 120 nm, and more preferably, from 20 nm to 100 nm (at least on portions of the rib side of the separator). In certain of these low ER embodiments of the present separator, the separator for a lead acid battery described herein comprises a filler selected from the group consisting of silica, precipitated silica, fumed silica, and precipitated amorphous silica; wherein the molecular ratio of OH to Si groups within said filler, measured by $^{29}$Si-NMR, is within a range of from 21:100 to 35:100, in some embodiments, 23:100 to 31:100, in some embodiments, 25:100 to 29:100, and in certain preferred embodiments, 27:100 or higher.

In certain selected embodiments, the disclosed separators exhibit decreased electrical resistance, for instance, an electrical resistance no greater than about 200 mΩ·cm$^2$, 180 mΩ·cm$^2$, 160 mΩ·cm$^2$, 140 mΩ·cm$^2$, 120 mΩ·cm$^2$, 100 mΩ·cm$^2$, 80 mΩ·cm$^2$, 60 mΩ·cm$^2$, 50 mΩ·cm$^2$, 40 mΩ·cm$^2$, 30 mΩ·cm$^2$, or 20 mΩ·cm$^2$. In various embodiments, the separators described herein exhibit about a 20% or more reduction in ER compared with a known separator of the same thickness. For example, a known separator may have an ER value of 60 mΩ·cm$^2$; thus, a separator according to the present invention at the same thickness would have an ER value of less than about 48 mΩ·cm$^2$. The separators described herein having low ER may have any or all of the features set forth in U.S. Provisional Patent Application No. 62/319,959, owned by Daramic, LLC and filed Apr. 8, 2016, which provisional application is hereby incorporated by reference in its entirety.

In accordance with at least selected embodiments, the present disclosure is directed to improved lead-acid batteries, such as flooded lead-acid batteries, improved systems that include a lead-acid battery, and/or a battery separator, improved battery separators, improved vehicles including such systems, methods of manufacture or use, or combinations thereof. In accordance with at least certain embodiments, the present disclosure is directed to improved flooded lead-acid batteries, improved battery separators for such batteries, and/or methods of manufacturing, testing, or using such improved flooded lead-acid batteries, or combinations thereof. In addition, disclosed herein is a method, system, battery, and/or battery separator for reducing acid stratification, enhancing battery life and performance in a flooded lead-acid battery.

In some embodiments, the improved high conductance separator may be a low ER separator, a low water loss separator, a broken or serrated rib separator, and/or may optionally include a coating on one or both sides. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss.

The separator used in various embodiments herein may be provided with one or more additives. Such is the case because additives may enhance separators for certain stop/start flooded lead-acid batteries for certain vehicles. One such additive that may be present in the polyolefin is a surfactant, while another such additive may include one or more latex additives. Suitable surfactants include surfactants such as salts of alkyl sulfates; alkylarylsulfonate salts; alkylphenol-alkylene oxide addition products; soaps; alkyl-naphthalene-sulfonate salts; dialkyl esters of sulfo-succinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated fatty alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In accordance with at least selected embodiments, aspects or objects there are provided at least one or more of:

An acid mixing rib separator having a positive face rib profile enhancing acid mixing such that in 60 seconds has at least one of an at least 5% increase in acid mixing and an at least 0.01 increase in volume uniformity over a standard solid rib separator.

An acid mixing rib separator having a positive face rib profile enhancing acid mixing such that in 60 seconds has at least one of a 10% increase in acid mixing and an at least 0.02 increase in volume uniformity.

An acid mixing rib separator having a positive face rib profile enhancing acid mixing such that in 60 seconds has at least one of a 15% increase in acid mixing and an at least 0.03 increase in volume uniformity.

An acid mixing rib separator having a positive face rib profile enhancing acid mixing such that in 60 seconds has at least one of a 20% increase in acid mixing and an at least 0.035 increase in volume uniformity.

An acid mixing rib separator having a positive face rib profile enhancing acid mixing such that in 60 seconds has at least one of a 25% increase in acid mixing and an at least 0.04 increase in volume uniformity.

An acid mixing ribbed separator wherein the separator is a negative plate envelope.

An acid mixing rib separator for a negative plate envelope having a positive face rib profile enhancing acid mixing such that in 60 seconds of mixing has at least one of an at least 25% increase in acid mixing and an at least 0.40 volume uniformity.

An acid mixing rib separator for a negative plate envelope for a flooded lead acid battery having a positive face rib profile enhancing acid mixing such that in 60 seconds of mixing has at least one of an at least 28% increase in acid mixing and an at least 0.41 volume uniformity.

In a battery, the improvement comprising the above separators.

In a vehicle, the improvement comprising the above battery.

A vehicle wherein the battery is positioned with the plates parallel to the length of the vehicle.

Improved lead-acid batteries, such as flooded lead-acid batteries, improved systems that include a lead-acid battery, and/or a battery separator, improved battery separators, improved vehicles including such systems, methods of manufacture or use, or combinations thereof; improved flooded lead-acid batteries, improved battery separators for such batteries, and/or methods of manufacturing, testing, or using such improved flooded lead-acid batteries, or combinations thereof; a method, system, battery, and/or battery separator for reducing acid stratification, enhancing battery life and performance in a flooded lead-acid battery; and combinations thereof as shown or described herein.

Separators providing enhanced electrolyte mixing and/or acid circulation compared with conventional separators; separators providing for less acid stratification, as measured by electrolyte density at the top and bottom of the cell; the density differential may be less than 50%, 45%, 40%, 35%, 30%, 25%, 20%, 15%, 10%, 5%, 2.5%, or 1%, after the cell has undergone 30, 60, 90 or more start/stop events or cycles; the density differential may be less than 50%, 45%, 40%, 35%, 30%, 25%, 20%, 15%, 10%, 5%, 2.5%, or 1%, after the cell has remained still for 24, 48, 72, or more hours; and combinations thereof as shown or described herein.

A battery separator comprising:
a plurality of broken ribs; and
said plurality of broken ribs being defined by an angular orientation.

Further shown is a method of reducing acid stratification in a battery comprising:
  providing a battery, wherein the battery houses one or more positive electrodes and one or more negative electrodes;
  providing one or more separators, wherein a separator is disposed between each of said one or more positive electrodes and said one or more negative electrodes, and wherein each of said one or more separators is provided with a plurality of ribs being defined by an angular orientation;
  providing an electrolyte; and
  providing motion to said battery.

A lead-acid battery comprising:
  a case and a lid;
  a plurality of positive and negative electrodes, wherein straps are mounted to said positive and negative electrodes, respectively;
  an acid-based electrolyte; wherein
  said case and said lid are coupled together to form an interior volume disposed therein;
  said plurality of positive and negative electrodes and said acid-based electrolyte housed within at least a lower portion of said interior volume; and
  one or more baffles disposed within an upper portion of said interior volume.

In a start/stop vehicle, the improvement comprising the above battery.

The vehicle above, wherein the battery has plates and the plates are
  positioned substantially parallel to the direction of vehicle movement.

The foregoing written description of structures and methods has been presented for purposes of illustration. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. "Such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A battery separator for enhancing acid mixing in a flooded lead acid battery comprising:
   a porous backweb having a left portion, a middle portion and a right portion from a left edge of the backweb;
   a first plurality of broken ribs located in the middle portion, said first plurality of broken ribs having an angular orientation other than zero degrees (0°) and other than ninety degrees (90°) to enhance fluid acid mixing during battery movement when the separator is positioned parallel to start and stop motion of the battery,
   wherein said plurality of broken ribs are arranged in an array of columns and rows;
   with said array of columns being arranged in a plurality of column sections; and
   at least one of said plurality of column sections having a different arrangement of said plurality of broken ribs as compared to at least one other of said plurality of column sections, and
   with said array of rows being arranged in a plurality of row sections; and
   at least one of said plurality of row sections having a different arrangement of said plurality of broken ribs as compared to at least one other of said plurality of row sections;
   wherein said columns and rows being separated by variable column spacing; and,
   a second plurality of broken ribs in the left portion, the broken ribs forming alternating ribbed and open areas, said second plurality of broken ribs being arranged in rows parallel to the left edge, wherein open areas are staggered between adjacent rows; and,
   a third plurality of broken ribs in the right portion, the broken ribs forming alternating ribbed and open areas, said third plurality of broken ribs being arranged in rows parallel to the left edge, wherein open areas are staggered between adjacent rows.

2. The battery separator of claim 1, said angular orientation is relative to a machine direction of the separator and said angular orientation is an angle chosen from the group consisting of between greater than zero degrees (0°) and less than 180 degrees (180°), and greater than 180 degrees (180°) and less than 360 degrees (360°).

3. The battery separator of claim 1 further comprising:
   one or more sets of ribs within said first plurality of broken ribs;
   wherein a first set of ribs within the first plurality of broken ribs having a first angular orientation; and
   wherein a second set of ribs within the first plurality of broken having a second angular orientation.

4. The battery separator of claim 1, wherein said separator being selected from the group consisting of polyolefin, rubber, polyvinyl chloride, phenolic resins, cellulosic, or combinations thereof.

5. The battery separator of claim 1, wherein said separator comprises one selected from the group consisting of a filler, a surfactant, or combinations thereof.

6. The battery separator of claim 1 further comprising: an absorptive glass mat.

7. The battery separator of claim 1, wherein the separator promotes acid mixing or improves acid mixing over conventional solid rib profile separators.

8. In a flooded lead acid battery, the improvement comprising the separator of claim 7.

9. In a start/stop vehicle, the improvement comprising the battery of claim 8.

10. The vehicle of claim 9, wherein the battery has plates and the plates are positioned substantially parallel to the direction of vehicle movement.

11. The battery separator for enhancing acid mixing in a flooded lead acid battery of claim 1 such that in 60 seconds it provides at least one of an at least 15% increase in acid mixing and an at least 0.37 volume uniformity, or it provides at least one of a 20% increase in acid mixing and an at least 0.38 volume uniformity, or it provides at least one of a 25% increase in acid mixing and an at least 0.40 volume uniformity, or it provides at least one of a 30% increase in acid mixing and an at least 0.42 volume uniformity.

12. The battery separator for enhancing acid mixing in a flooded lead acid battery of claim 1, wherein the separator is a negative plate envelope.

* * * * *